United States Patent
Beloglazov et al.

(10) Patent No.: US 9,363,190 B2
(45) Date of Patent: Jun. 7, 2016

(54) SYSTEM, METHOD AND COMPUTER PROGRAM PRODUCT FOR ENERGY-EFFICIENT AND SERVICE LEVEL AGREEMENT (SLA)-BASED MANAGEMENT OF DATA CENTERS FOR CLOUD COMPUTING

(71) Applicants: Anton Beloglazov, North Melbourne (AU); Rajkumar Buyya, Clarinda (AU)

(72) Inventors: Anton Beloglazov, North Melbourne (AU); Rajkumar Buyya, Clarinda (AU)

(73) Assignee: Manjrasoft Pty. Ltd., Melbourne, Victoria (AU)

( * ) Notice: Subject to any disclaimer, the term of this patent is extended or adjusted under 35 U.S.C. 154(b) by 373 days.

(21) Appl. No.: 13/955,956

(22) Filed: Jul. 31, 2013

(65) Prior Publication Data

US 2015/0039764 A1 Feb. 5, 2015

(51) Int. Cl.
*G06F 15/173* (2006.01)
*H04L 12/911* (2013.01)
*H04L 29/08* (2006.01)
*G06F 9/50* (2006.01)

(52) U.S. Cl.
CPC .............. *H04L 47/70* (2013.01); *G06F 9/5088* (2013.01); *G06F 9/5094* (2013.01); *H04L 67/025* (2013.01); *H04L 67/18* (2013.01); *Y02B 60/142* (2013.01); *Y02B 60/162* (2013.01)

(58) Field of Classification Search
None
See application file for complete search history.

(56) References Cited

U.S. PATENT DOCUMENTS

| 2011/0185064 A1* | 7/2011 | Head | G06F 9/5077 709/226 |
| 2012/0151490 A1* | 6/2012 | Zhang | G06F 9/5094 718/102 |
| 2012/0304175 A1* | 11/2012 | Damola | G06F 11/3419 718/1 |

OTHER PUBLICATIONS

Luiz et al in "Multisize sliding window in workload estimation for dynamic power management," IEEE Transactions on Computers 59(12):1625-1639, 2010.*
Beloglazov, Anton et al., "A Taxonomy and Survey of Energy-Efficient Data Centers and Cloud Computing Systems," published in Advances in Computers, vol. 82, Copyright © 2011 Elsevier Inc., ISSN: 0065-2458/DOI: 10.1016/B978-0-12-385512-1.00003-7, pp. 47-111.
Beloglazov, Anton et al., "Optimal Online Deterministic Algorithms and Adaptive Heuristics for Energy and Performance Efficient Dynamic Consolidation of Virtual Machines in Cloud Data Centers," published in Concurrency and Computation: Practice and Experience, Concurrency Computat.: Pract. Exper. 2012; 24:1397-1420; Published online in Wiley InterScience (www.interscience.wiley.com). DOI: 10.1002/cpe.1867, Copyright © 2012 John Wiley & Sons, Ltd., pp. 1-24.

(Continued)

*Primary Examiner* — Scott B Christensen
(74) *Attorney, Agent, or Firm* — Rahman LLC

(57) ABSTRACT

Improving the utilization of physical resources and reducing energy consumption in a cloud data center includes providing a plurality of virtual machines in the cloud data center; periodically reallocating resources of the plurality of virtual machines according to a current resource demand of the plurality of virtual machines in order to minimize a number of active physical servers required to handle a workload of the physical servers; maximizing a mean inter-migration time between virtual machine migrations under the quality of service requirement based on a Markov chain model; and using a multisize sliding window workload estimation process for a non-stationary workload to maximize the mean inter-migration time.

20 Claims, 17 Drawing Sheets

(56) References Cited

OTHER PUBLICATIONS

Beloglazov, Anton et aL, "Deploying OpenStack on CentOS Using the KVM Hypervisor and GlusterFS Distributed File System," Technical Report CLOUDS-TR-2012-3, Cloud Computing and Distributed Systems Laboratory, The University of Melbourne, Aug. 14, 2012, pp. 1-49.
Benini, Luca, et al., "Policy Optimization for Dynamic Power Management," published in IEEE Transactions on Computer-Aided Design of Integrated Circuits and Systems, vol. 18, No. 6, Jun. 1999, pp. 813-833.
Chung, Eui-Young, et al., "Dynamic Power Management for Nonstationary Service Requests," published in IEEE Transactions on Computers, vol. 51, No. 11, Nov. 2002, pp. 1345-1361.
Andreolini, Mauro, et al., "Models and Framework for Supporting Runtime Decisions in Web-Based Systems," published in ACM Transactions on the Web, vol. 2, No. 3, Article 17, Publication date: Jul. 2008, Runtime Decisions in Web-Based Systems, pp. 17-17:43.
Beloglazov, Anton et al., "Managing Overloaded Hosts for Dynamic Consolidation of Virtual Machines in Cloud Data Centers under Quality of Service Constraints," published in IEEE Transactions on Parallel and Distributed Systems, vol. 24, No. 7, Jul. 2013, pp. 1366-1379.
Fan, Xiaobo, et al., "Power Provisioning for a Warehouse-sized Computer," published in ISCA'07, Jun. 9-13, 2007, San Diego, California, USA., Copyright 2007, pp. 13-23.
Feller, Eugene, et al., "Snooze: A Scalable and Autonomic Virtual Machine Management Framework for Private Clouds," published in Informatics Mathematics—Innia, Research Report No. 7833 published on Dec. 2011, 20 pages, Project-Teams MYRIADS.
Feller, Eugene, et al., "Energy Management in IaaS Clouds: A Holistic Approach," published in Informatics Mathematics—Innia, Research Report No. 7946, published on Apr. 2012, 21 pages, Project-Teams MYRIADS.
Gmach, Daniel, et al., "An Integrated Approach to Resource Pool Management: Policies, Efficiency and Quality Metrics," HP Laboratories, HPL-2008-89, published in the 38th Annual IEEE/IFIP International Conference on Dependable Systems and Netwroks, DSN'2008, Jun. 24-27, © Copyright 2008, 10 pages.
Guenter, Brian, et al., "Managing Cost, Performance, and Reliability Tradeoffs for Energy-Aware Server Provisioning," published by Microsoft Research, Redmond, WA, 12 pages.
Hermenier, Fabien, et al., "Entropy: A Consolidation Manager for Clusters," published in INRIA—Institut National de Recherche en Informatique et en Automatique, Research Report No. 6639, published on Sep. 2008, 23 pages.
Jung, Gueyoung, et al., "Mistral: Dynamically Managing Power, Performance, and Adaptation Cost in Cloud Infrastructures," published in College of Computing Georgia Institute of Technology, Atlanta, GA and AT&T Labs Research 180 Park Ave., Florham Park, NJ.
Koomey, Jonathan G., Ph.D., "Growth in Data Center Electricity Use 2005 to 2010," A report by Analytics Press, completed at the request of the New York Times, Webpage: http://www.analyticspress.com/datacenters.html, Aug. 1, 2011, 24 pages.
Kumar, Sanjay, et al., "vManage: Loosely Coupled Platform and Virtualization Management in Data Centers," HP Laboratories, HPL-2009-117, published and presented at IEEE International Conference on Autonomic Computing (ICAC) 2009, Barcelona, Spain, Jun. 15-19, 2009 Copyright, 11 pages.
Meisner, David, et al., "PowerNap: Eliminating Server Idle Power," published at ASPLOS'09, Mar. 7-11, 2009, Washington, DC, USA., Copyright © 2009, 12 pages.
Mills, K. et al., "Comparing VM-Placement Algorithms for On-Demand Clouds," published in 2011 Third IEEE International Conference on Coud Computing Technology and Science, IEEE Computer Society, pp. 91-98.
Nathuji, Ripal, et al., "VirtualPower: Coordinated Power Management in Virtualized Enterprise Systems," published in SOSP'07, Oct. 14-17, 2007, Stevenson, Washington, USA., Copyright 2007, 14 pages.
Park, Kyoungsoo, et al., "CoMon: A Mostly-Scalable Monitoring System for PlanetLab," published by Princeton University, 10 pages.
Speitkamp, Benjamin, et al., "A Mathematical Programming Approach for Server Consolidation Problems in Virtualized Data Centers," published by IEEE Computer Society, IEEE Transactions on Services Computing, vol. 3, No. X, XXXXXXX 2010, published online on Apr. 29, 2010, 13 pages.
Srikantaiah, Shekhar, et al., "Energy Aware Consolidation for Cloud Computing," Pennsylvania State University, Microsoft Research, Microsoft Research, 5 pages.
Verma, Akshat, et al., "pMapper: Power and Migration Cost Aware Application Placement in Virtualized Systems," V. Issarny and R. Schantz (Eds.): Middleware 2008, LNCS 5346, pp. 243-264, 2008, © IFIP International Federation for Information Processing 2008.
Verma, Akshat, et al., "Server Workload Analysis for Power Minimization using Consolidation," published by IBM India Research Lab., 14 pages.
Weng, Chuliang, et al., "Automatic Performance Tuning for the Virtualized Cluster System," published by IEEE Computer System, 2009 29th IEEE International Conference on Distributed Computing Systems, pp. 183-190.
Wang, Xiaorui, et al., "Coordinating Power Control and Performance Management for Virtualized Server Clusters," published by the IEEE Computer Society, IEEE Transactions on Parallel and Distributed Systems, vol. 22, No. 2, Feb. 2011, published online Apr. 29, 2010, pp. 245-259.
Wood, Timothy, et al., "Black-box and Gray-box Strategies for Virtual Machine Migration," published by Univ. of Massachusetts Amherst and Intel, Portland, 14 pages.
Minyi, Yue, "A Simple Proof of the Inequality FFD (L)<9 OPT (L)+1 VL for the FFD Bin-Packing Algorithm," published in Acta Mathematicae Applicatae Sinica, vol. 7 No. 4, published on Oct. 1991, pp. 321-331.
Zheng, Qin, et al., "Utilization-based pricing for power management and profit optimization in data centers," published in Elsevier, J. Parallel Distrib. Comput. 72 (2012), pp. 27-34.
Zhu, Xiaoyun, et al., "1000 Islands: Integrated Capacity and Workload Management for the Next Generation Data Center," published by Hewlett-Packard Laboratories and Technical University of Munich (TUM), 10 pages.
Zheng, Wei, et al., "JustRunit: Experiment-Based Management of Virtualized Data Centers," HP Laboratories, HPL-2009-92, published and presented at USENIX Annual Technical Conference, Jun. 14-19, 2009, copyright USENIX Annual Technical Conference, 2009, 17 pages.
Luiz, Saulo O.D., et al., "Multisize Sliding Window in Workload Estimation for Dynamic Power Management," published by the IEEE Computer Society, IEEE Transactions on Computers, vol. 59, No. 12, Dec. 2010, pp. 1-15.

* cited by examiner

SYSTEM, METHOD AND COMPUTER PROGRAM PRODUCT FOR ENERGY-EFFICIENT AND SERVICE LEVEL AGREEMENT (SLA)-BASED MANAGEMENT OF DATA CENTERS FOR CLOUD COMPUTING

BACKGROUND

1. Technical Field

The embodiments herein generally relate to energy-efficient management of distributed computing resources and data centers, and more particularly to cloud computing.

2. Description of the Related Art

Within this application several publications are referenced by Arabic numerals within brackets. Full citations for these and other publications may be found at the end of the specification immediately preceding the claims. The disclosures of all these publications in their entireties are hereby expressly incorporated by reference into the present application for the purposes of indicating the background of the invention and illustrating the general state of the art.

Cloud computing has revolutionized the information and communications technology (ICT) industry by enabling on-demand provisioning of computing resources based on a pay-as-you-go model. An organization can either outsource its computational needs to the Cloud avoiding high up-front investments in a private computing infrastructure and consequent maintenance costs, or implement a private Cloud data center to improve the resource management and provisioning processes. However, the problem of data centers is high energy consumption, which has risen by 56% from 2005 to 2010, and in 2010 accounted to be between 1.1% and 1.5% of the global electricity use [20]. Apart from high operating costs, this results in substantial carbon dioxide ($CO_2$) emissions, which are estimated to be 2% of the global emissions [14]. The problem has been partially addressed by improvements in the physical infrastructure of modern data centers. As reported by the Open Compute Project, Facebook's Oregon data center achieves a Power Usage Effectiveness (PUE) of 1.08, which means that ≈93% of the data center's energy consumption are consumed by the computing resources. Therefore, now it is important to focus on the resource management aspect; i.e., ensuring that the computing resources are efficiently utilized to serve applications.

One method to improve the utilization of data center resources, which has been shown to be efficient [25, 32, 40, 15, 16, 33, 19, 39, 21, 17, 7, 4], is dynamic consolidation of Virtual Machines (VMs). This approach leverages the dynamic nature of Cloud workloads: the VMs are periodically reallocated using live migration according to their current resource demand in order to minimize the number of active physical servers, referred to as hosts, required to handle the workload. The idle hosts are switched to low-power modes with fast transition times to eliminate the static power and reduce the overall energy consumption. The hosts are reactivated when the resource demand increases. This approach has basically two objectives, namely minimization of energy consumption and maximization of the Quality of Service (QoS) delivered by the system, which form an energy-performance trade-off.

Prior approaches to host overload detection for energy-efficient dynamic VM consolidation proposed in the literature can be broadly divided into three categories: periodic adaptation of the VM placement (no overload detection), threshold-based heuristics, and decision-making based on statistical analysis of historical data. One of the first works, in which dynamic VM consolidation has been applied to minimize energy consumption in a data center, has been performed by Nathuji and Schwan [25]. They explored the energy benefits obtained by consolidating VMs using migration and found that the overall energy consumption can be significantly reduced. Verma et al. [32] modeled the problem of power-aware dynamic VM consolidation as a bin-packing problem and proposed a heuristic that minimizes the data center's power consumption, taking into account the VM migration cost. However, the authors did not apply any algorithm for determining when it is necessary to optimize the VM placement—the proposed heuristic is simply periodically invoked to adapt the placement of VMs.

Zhu et al. [40] studied the dynamic VM consolidation problem and applied a heuristic of setting a static CPU utilization threshold of 85% to determine when a host is overloaded. The host is assumed to be overloaded when the threshold is exceeded. The 85% utilization threshold has been first introduced and justified by Gmach et al. [15] based on their analysis of workload traces. In their more recent work, Gmach et al. [16] investigated the benefits of combining both periodic and reactive threshold-based invocations of the migration controller. VMware Distributed Power Management [33] operates based on the same idea with the utilization threshold set to 81%. However, static threshold heuristics may be unsuitable for systems with unknown and dynamic workloads, as these heuristics do not adapt to workload changes and do not capture the time-averaged behavior of the system.

Jung et al. [19] investigated the problem of dynamic consolidation of VMs running multi-tier web-applications to optimize a global utility function, while meeting service level agreement (SLA) requirements. The approach is workload-specific, as the SLA requirements are defined in terms of the response time pre-computed for each transaction type of the applications. When the request rate deviates out of an allowed interval, the system adapts the placement of VMs and the states of the hosts. Zheng et al. [39] proposed automated experimental testing of the efficiency of a reallocation decision prior to its application, once the response time, specified in the SLAs, is violated. In the approach proposed by Kumar et al. [21], the resource allocation is adapted when the application's SLAs are violated. Wang et al. [34] applied control loops to manage resource allocation under response time QoS constraints at the cluster and server levels. If the resource capacity of a server is insufficient to meet the applications' SLAs, a VM is migrated from the server. All these works are similar to threshold-based heuristics in that they rely on instantaneous values of performance characteristics but do not leverage the observed history of system states to estimate the future behavior of the system and optimize the time-averaged performance.

Guenter et al. [17] implemented an energy-aware dynamic VM consolidation system focused on web-applications, whose SLAs are defined in terms of the response time. The authors applied weighted linear regression to predict the future workload and proactively optimize the resource allocation. This approach is in line with the Local Regression (LR) algorithm proposed in [3], which is used as one of the benchmark algorithms. Bobroff et al. proposed a server overload forecasting technique based on time-series analysis of historical data [7]. Unfortunately, the algorithm description is generally too high level, which does not allow for easy implementation to compare it with previous approaches. Weng et al. [35] proposed a load-balancing system for virtualized clusters. A cluster-wide cost of the VM allocation is periodically minimized to detect overloaded and underloaded hosts, and reallocate VMs. This is a related work but with the opposite objective—the VMs are deconsolidated to balance the load across the hosts.

As mentioned above, the common limitations of the prior works are that, due to their heuristic basis, they lead to suboptimal results and do not allow the system administrator to explicitly set a QoS goal. Accordingly, there remains a need for a new and improved energy-efficient and SLA-based management of data centers for cloud computing.

SUMMARY

In view of the foregoing, an embodiment herein provides a method of improving a utilization of physical resources and reducing energy consumption in a cloud data center, the method comprising: providing a plurality of virtual machines in the cloud data center; periodically reallocating resources of the plurality of virtual machines according to a current resource demand of the plurality of virtual machines in order to minimize a number of active physical servers required to handle a workload of the physical servers, wherein the reallocating comprises: determining when a physical server is considered to be overloaded so that some of the virtual machines are migrated from the overloaded physical server to other physical servers in order to meet a quality of service requirement; determining when a physical server is considered to be underloaded so that the virtual machines of the physical server are migrated to other physical servers, wherein the physical server is switched to a lower power mode; selecting particular virtual machines to migrate from the overloaded physical server; and allocating the selected virtual machines for migration to other active or re-activated physical servers. The method further comprises maximizing a mean inter-migration time between virtual machine migrations under the quality of service requirement based on a Markov chain model; and using a multisize sliding window workload estimation process for a non-stationary workload to maximize the mean inter-migration time.

The Markov chain model allows a derivation of a randomized control policy that optimally maximizes the mean inter-migration time between virtual machine migrations under an explicitly specified quality of service requirement for any known stationary workload and a given state configuration in an online setting. The method may further comprise: maximizing an activity time of the overloaded physical server; and minimizing an activity time of an underloaded physical server. A workload of a physical server comprises a central processing unit utilization created over a period of time by a set of virtual machines allocated to the physical server, wherein the workload may be stationary. The non-stationary workload is approximated as a sequence of stationary workloads that are enabled one after another.

The method may further comprise: submitting a virtual machine provisioning request through a cloud user interface; processing the request and instantiating required virtual machines; collecting data on resource utilization of virtual machines instantiated on a compute host; passing the data to a local consolidation manager that invokes physical server overload detection, physical server underload detection, a virtual machine selection process; passing outcomes generated by the local consolidation manager to a global consolidation manager; invoking a virtual machine placement process to determine a new placement of a virtual machine required to be migrated; initiating virtual machine migrations as determined by the virtual machine placement process; migrating the virtual machines as instructed by the global consolidation manager; and upon completion of the required migrations, the global consolidation manager switching the physical servers from and to a lower power mode, wherein the lower power mode comprises a sleep mode. The quality of service requirement may be specified in terms of a workload independent quality of service metric. The overload detection occurs using an offline process.

A system and non-transitory program storage device readable by computer, tangibly embodying a program of instructions executable by the computer to perform the method of improving a utilization of physical resources and reducing energy consumption in a cloud data center are also provided, and includes computer code means for performing the method and a display unit that displays the maximized mean inter-migration time.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
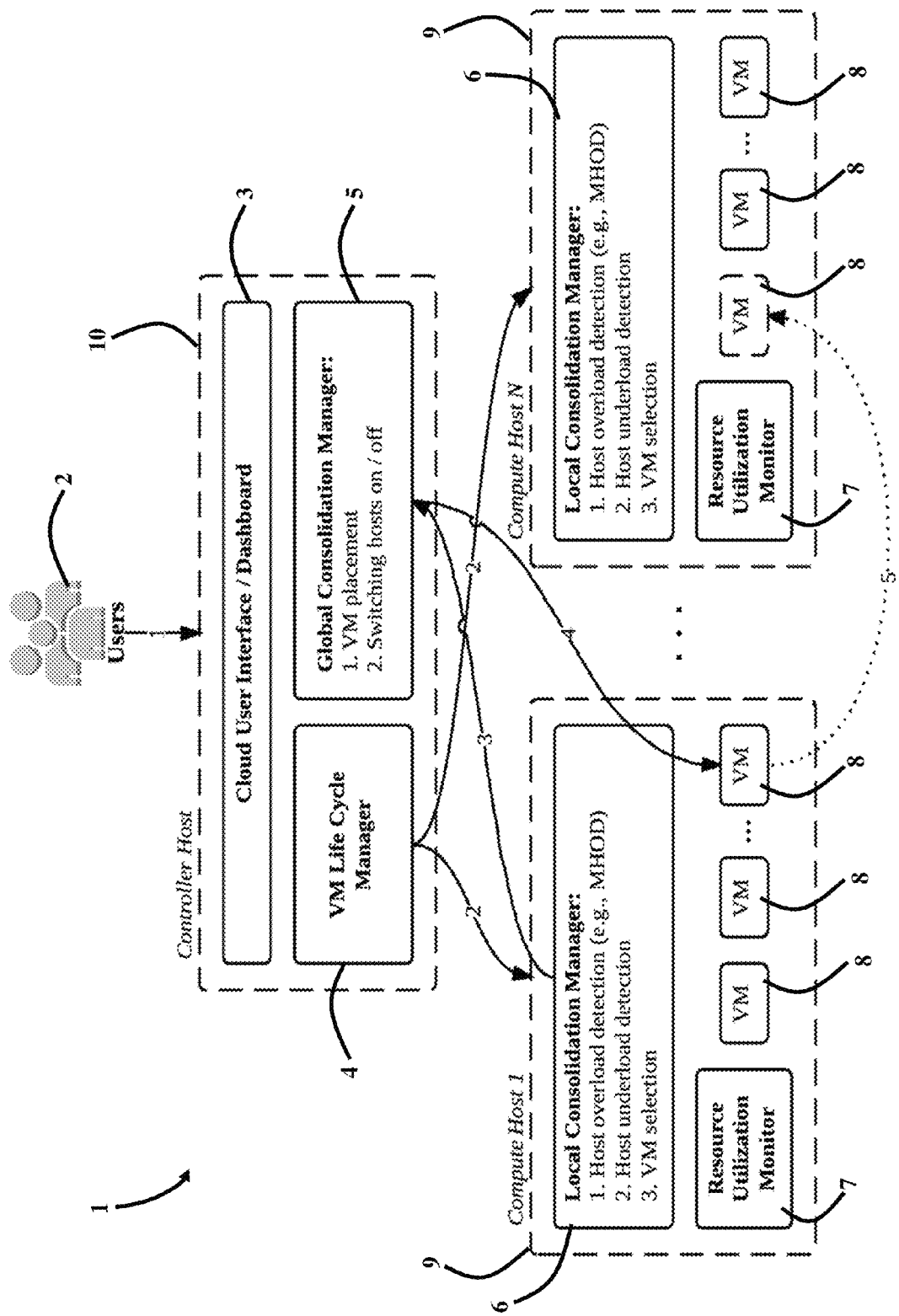
FIG. 1 illustrates a diagram of a high-level view of a system (e.g., a cloud data center) implementing dynamic VM consolidation according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein provide a new and improved energy-efficient and SLA-based management of data centers for cloud computing. Referring now to the drawings, and more particularly to FIGS. 1 through 14, where similar reference characters denote corresponding features consistently throughout the figures, there are shown preferred embodiments.

The QoS requirements can be defined in terms of a variety of metrics and are formalized in the SLAs. In this work, to specify the QoS requirements a modification of the workload independent metric proposed in [3] is applied. Therefore, the problem transforms into minimization of energy consumption under QoS constraints. This problem is too complex to be treated analytically as a whole, as just the VM placement, which is a part of dynamic VM consolidation, is an NP-hard problem [32, 19, 7]. Moreover, many aspects of the problem have to be addressed, e.g., the heterogeneity of physical resources and VMs; non-stationary and unknown workloads, as observed in Infrastructure as a Service (IaaS) environments; power and performance costs of VM migrations; and the large scale of Cloud data center infrastructures. Another argument for splitting the problem is decentralization of the resource management algorithm, which is desirable for scaling the resource management system for efficient handling of thousands of servers. Therefore, to make the problem of dynamic VM consolidation tractable and provide decentralization it is proposed to divide it into 4 sub-problems:

1. Deciding when a host is considered to be overloaded, so that some VMs should be migrated from it to other hosts to meet the QoS requirements.

2. Deciding when a host is considered to be underloaded, so that its VMs should be migrated, and the host should be switched to a low-power mode.

3. Selecting VMs to migrate from an overloaded host.

4. Allocating the VMs selected for migration to other active or re-activated hosts.

A system (e.g., a cloud data center) 1 implementing this model is shown in FIG. 1. The basic actions performed by the system 1 are the following:

1. Users 2 submit VM provisioning requests through a Cloud user interface 3.

2. The VM life cycle manager 4 processes user requests and instantiates the required VMs 8.

3. The resource utilization monitor 7 collects the data on the resource utilization of VMs 8 instantiated on a compute host 9 and passes these data to the local consolidation manager 6, which invokes host overload detection (e.g., MHOD), host underload detection, and VM selection algorithms, and passes the outcomes to the global consolidation manager 5.

4. The global consolidation manager 5, which is on the controller host 10, processes requests received from local consolidation managers 6 and invokes a VM placement algorithm to determine a new placement of VM required to be migrated. Then, the global consolidation manager 5 initiates VM migrations as determined by the VM placement algorithm.

5. VMs 8 are migrated as instructed by the global consolidation manager 5. Upon completion of the required migrations, the global consolidation manager 5 switches hosts 9 from and to the sleep mode accordingly.

First, with respect to the first sub-problem—the problem of host overload detection. Detecting when a host becomes overloaded directly influences the QoS, since if the resource capacity is completely utilized, it is highly likely that the applications are experiencing resource shortage and performance degradation. What makes the problem of host overload detection complex is the necessity to optimize the time-averaged behavior of the system, while handling a variety of heterogeneous workloads placed on a single host. To address this problem, most of the current approaches to dynamic VM consolidation apply either heuristic-based techniques, such as utilization thresholds [40, 15, 16, 33]; decision-making based on statistical analysis of historical data [17, 7]; or simply periodic adaptation of the VM allocation [25, 32]. The limitations of these approaches are that they lead to suboptimal results and do not allow the administrator to explicitly set a QoS goal. In other words, the performance in regard to the QoS delivered by the system can only be adjusted indirectly by tuning parameters of the applied host overload detection algorithm. In contrast, the embodiments herein enable the system administrator to explicitly specify a QoS goal in terms of a workload independent QoS metric. The underlying analytical model allows a derivation of an optimal randomized control policy for any known stationary workload and a given state configuration. The embodiments herein provide the following features in the context of algorithm/method/model:

1. It is analytically shown that to improve the quality of VM consolidation, it is necessary to maximize the mean time between VM migrations initiated by the host overload detection algorithm.

2. An optimal offline algorithm is proposed for host overload detection, and its optimality is proven.

3. A novel Markov Chain model is introduced that allows a derivation of a randomized control policy that optimally solves the problem of maximizing the mean time between VM migrations under an explicitly specified QoS goal for any known stationary workload and a given state configuration in the online setting.

4. To handle unknown non-stationary workloads, the Multisize Sliding Window workload estimation approach [22] is applied to heuristically build an adapted algorithm, which leads to approximately 15% higher mean inter-migration time compared to the best benchmark algorithm for the input workload traces used in our experiments. The adapted algorithm leads to approximately 88% of the mean inter-migration time produced by the optimal offline algorithm.

Some of the features on the system side are the following:

1. An architecture of an extensible software framework (computer program product) for dynamic VM consolidation designed to transparently integrate with OpenStack installations and allowing configuration-based substitution of multiple implementations of algorithms for each of the four defined sub-problems of dynamic VM consolidation.

2. An implementation of the framework in Python released under the Apache 2.0 license and publicly available online.

3. An implementation of several algorithms for dynamic VM consolidation, including the MHOD algorithm, proposed and evaluated by simulations described above and below.

4. An initial version of a benchmark suite comprising the software framework, workload traces, performance metrics, and methodology for evaluating and comparing dynamic VM consolidation solutions following the distributed model.

5. Experimental evaluation of the framework on a 5-node OpenStack deployment using real-world application workload traces collected from more than a thousand PlanetLab VMs hosted on servers located in more than 500 places around the world [27]. According to the estimates of potential energy savings, the algorithms reduce energy consumption by up to 33% with a limited performance impact.

The embodiments herein use static and dynamic threshold heuristics as benchmark algorithms in the experimental evaluation of the proposed approach. The embodiments herein evaluate the algorithm by simulations using real-world workload traces from more than a thousand PlanetLab VMs hosted on servers located in more than 500 places around the world. The experiments show that the introduced algorithm outperforms the benchmark algorithms, while meeting the QoS goal in accordance with the theoretical model. The algorithm uses a workload independent QoS metric and transparently adapts its behavior to various workloads using a machine-learning technique; therefore, it can be applied in an environment with unknown non-stationary workloads, such as IaaS.

The model provided by the embodiments herein is based on Markov chains requiring a few fundamental modeling assumptions. First, the workload must satisfy the Markov property, which implies memoryless state transitions and an exponential distribution of state transition delays. These assumptions must be taken into account in an assessment of the applicability of the proposed model to a particular system. A more detailed discussion of the modeling assumptions and validation of the assumptions is given below.

Benini et al. [6] describe the power management of electronic systems using Markov decision processes. A Markov chain model is created for the case of a known stationary workload and a given state configuration. Using a workload independent QoS metric, a Non-Linear Programming (NLP) problem formulation is derived. The solution of the derived NLP problem is the optimal control policy that maximizes the time between VM migrations under the specified QoS constraint in the online setting. Since most real-world systems, including IaaS, experience highly variable non-stationary workloads, the Multisize Sliding Window workload estimation technique proposed by Luiz et al. [22] is applied to heuristically adapt the proposed model to non-stationary stochastic environments and practical applications. Although the final approach is a heuristic approach, in contrast to the previous works, it is based on an analytical model that allows the computation of an optimal control policy for any known stationary workload and a given state configuration.

The Objective of a Host Overload Detection Algorithm

To improve the quality of VM consolidation, it is necessary to maximize the time intervals between VM migrations from overloaded hosts. Since VM consolidation is applied to reduce the number of active hosts, the VM consolidation quality is inversely proportional to H, the mean number of active hosts over n time steps:

$$H = \frac{1}{n}\sum_{i=1}^{n} a_i, \quad (1)$$

where $a_i$ is the number of active hosts at the time step $i=1, 2, \ldots, n$. A lower value of H represents a better quality of VM consolidation.

To investigate the impact of decisions made by host overload detection algorithms on the quality of VM consolidation, consider an experiment, where at any time step, the host overload detection algorithm can initiate a migration from a host due to an overload. There are two possible consequences of a decision to migrate a VM relevant to host overload detection: Case 1, when a VM to be migrated from an overloaded host cannot be placed on another active host due to insufficient resources, and therefore, a new host has to be activated to accommodate the VM; and Case 2, when a VM to be migrated can be placed on another active host. To study host overload detection in isolation, it is assumed that no hosts are switched off during the experiment, i.e., once a host is activated, it remains active until n.

Let p be the probability of Case 1, i.e., an extra host has to be activated to migrate a VM from an overloaded host determined by the host overload detection algorithm. Then, the probability of Case 2 is (1−p). Let T be a random variable denoting the time between two subsequent VM migrations initiated by the host overload detection algorithm. The expected number of VM migrations initiated by the host overload detection algorithm over n time steps is n/E[T], where E[T] is the expected inter-migration time.

Based on the definitions given above, the number of extra hosts switched on due to VM migrations initiated by the host overload detection algorithm over n time steps can be defined as $X \sim B(n/E[T],p)$, which is a binomially distributed random variable. The expected number of extra hosts activated is $E[X]=np/E[T]$. Let A be a random variable denoting the time during which an extra host is active between the time steps 1 and n. The expected value of A can be defined as follows:

$$E[A] = \sum_{i=1}^{\lfloor \frac{n}{E[T]} \rfloor} (n-(i-1)E[T])p \quad (2)$$

$$= \left\lfloor \frac{n}{E[T]} \right\rfloor \frac{p}{2}\left(n+n-\left(\left\lfloor \frac{n}{E[T]} \right\rfloor -1\right)E[T]\right) \leq \quad (3)$$

$$\frac{np}{2}\left(1 + \frac{n}{E[T]}\right). \quad (4)$$

(1) can be rewritten as follows:

$$H = \frac{1}{n}\sum_{i=1}^{n} a_i \quad (5)$$

$$= \frac{1}{n}\sum_{i=1}^{n} a_1 + \frac{1}{n}\sum_{i=1}^{n}(a_i - a_1) \quad (6)$$

$$= a_1 + \frac{1}{n}\sum_{i=1}^{n}(a_i - a_1). \quad (7)$$

The first term $a_1$ is a constant denoting the number of hosts that have been initially active and remain active until the end of the experiment. The second term $$H^* = \frac{1}{n}\sum_{i=1}^{n}(a_i - a_1)$$

is the mean number of hosts switched on due to VM migrations being active per unit of time over n time steps. It is desirable to analyze the average behavior, and thus estimate the expected value of H*. It is proportional to a product of the expected number of extra hosts switched on due to VM migrations and the expected activity time of an extra host normalized by the total time, as shown in (8-10).

$$\frac{1}{n}E[X]E[A] \quad (8)$$

$$\leq \frac{1}{n}\frac{np}{E[T]}\frac{np}{2}\left(1 + \frac{n}{E[T]}\right) \quad (9)$$

$$= \frac{np^2}{2E[T]}\left(1 + \frac{n}{E[T]}\right). \quad (10)$$

Since the objective is to improve the quality of VM consolidation, it is necessary to minimize E[H*]. From (8-10), the only variable that can be directly controlled by a host overload detection algorithm is E[T]; therefore, to minimize E[H*] the objective of a host overload detection algorithm is to maximize E[T], i.e., to maximize the mean time between migrations from overloaded hosts.

A Workload Independent QoS Metric

To impose QoS requirements on the system, an extension of the workload independent QoS metric introduced in [3] is applied. The embodiments herein assume a host can be in one of two states in regard to its load level: (1) serving regular load; and (2) being overloaded. It is assumed that if a host is overloaded, the VMs allocated to the host are not being provided with the required performance level leading to performance degradation. To evaluate the overall performance degradation, a metric denoted Overload Time Fraction (OTF) is defined as follows:

$$OTF(u_t) = \frac{t_o(u_t)}{t_a}, \quad (11)$$

where $u_t$ is the CPU utilization threshold distinguishing the non-overload and overload states of the host; $t_o$ is the time, during which the host has been overloaded, which is a function of $u_t$; and $t_a$ is the total time, during which the host has been active. Using this metric, SLAs can be defined as the maximum allowed value of OTF. For example, if in the SLAs it is stated that OTF must be less or equal to 10%, it means that on average a host is allowed to be overloaded for not more than 10% of its activity time. Since the provider is interested in maximizing the resource utilization while meeting the SLAs, from his perspective this requirement corresponds to the QoS goal of OTF→10%, while OTF≤10%. The definition of the metric for a single host can be extended to a set of hosts by substituting the time values by the aggregated time values over the set of hosts.

The exact definition of the state of a host, when it is overloaded, depends on the specific system requirements. However, the value of the CPU utilization threshold $u_t$ defining the states of a host does not affect the proposed model, which allows setting the threshold to any value. For example, in the experiments, it is defined that a host is overloaded, when its CPU utilization is 100%, in which case the VMs allocated to this host do not get the required CPU capacity leading to performance degradation. The reasoning behind this is the observation that if a host serving applications is experiencing 100% utilization, the performance of the applications is constrained by the host's capacity; therefore, the VMs are not being provided with the required performance level.

It has been claimed in the literature that the performance of servers degrade, when their load approaches 100% [38, 30]. For example, the study of Srikantaiah et al. [30] has shown that the performance delivered by the CPU degrades when the utilization is higher than 70%. If due to system requirements, it is desirable to avoid performance degradation, the proposed OTF metric allows the specification of the CPU utilization threshold at the required level below 100%. The host is considered to be overloaded, when the CPU utilization is higher than the specified threshold.

In general, other system resources, such as memory, disk, and network bandwidth, should also be taken into account in the definition of QoS requirements. However, emphasis is placed on CPU as it is one of the main resources that are usually oversubscribed by Cloud providers.

Verma et al. [31] proposed a similar metric for estimating the SLA violation level in a system, which they defined as the number of time instances, when the capacity of a server is less than the demand of all applications placed on it. However, their metric shows a non-normalized absolute value, which, for example, cannot be used to compare systems processing the same workload for different periods of time. In contrast, the OTF metric is normalized and does not depend on the length of the time period under consideration.

In the next section, based on the objective of a host overload detection algorithm derived above, the OTF metric introduced in this section, an optimal offline algorithm for the host overload detection problem is proposed, and its optimality is proved.

An Optimal Offline Algorithm

As shown above, it is necessary to maximize the mean time between VM migrations initiated by the host overload detection algorithm, which can be achieved by maximizing each individual inter-migration time interval. Therefore, the problem formulation is limited to a single VM migration; i.e., the time span of a problem instance is from the end of a previous VM migration and to the end of the next. Given the above, the problem of host overload detection can be formulated as an optimization problem (12)-(13).

$$t_a(t_m, u_t) \to \max \quad (12)$$

$$\frac{t_o(t_m, u_t)}{t_a(t_m, u_t)} \leq M, \quad (13)$$

where $t_m$ is the time when a VM migration has been initiated; $u_t$ is the CPU utilization threshold defining the overload state of the host; $t_o(t_m, u_t)$ is the time, during which the host has been overloaded, which is a function of $t_m$ and $u_t$; $t_a$ is the total time, during which the host has been active, which is also a function of $t_m$ and $u_t$; and M is the limit on the maximum allowed OTF value, which is a QoS goal expressed in terms of OTF. The aim of a host overload detection algorithm is to select the $t_m$ that maximizes the total time until a migration, while satisfying the constraint (13). It is important to note that the optimization problem (12)-(13) is only relevant to host overload detection, and does not relate to host underload situations. In other words, maximizing the activity time of a host is only important for highly loaded hosts. Whereas for underloaded hosts, the problem is the opposite—the activity time needs to be minimized.

In the offline setting, the state of the system is known at any point in time. Consider an offline algorithm that passes through the history of system states backwards starting from the last known state. The algorithm decrements the time and re-calculates the OTF value $$\frac{t_o(t_m, u_t)}{t_a(t_m, u_t)}$$

at each iteration. The algorithm returns the time that corresponds to the current iteration if the constraint (13) is satisfied (Algorithm 1).

| Algorithm 1 The Optimal Offline (OPT) algorithm: |
| --- |
| Input: A system state history |
| Input: M, the maximum allowed OTF |
| Output: A VM migration time |
| 1:     while history is not empty do |
| 2:         if OTF of history ≤ M then |
| 3:             return the time of the last history state |
| 4:         else |
| 5:             drop the last state from history |

Theorem 1 Algorithm 1 is an optimal offline algorithm (OPT) for the problem of host overload detection.

Proof:

Let the time interval covered by the system state history be $[t_0, t_n]$, and $t_m$ be the time returned by Algorithm 1. Then, according to the algorithm the system states corresponding to the time interval $(t_m, t_n]$ do not satisfy the constraint (13). Since $t_m$ is the right bound of the interval $[t_0, t_m]$, then $t_m$ is the maximum possible time that satisfies the constraint (13). Therefore, $t_m$ is the solution of the optimization problem (12)-(13), and Algorithm 1 is an optimal offline algorithm for the host overload detection problem.

A Markov Chain Model for Host Overload Detection

In the following sections, the proposed model is based on the definitions of Markov chains, a mathematical framework for statistical modeling of real-world processes.

Background on Markov Chain

This section introduces the basic definitions of the Markov chains modeling framework. Bolch [8] provides a detailed introduction to Markov chains.

A stochastic process $\{X_0, X_1, \ldots, X_{n+1}, \ldots\}$ at the consecutive points of observation $0, 1, \ldots, n+1$ constitutes a Discrete-Time Markov Chain (DTMC) if the following relation on the conditional Probability Mass Function (PMF) holds $\forall n \in N_0$, and $\forall s_i \in S = N_0$:

$$P(X_{n+1}=s_{n+1}|X_n=s_n, X_{n-1}=s_{n-1}, \ldots, X_0=s_0) = P(X_{n+1}=s_{n+1}|X_n=s_n). \quad (14)$$

Given an initial state $s_0$, a DTMC evolves step by step according to the one-step transition probabilities:

$$P_{ij}^{(1)}(n) = P(X_{n+1}=s_{n+1}=j|X_n=s_n=i). \quad (15)$$

If the conditional PMF is independent of the time parameter n, the DTMC is referred to as time-homogeneous and (15) reduces to: $p_{ij}=P(X_{n+1}=j|X_n=i) \forall n \in T$. Starting from a state i, the DTMC transitions to a state j, so that $$\sum_j p_{ij} = 1,$$

where $0 \leq p_{ij} \leq 1$. The one-step transition probabilities $p_{ij}$ are usually summarized in a non-negative transition probability matrix $P[p_{ij}]$.

Let $t \in T$ be the time parameter, where $T \subseteq R^+ = [0, \infty)$; let S be the state space of the stochastic process comprising all possible values of $X_t$ (for each $t \in T$). A stochastic process $\{X_t : t \in T\}$ constitutes a Markov process if for all $0 = t_0 < t_1 < \ldots < t_n < t_{n+1}$, $\forall n \in N$, and $\forall s_i \in S$ the conditional Cumulative Distribution Function (CDF) of $X_{t_{n+1}}$ depends only on the previous value $X_{t_n}$ and not on the earlier values $X_{t_0}, X_{t_1}, X_{t_{n-1}}$:

$$P(X_{t_{n+1}} \leq s_{n+1}|X_{t_n}=s_n, X_{t_{n-1}}=s_{n-1}, \ldots, X_{t_0}=s_0) = P(X_{t_{n+1}} \leq s_{n+1}|X_{t_n}=s_n). \quad (16)$$

A stochastic process $\{X_t : t \in T\}$ constitutes a Continuous-Time Markov Chain (CTMC) if for arbitrary $t_i \in R_0^+$, with $0 = t_0 < t_1 < \ldots < t_n < t_{n+1}$, $\forall n \in N$, and $\forall s_i \in S = N_0$ for the conditional PMF, the relation (16) holds. In other words, a CTMC is a Markov process restricted to a discrete, finite, or countably infinite state space S, and a continuous-parameter space T. The right-hand side of (16) is referred to as the transition probability $p_{ij}(u,v)$ of the CTMC to travel from state i to state j during the period of time $[u,v]$, with $u, v \in T$ and $u \leq v$: $p_{ij}(u,v) = P(X_v=j|X_u=i)$. If the transition probabilities $p_{ij}(u,v)$ depend only on the time difference $t = v - u$ and not on the actual values of u and v, the CTMC is time-homogeneous with simplified transition probabilities: $p_{ij}(t) = P(X_{u+t}=j|X_u=i)$.

The embodiments herein focus on time-homogeneous Markov chains, which can also be described as Markov chains with stationary transition probabilities. Time-homogeneous Markov chains correspond to stationary workloads; i.e., workloads, whose statistical properties do not change over time. As provided below, it is shown how a time-homogeneous Markov model can be adapted to cases of non-stationary workloads.

Another characteristic that describes transitions of a CTMC between the states is the instantaneous transition rate $q_{ij}(t)$ of the CTMC traveling from state i to state j. The non-negative, finite, continuous functions $q_{ij}(t)$ satisfy the following conditions:

$$q_{ij}(t) = \lim_{\Delta t \to 0} \frac{p_{ij}(t, t+\Delta t)}{\Delta t}, i \neq j, \quad (17)$$

$$q_{ii}(t) = \lim_{\Delta t \to 0} \frac{p_{ii}(t, t+\Delta t) - 1}{\Delta t}, \quad (18)$$

where $\Delta t$ is chosen such that $$\sum_{j \in S} q_{ij}(t) \Delta t + o(\Delta t) = 1; i, j \in S.$$

A matrix $Q = [q_{ij}] \forall i, j \in S$ is called the infinitesimal generator matrix of the transition probability matrix $P(t) = [p_{ij}(t)]$. The elements $q_{ii}$ on the main diagonal of Q are given by:

$$q_{ii} = -\Sigma_{j \in S, j \neq i} q_{ij}.$$

A vector $\pi(t)$, $[\pi_i(t)] \forall i \in S$ contains the probabilities that the CTMC will be in the state i at the time t. Using the Kolmogorov forward equation [8], the following equation for the unconditional state probability vector $\pi(t)$ can be derived:

$$\frac{d\pi(t)}{dt} = \pi(t)Q. \quad (19)$$

A transition probability matrix P of an ergodic DTMC (e.g., a DTMC with all the transition probabilities being non-zero) can be transformed into an infinitesimal generator matrix of the corresponding CTMC as follows:

$$Q=P-I, \quad (20)$$

where I is the identity matrix. Next, using the definitions given in this section, a Markov chain model for the host overload detection problem is introduced.

The Host Model

Each VM allocated to a host at each point in time utilizes a part of the CPU capacity determined by the application workload. The CPU utilization created over a period of time by a set of VMs allocated to a host constitutes the host's workload. For the initial analysis, it is assumed that the workload is known a priori, stationary, and satisfies the Markov property. In other words, the CPU utilization of a host measured at discrete time steps can be described by a single time-homogeneous DTMC.

There is a controller component, which monitors the CPU utilization of the host and according to a host overload detection algorithm decides when a VM should be migrated from the host to satisfy the QoS requirements, while maximizing the time between VM migrations. As provided above, the problem formulation is limited to a single VM migration; i.e., the time span of a problem instance is from the end of a previous VM migration to the end of the next.

To describe a host as a DTMC, states are assigned to N subsequent intervals of the CPU utilization. For example, if N=11, the state 1 is assigned to all possible values of the CPU utilization within the interval [0%,10%), 2 to the CPU utilization within [10%,20%), ..., N to the value 100%. The state space S of the DTMC contains N states, which correspond to the defined CPU utilization intervals. Using this state definition and knowing the workload of a host in advance, by applying the Maximum Likelihood Estimation (MLE) method it is possible to derive a matrix of transition probabilities P. The matrix is constructed by estimating the probabilities of transitions $$p_{ij} = \frac{c_{ij}}{\sum_{k \in S} c_{ik}}$$

between the defined N states of the DTMC for $i,j \in S$, where $c_{ij}$ is the number of transitions between states i and j.

An additional state (N+1) is added to the Markov chain called an absorbing state. A state $k \in S$ is said to be an absorbing state if and only if no other state of the Markov chain can be reached from it, i.e., $p_{kk}=1$. In other words, once the Markov chain reaches the state k, it stays in that state indefinitely. The resulting extended state space is $S^*=S \cup \{(N+1)\}$. According to the model provided by the embodiments herein, the absorbing state (N+1) represents the state where the DTMC transitions once a VM migration is initiated. According to this definition, the control policy can be described by a vector of the probabilities of transitions from any non-absorbing state to the absorbing state (N+1), i.e., the probabilities of VM migrations, which are denoted $m_i$, where $i \in S$. To add the state (N+1) into the model, the initial transition probability matrix P is extended with a column of unknown transition probabilities $m=[m_i] \forall i \in S$ resulting in an extended matrix of transition probabilities P*:

$$P^* = \begin{pmatrix} p_{11}^* & \cdots & p_{1N}^* & m_1 \\ \vdots & \ddots & \vdots & \vdots \\ p_{N1}^* & \cdots & p_{NN}^* & m_N \\ 0 & 0 & 0 & 1 \end{pmatrix}, \quad (21)$$

where $p_{ij}^*$ are defined as follows:

$$p_{ij}^* = p_{ij}(1-m_i), \forall i,j \in S. \quad (22)$$

In general, the workload experienced by the host's VMs can lead to any CPU utilization from 0% to 100%; therefore, the original DTMC can be assumed to be ergodic. Later, the extended DTMC will be restricted to the states in S; therefore, using Q=P−I [8], the extended matrix of transition probabilities P* can be transformed into a corresponding extended matrix of transition rates Q*:

$$Q^* = \begin{pmatrix} p_{11}^*-1 & \cdots & p_{1N}^* & m_1 \\ \vdots & \ddots & \vdots & \vdots \\ p_{N1}^* & \cdots & p_{NN}^*-1 & m_N \\ 0 & 0 & 0 & 0 \end{pmatrix}. \quad (23)$$

In the next section, a QoS constraint is formulated in terms of the introduced model, derived extended matrix of transition rates Q*, and OTF metric.

The QoS Constraint

Let $$L(t) = \int_0^t \pi(u)du, \quad (24)$$

then $L_i(t)$ denotes the total expected time the CTMC spends in the state i during the interval [0,t). By integrating an equation for the unconditional state probability vector $\pi(t)$: $d\pi(t)/dt=\pi(t)Q$ on both sides, a new differential equation for L(t) is derived [8]:

$$\frac{dL(t)}{dt} = L(t)Q + \pi(0), L(0) = 0. \quad (25)$$

The expected time spent by the CTMC before absorption can be calculated by finding the limit $$L_S(\infty) = \lim_{t \to \infty} L_S(t)$$

restricting the state space to the states in S. The limit exists due to a non-zero probability of a transition to the absorbing state (N+1). However, the limit does not exist for the state (N+1). Therefore, to calculate $L_S(\infty)$, the extended infinitesimal generator matrix Q* is restricted to the states in S, resulting in a matrix $Q_S^*$ of the size N×N. The initial probability vector $\pi(0)$ is also restricted to the states in S resulting in $\pi_S(0)$. Restricting the state space to non-absorbing states allows the computation of $$\lim_{t\to\infty}$$

on both sides of (25) resulting in the following linear equation [8]:

$$L_S(\infty)Q_S^* = -\pi_S(0). \quad (26)$$

Let N denote the state of a host when it is overloaded, e.g., when the CPU utilization is equal to 100%, then the expected time spent in the state N before absorption can be calculated by finding $L_N(\infty)$ from a solution of the system of linear equations (26). Similarly, the total expected time of the host being active can be found as $$\sum_{i\in S} L_i(\infty).$$

Letting the VM migration time be $T_m$, the expected OTF can be calculated as follows:

$$OTF = \frac{T_m + T_N(\infty)}{T_m + \sum_{i\in S} L_i(\infty)}. \quad (27)$$

The Optimization Problem

By the solution of (26), closed-form equations for $$L_1(\infty), L_2(\infty), \ldots, L_N(\infty)$$

are obtained. The unknowns in these equations are $m_1$, $m_2, \ldots, m_N$, which completely describe the policy of the controller. In the model provided by the embodiments herein, the utility function is the total expected time until absorption, as the objective is to maximize the inter-migration time. To introduce the QoS goal in the problem formulation, a limit M on the maximum allowed value of the OTF metric is specified as a constraint resulting in the following optimization problem:

$$\sum_{i\in S} L_i(\infty) \to \max \quad (28)$$

$$\frac{T_m + L_N(\infty)}{T_m + \sum_{i\in S} L_i(\infty)} \le M. \quad (29)$$

The equations (28-29) form an NLP problem. The solution of this NLP problem is the vector m of the probabilities of transitions to the absorbing state, which forms the optimal control policy defined as a PMF $m=[m_i] \forall i\in S$. At every time step, the optimal control policy migrates a VM with the probability $m_i$, where $i\in S$ is the current state. The control policy is deterministic if $\exists k\in S: m_k=1$ and $\forall i\in S, i\ne m_j=0$, otherwise the policy is randomized.

Since the total time until absorption and $T_m$ are non-negative, the problem formulation (28-29) can be simplified to (30-31).

$$\sum_{i\in S} L_i(\infty) \to \max \quad (30)$$

$$(1-M)(T_m + L_N(\infty)) - M\sum_{i\in S} L_i(\infty) \le 0. \quad (31)$$

Modeling Assumptions

The introduced model allows the computation of the optimal control policy of a host overload detection controller for a given stationary workload and a given state configuration. It is important to take into account that this result is based on a few fundamental modeling assumptions. First, it is assumed that the system satisfies the Markov property, or in other words, the sojourn times (i.e., the time a CTMC remains in a state) are exponentially distributed. Assuming an exponential distribution of sojourn times may not be accurate in many systems. For instance, state transition delays can be deterministic due to a particular task scheduling, or follow other than exponential statistical distribution, such as a bell-shaped distribution. Another implication of the Markov property is the assumption of memoryless state transitions, which means that the future state can be predicted solely based on the knowledge of the current state. It is possible to envision systems, in which future states depend on more than one past state.

Another assumption is that the workload is stationary and known a priori, which does not hold in typical computing environments. In the next section, it is shown how the introduced model can be heuristically adapted to handle unknown non-stationary workloads. The proposed heuristically adapted model removes the assumption of stationary and known workloads; however, the assumptions implied by the Markov property must still hold. Further below, the proposed heuristically adapted model is evaluated, and the assumptions are tested through a simulation study using real workload traces from more than a thousand PlanetLab VMs. The simulation results show that the model is efficient for this type of mixed computing workloads.

With a correct understanding of the basic model assumptions and careful assessment of the applicability of the proposed model to a particular system, an application of the model can bring substantial performance benefits to the resource management algorithms. As demonstrated by the simulation study provided below, the proposed approach outperforms the benchmark algorithms in terms of both the mean inter-migration time and the precision of meeting the specified QoS goal.

Non-Stationary Workloads

The model introduced above works with the assumption that the workload is stationary and known. However, this is not the case in systems with unknown non-stationary workloads, such as IaaS. One of the ways to adapt the model defined for known stationary workloads to the conditions of initially unknown non-stationary workloads is to apply the Sliding Window workload estimation approach proposed by Chung et al. [10].

The base idea is to approximate a non-stationary workload as a sequence of stationary workloads $U=(u_1, u_2, \ldots, u_{N_u})$ that are enabled one after another. In this model, the transition probability matrix P becomes a function of the current stationary workload P(u).

Chung et al. [10] called a policy that makes ideal decisions for a current stationary workload $u_i$ the best adaptive policy. However, the best adaptive policy requires the perfect knowledge of the whole sequence of workloads U and the times, at which the workloads change. In reality, a model of a workload $u_i$ can only be built based on the observed history of the system behavior. Moreover, the time at which the current workload changes is unknown. Therefore, it is necessary to apply a heuristic that achieves results comparable to the best adaptive policy. According to the Sliding Window approach, a time window of length $l_w$ slides over time and is always capturing the last $l_w$ events. Let $c_{ij}$ be the observed number of transitions between states i and j, i,j∈S, during the last window $l_w$. Then, applying the MLE method, the transition probability $p_{ij}$ is estimated as $$p_{ij} = \frac{c_{ij}}{\sum_{k \in S} c_{ik}}.$$

As the window length $l_w \to \infty$, the estimator $p_{ij}$ converges to the real value of the transition probability $p_{ij}$ if the length of the current stationary workload $u_i$ is equal to $l_w$ [10].

However, the Sliding Window approach introduces three sources of errors in the estimated workload:

1. The biased estimation error, which appears when the window length $l_w$ is shorter than the length of a sequence of outliers.
2. The resolution error (referred to as the sampling error by Luiz et al. [22]), which is introduced due to the maximum precision of the estimates being limited to $1/l_w$.
3. The adaptation time (referred to as the identification delay by Luiz et al. [22]), which is a delay required to completely fill the window with new data after a switch from a stationary workload $u_{i-1}$ to a new stationary workload $u_i$.

Luiz et al. [22] extended the Sliding Window approach by employing multiple windows with different sizes, where a window to use is selected dynamically using the information about the previous system state and variances of the estimates obtained from different windows. They referred to the extended approach as the Multisize Sliding Window approach. The proposed algorithm dynamically selects the best window size to eliminate the bias estimate error and benefit from both the small sampling error of large window sizes and small identification error of small window sizes. The embodiments herein use the Multisize Sliding Window approach to the model introduced above to adapt it to initially unknown non-stationary workloads.

The calculation of the expected OTF (27) is adapted by transforming it to a function of t∈R⁺ to incorporate the information that is known by the algorithm at the time of decision making:

$$OTF(t) = \frac{T_m + y(t) + L_N(\infty)}{T_m + t + \sum_{i \in S} L_i(\infty)}, \quad (32)$$

where y(t) is a function returning the total time spent in the state N during the time interval [0,t].

Multisize Sliding Window Workload Estimation

Figure 2:
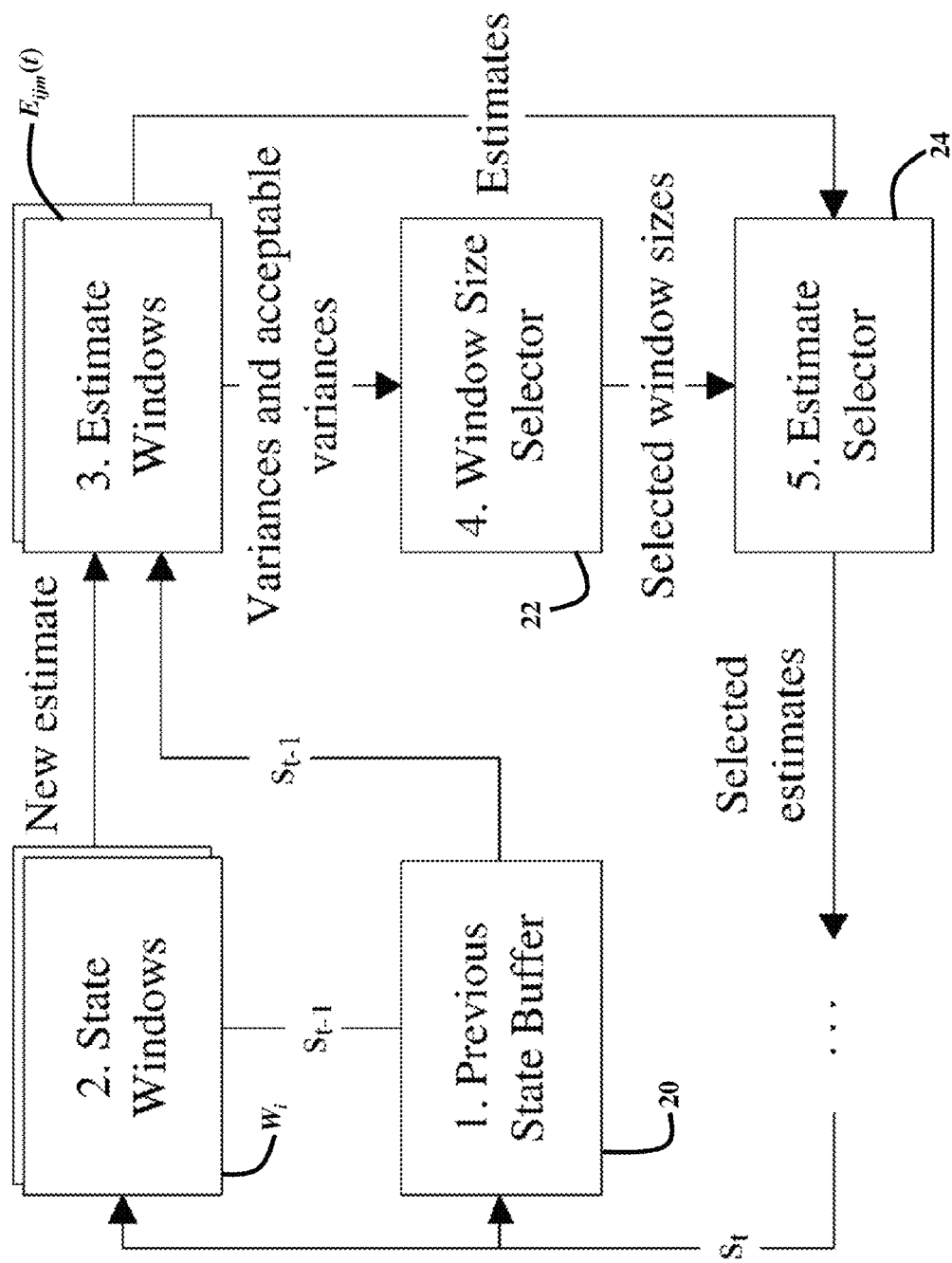
FIG. 2 illustrates a block diagram of the multisize sliding window workload estimation according to an embodiment herein.
Figure 3:
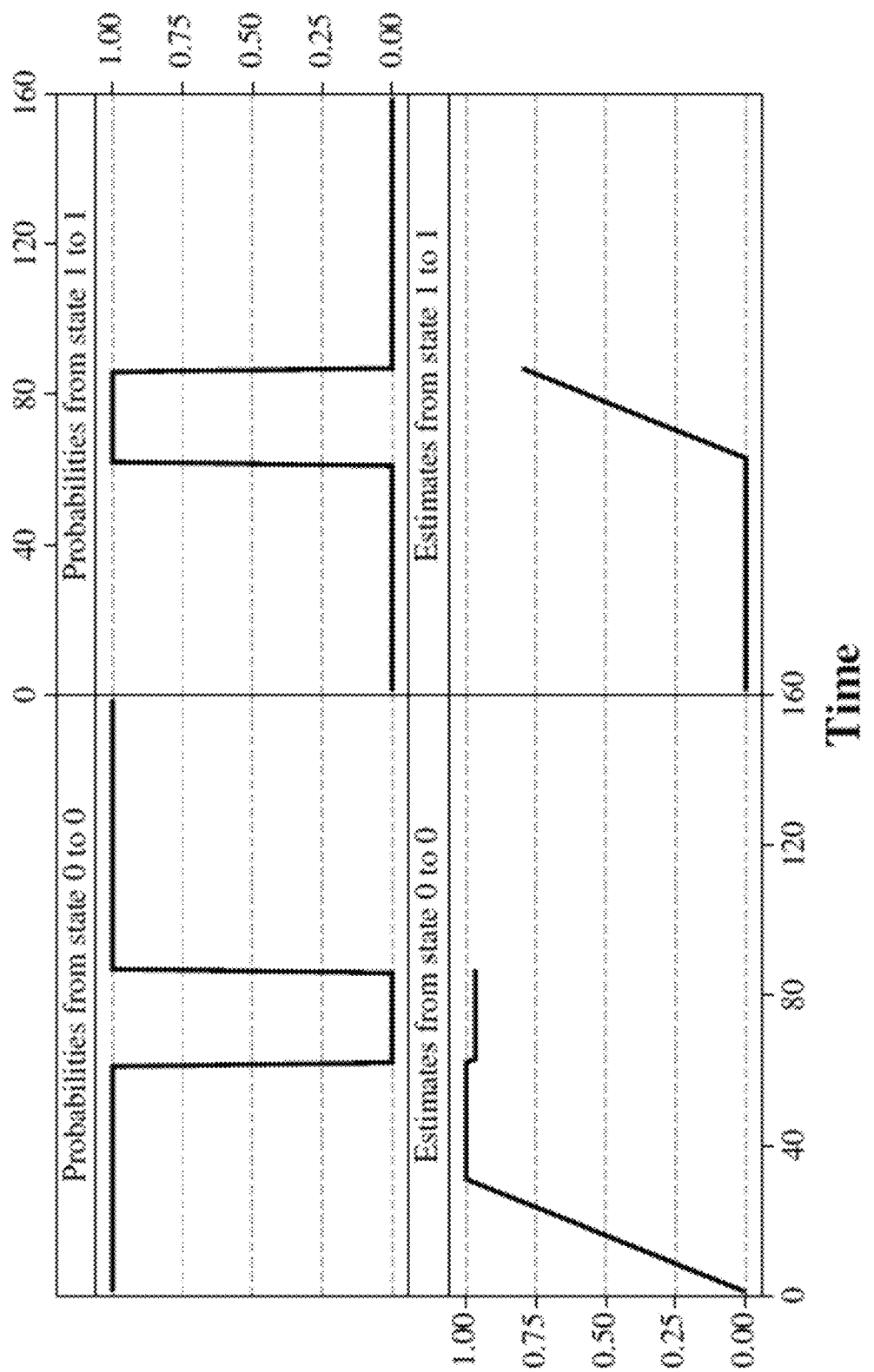
FIG. 3 illustrates a graphical representation of the estimated $p_{00}$ compared to $p_{00}$ according to an embodiment herein.

This section briefly introduces the Multisize Sliding Window approach; for more details, reasoning and analysis please refer to Luiz et al. [22]. A high level view of the estimation algorithm is shown in FIG. 2, with reference to FIG. 1. First, to eliminate the biased estimation error, the previous history is stored separately for each state in S resulting in S state windows $W_i$, i=1, 2, . . . , S.

Let J, D, and $N_J$ be positive numbers; the following represents a sequence of window sizes:

$$L = (J, J+D, J+2D, \ldots, J+(N_J-1)D)$$

$$l_{w_{max}} = J + (N_J - 1)D$$

is the maximum window size. At each time t, the Previous State Buffer 20 stores the system state $s_{t-1}$ at the time t−1 and controls the window selector 22, which selects a window $W_i$ such that $s_{t-1}$=i. The notation $W_i^k(t)$ denotes the content of the window $W_i$ in a position k at the time t. The selected window shifts its content one position to the right to store the current system state:

$$W_i^{k+1}(t) = W_i^k(t), \forall k=1, \ldots, l_{w_{max}}$$

discards the rightmost element $W_i^{l_{w_{max}}}(t)$; and stores $s_t$ in the position $W_i^1(t)$. Once the selected state window $W_i$ is updated, new probability estimates are computed based on this state window for all window sizes as follows:

$$p_{ij}(t, m) = \frac{\sum_{k=1}^{L_m} (W_i^k(t) == j)}{L_m}, \quad (33)$$

where "==" is the equivalence operation, i.e., (1==1)=1, (1==0)=0. A computed probability estimate is stored in $N_J$ out of the $SSN_J$ estimate windows $E_{ijm}(t)$, where i,j∈S, and m is the estimate window size index, 1≤m≤$N_J$. $N_J$ estimate windows $E_{ijm}(t)$ are selected such that $s_{t-1}$=i and $s_t$=j, ∀m=1, . . . , $N_J$.

Similar to the update process of the state windows, the selected estimate windows shift their contents one position to the right, discard the rightmost element $E_{ijm}^{L_m}(t)$, and store $p_{ij}(t, L_m)$ in the position $E_{ijm}^1(t)$. To evaluate the precision of the probability estimates, the variance S(i,j,t,m) of the probability estimates obtained from every updated estimate window is estimated:

$$\bar{p}_{ij}(t, m)) = \frac{1}{L_m} \sum_{k=1}^{L_m} E_{ijm}^k(t), \quad (34)$$

$$S(i, j, t, m) = \frac{1}{L_m - 1} \sum_{k=1}^{L_m} (E_{ijm}^k(t) - \bar{p}_{ij}(t, L_m))^2, \quad (35)$$

where $\bar{p}_{ij}(t,m)$ is the mean value of the probability estimates calculated from the state window $W_i$ of length $L_m$. To determine what values of the variance can be considered to be low enough, the following function of acceptable variance $V_{ac}(p_{ij}(t,m),m)$ is defined [22]:

$$V_{ac}(p_{ij}(t, m), m) = \frac{p_{ij}(t, L_m)(1 - p_{ij}(t, L_m))}{L_m}. \quad (36)$$

Using the function of acceptable variance, probability estimates are considered to be adequate if S(i,j,t,m)≤$V_{ac}(p_{ij}(t,m), m)$ Based on the definitions given above, a window size selection algorithm can be defined (Algorithm 2). According to the selected window sizes, transition probability estimates 24 are selected from the estimate windows.

---

Algorithm 2 The window size selection algorithm

Input: J, D, $N_J$, t, i, j
Output: The selected window size
1:             $l_w \leftarrow J$ Algorithm 2 The window size selection algorithm

```
2:         for k = 0 to N_J - 1 do
3:             if S(i,j,t,k) ≤ V_ac(p̂_ij(t,k),k) then
4:                 l_w ← J + kD
5:             else
6:                 break loop
7:         return l_w
```

The presented approach addresses the errors mentioned above as follows:

1. The biased estimation error is eliminated by introducing dedicated history windows for each state: even if a burst of transitions to a particular state is longer than the length of the window, the history of transitions from the other states is preserved.

2. The sampling error is minimized by selecting the largest window size constrained by the acceptable variance function.

3. The identification error is minimized by selecting a smaller window size when the variance is high, which can be caused by a change to the next stationary workload.

The Control Algorithm

A control algorithm based on the model introduced above is referred to as the Optimal Markov Host Overload Detection (MHOD-OPT) algorithm. The MHOD-OPT algorithm adapted to unknown non-stationary workloads using the Multisize Sliding Window workload estimation technique introduced above is referred to as the Markov Host Overload Detection (MHOD) algorithm. A high-level view of the MHOD-OPT algorithm is shown in Algorithm 3. In the online setting, the algorithm is invoked periodically at each time step to make a VM migration decision.

Algorithm 3 The MBOD-OPT algorithm

```
Input: Transition probabilities
Output: A decision on whether to migrate a VM
1:     Build the objective and constraint functions
2:     Invoke the brute-force search to find the m vector
3:     If a feasible solution exists then
4:         Extract the VM migration probability
5:         if the probability is < 1 then
6:             return false
7:     return true
```

Closed-form equations for $L_1(\infty), L_2(\infty), \ldots, L_N(\infty)$ are precomputed offline from (26); therefore, the run-time computation is not required. The values of transition probabilities are substituted into the equations for $$L_1(\infty), L_2(\infty), \ldots, L_N(\infty)$$

and the objective and constraint functions of the NLP problem are generated by the algorithm. To solve the NLP problem, a brute-force search algorithm with a step of 0.1 is applied, as its performance was sufficient for the purposes of simulations. In MHOD-OPT, a decision to migrate a VM is made only if either no feasible solution can be found, or the migration probability corresponding to the current state is 1.

The justification for this is the fact that if a feasible solution exists and the migration probability is less than 1, then for the current conditions there is no hard requirement for an immediate migration of a VM.

Algorithm 4 The MHOD algorithm

```
Input: A CPU utilization history
Output: A decision on whether to migrate a VM
1:     if the CPU utilization history size > T_l then
2:         Convert the last CPU utilization value to a state
3:         Invoke the Multisize Sliding Window estimation to obtain the
           estimates of transition probabilities
4:         Invoke the MHOD-OPT algorithm
5:         return the decision returned by MHOD-OPT
6:     return false
```

The MHOD algorithm shown in Algorithm 4 can be viewed as a wrapper over the MHOD-OPT algorithm, which adds the Multisize Sliding Window workload estimation. During the initial learning phase $T_l$, which was set to 30 time steps, the algorithm does not migrate a VM. Once the learning phase is over, the algorithm applies the Multisize Sliding Window technique to estimate the probabilities of transitions between the states and invokes the MHOD-OPT algorithm passing the transition probability estimates as the argument. The result of the MHOD-OPT algorithm invocation is returned to the user.

The CPU Model

The proposed models and algorithms are suitable for both single core and multi-core CPU architectures. The capacity of a single core CPU is modeled in terms of its clock frequency F. A VM's CPU utilization $u_i$ is relative to the VM's CPU frequency $f_i$ and is transformed into a fraction of the host's CPU utilization U. These fractions are summed up over the N VMs allocated to the host to obtain the host's CPU utilization, as shown in (37).

$$U = F \sum_i^N f_i u_i. \quad (37)$$

For the purpose of the host overload detection problem, multi-core CPUs are modeled as proposed in [3]. A multi-core CPU with n cores each having a frequency f is modeled as a single core CPU with the nf frequency. In other words, F in (37) is replaced by nf. This simplification is justified, as applications and VMs are not tied down to a specific core, but can by dynamically assigned to an arbitrary core by a time-shared scheduling algorithm. The only physical constraint is that the CPU capacity allocated to a VM cannot exceed the capacity of a single core. Removing this constraint would require the VM to be executed on more than one core in parallel. However, automatic parallelization of VMs and their applications cannot be assumed.

Performance Evaluation on a Single Computing Server

Importance of Precise Workload Estimation

The purpose of this section is to show that the precision of the workload estimation technique is desirable to achieve high performance of the MHOD algorithm. To show this, an artificial workload was constructed that illustrates a case when the MHOD algorithm with the Multisize Sliding Window workload estimation leads to lower performance compared to MHOD-OPT due to its inability to adapt quickly enough to a highly non-stationary workload.

TABLE 1

An artificial non-stationary workload

|  | 0-60 s | 60-86 s | 86-160 s |
|---|---|---|---|
| $p_{00}$ | 1.0 | 0.0 | 1.0 |
| $p_{01}$ | 0.0 | 1.0 | 0.0 |
| $p_{10}$ | 1.0 | 0.0 | 1.0 |
| $p_{11}$ | 0.0 | 1.0 | 0.0 |

It is defined that the host can be in one of two possible states $\{0,1\}$, where the state 1 means that the host is being overloaded. Let the non-stationary workload be composed of a sequence of three stationary workloads, whose probabilities of transitions between the states are shown in Table 1. Simulations are used to evaluate the algorithms. For this experiment, the OTF constraint was set to 30%, and the sequence of window sizes for the Multisize Sliding Window workload estimation was (30, 40, 50, 60, 70, 80, 90, 100). The code of the simulations is written in Clojure. To foster and encourage reproducibility of experiments, the source code of the simulations has been made publicly available online.

TABLE 2

Comparison of MHOD, MHOD-OPT and OPT

|  | MHOD-30 | MHOD-OPT-30 | OPT-30 |
|---|---|---|---|
| OTF | 29.97% | 16.30% | 16.30% |
| Time | 87 | 160 | 160 |

The simulation results are shown in Table 2. According to the results, for the workload defined in Table 1 the MHOD-OPT algorithm provides exactly the same performance as the optimal offline algorithm (OPT). However, the MHOD algorithm migrates a VM at the beginning of the third stationary workload because it is not able to immediately recognize the change of the workload, as shown for $p_{00}$ and $p_{00}$ in FIG. 3, with reference to FIGS. 1 and 2.

In summary, even though the Multisize Sliding Window workload estimation provides high quality of estimation [22], in some cases it may result in an inferior performance of the MHOD algorithm compared to MHOD-OPT. This result was expected, as MHOD-OPT skips the estimation phase and utilizes the knowledge of real transition probabilities. The artificial workload used in this section was specifically constructed to show that imprecise workload estimation may lead to unsatisfactory performance of the MHOD algorithm. However, as shown in the next section, the MHOD algorithm performs closely to OPT for real-world workloads.

Evaluation Using Planetlab Workload Traces

In an environment with multiple hosts, the MHOD algorithm operates in a decentralized manner, where independent instances of the algorithm are executed on every host. Therefore, to evaluate the MHOD algorithm under a real-world workload, a single host with a quad-core CPU serving a set of heterogeneous VMs was simulated. The clock frequency of a single core of the host was set to 3 GHz, which according to the model introduced above transforms into 12 GHz. These CPU characteristics correspond to a mid-range Amazon EC2 physical server type [24]. The amount of the host's memory is assumed to be enough for the VMs. The CPU frequency of a VM was randomly set to one of the values approximately corresponding to the Amazon EC2 instance types: 1.7 GHz, 2 GHz, 2.4 GHz, and 3 GHz. The CPU utilization of the VMs was simulated based on the data provided as a part of the CoMon project, a monitoring infrastructure for PlanetLab [27]. The project provides the data measured every five minutes from more than a thousand VMs running in more than 500 locations around the world. For the experiments, ten days were randomly selected from the workload traces collected during March and April 2011.

For a simulation run, a randomly generated set of VMs with the CPU utilization traces assigned is allocated to the host. At each time step, the host overload detection algorithm makes a decision of whether a VM should be migrated from the host. The simulation runs until either the CPU utilization traces are over, or until a decision to migrate a VM is made by the algorithm. At the end of a simulation run, the resulting value of the OTF metric is calculated according to (11). The algorithm of assigning the workload traces to a set of VMs is presented in Algorithm 5. To avoid trivial cases and stress the algorithms with more dynamic workloads, the original workload traces were filtered. The maximum allowed OTF after the first 30 time steps was constrained to 10% and the minimum overall OTF was constrained to 20%. Using the workload assignment algorithm, 100 different sets of VMs that meet the defined OTF constraints were pregenerated. Every algorithm was run for each set of VMs.

Algorithm 5 The workload trace assignment algorithm

Input: A set of CPU utilization traces
Output: A set of VMs
1:     Randomly select the host's minimum CPU utilization at the time 0 from 80%, 85%, 90%, 95%, and 100%
2:     while the host's utilization < the threshold do
3:         Randomly select the new VM's CPU frequency
4:         Randomly assign a CPU utilization trace
5:         Add the new VM to the set of created VMs
6:     return the set of created VMs Benchmark Algorithms In addition to the optimal offline algorithm introduced above, a number of benchmark algorithms were implemented. The benchmark algorithms were run with different parameters to compare with the proposed MHOD algorithm. This section gives a brief overview of the benchmark algorithms; a detailed description of each of them is given in [3]. The first algorithm is a simple heuristic based on setting a CPU utilization threshold (THR), which monitors the host's CPU utilization and migrates a VM if the defined threshold is exceeded. This threshold-based heuristic was applied in a number of related works [40, 15, 16, 33]. The next two algorithms apply statistical analysis to dynamically adapt the CPU utilization threshold: based on the median absolute deviation (MAD), and on the interquartile range (IQR).

Two other algorithms are based on estimation of the future CPU utilization using local regression and a modification of the method robust to outliers, referred to as robust local regression. These algorithms are denoted Local Regression (LR) and Local Regression Robust (LRR) respectively. The LR algorithm is in line with the regression-based approach proposed by Guenter et al. [17]. Another algorithm continuously monitors the host's OTF and decides to migrate a VM if the current value exceeds the defined parameter. This algorithm is referred to as the OTF Threshold (OTFT) algorithm. The last benchmark algorithm, the OTF Threshold Migration Time (OTFTM) algorithm, is similar to OTFT; however, it uses an extended metric that includes the VM migration time:

$$OTF(t_o, t_a) = \frac{T_m + t_o}{T_m + t_a}, \quad (38)$$

where $t_o$ is the time, during which the host has been overloaded; $t_a$ is the total time, during which the host has been active; and $T_m$ is the VM migration time.

MHOD Compared with Benchmark Algorithms

To shorten state configuration names of the MHOD algorithm, they are referred to by denoting the thresholds between the utilization intervals. For example, a 3-state configuration ([0%,80%), [80%,100%), 100%) is referred to as 80-100. The following 2- and 3-state configurations of the MHOD algorithm were simulated: 80-100, 90-100, and 100 (a 2-state configuration). Each state configuration with the OTF parameter set to 10%, 20% and 30% was simulated. For experiments, the VM migration time was set to 30 secs.

In order to find out whether different numbers of states and different state configurations of the MHOD algorithm significantly influence the algorithm's performance in regard to the time until a migration and the resulting OTF value, paired t-tests were conducted. The tests on the produced time until a migration data for comparing MHOD 80-100 with MHOD 100 and MHOD 90-100 with MHOD 100 showed non-statistically significant differences with the p-values 0.20 and 0.34 respectively. This means that the simulated 2- and 3-state configurations of the MHOD algorithm on average lead to approximately the same time until a migration. However, there are statistically significant differences in the resulting OTF value produced by these algorithms: 0.023% with 95% Confidence Interval (CI) (0.001%, 0.004%) and p-value=0.033 for MHOD 100 compared with MHOD 80-100; and 0.022% with 95% CI (0.000%, 0.004%) and p-value=0.048 for MHOD 100 compared with MHOD 90-100. However, differences in the resulting OTF value in the order of less than 0.1% are not practically significant; therefore, the conclusion is that the simulated 2- and 3-state configurations produce approximately the same results. Further in this section, only the ([0%, 100%), 100%) 2-state configuration of MHOD is compared with the benchmark algorithms, as it requires simpler computations compared with the 3-state configurations.

Figure 4A:
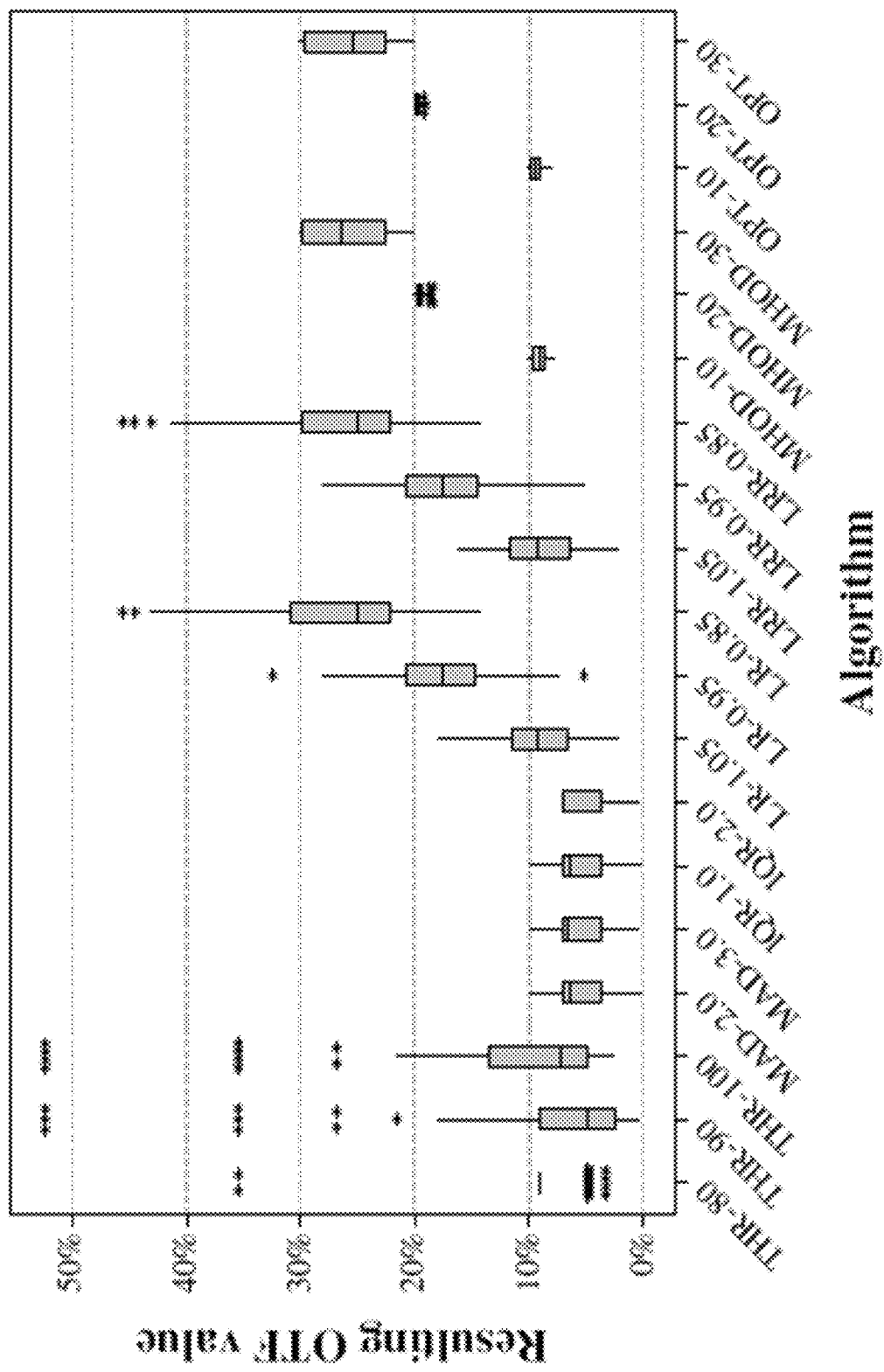
FIGS. 4A and 4B illustrate graphical representations of the resulting OTF value and time until a migration produced by the MHOD and benchmark algorithms according to the embodiments herein.
Figure 4B:
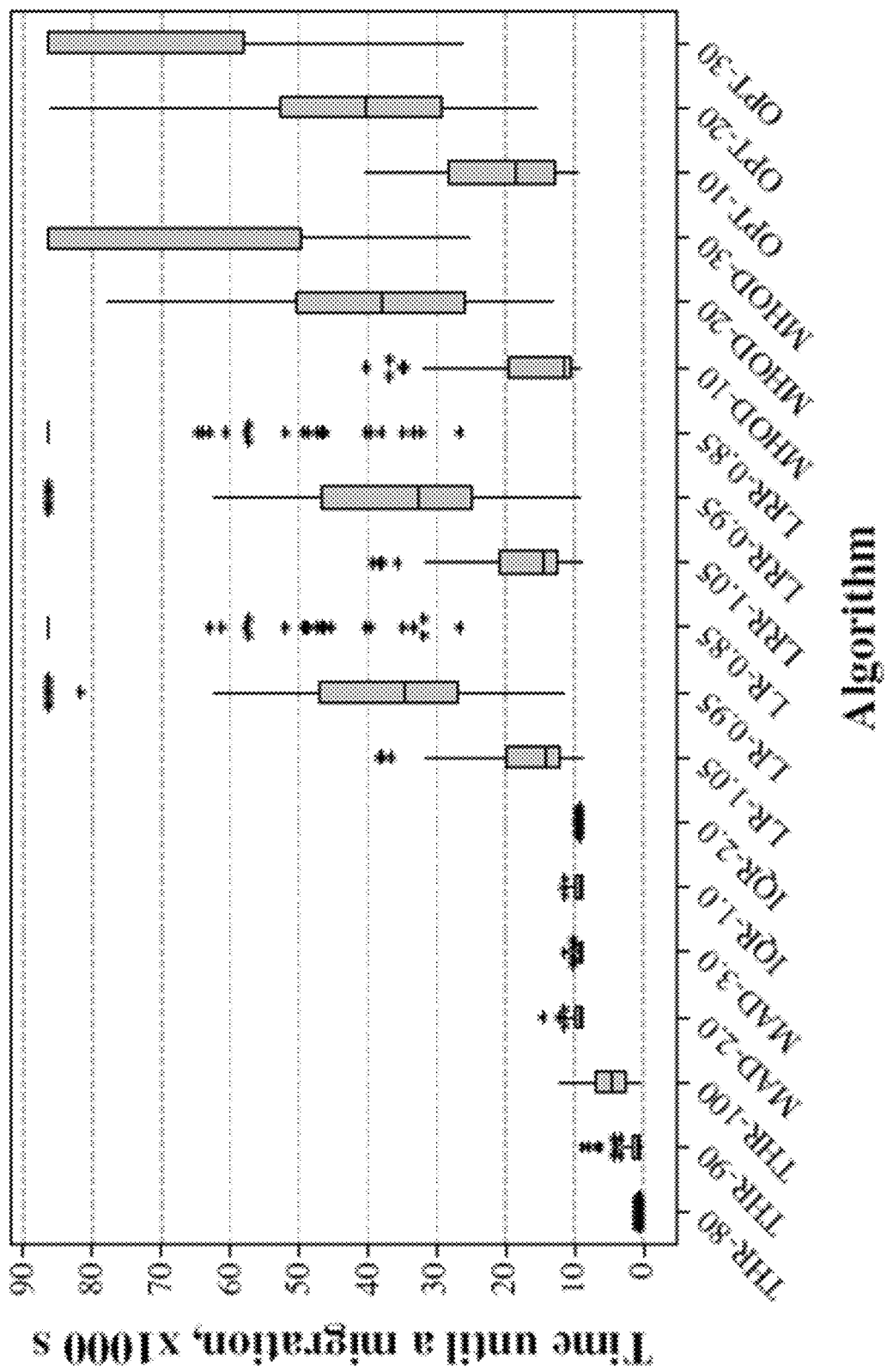

The experimental results comparing the 2-state configuration of the MHOD algorithm (for the MHOD algorithm, the OTF parameter is denoted in the suffix of the algorithm's name, e.g., for 10%, 20% and 30%: MHOD-10, MHOD-20 and MHOD-30) with the benchmark algorithms are depicted in FIGS. 4A and 4B, with reference to FIGS. 1 through 3. It is remarkable how closely the resulting OTF value of the MHOD algorithm resembles the value set as the parameter of the algorithm for 10% and 20%. The wider spread for 30% is explained by the characteristics of the workload: in many cases the overall OTF is lower than 30%, which is also reflected in the resulting OTF of the optimal offline algorithm (OPT-30). The experimental results show that the algorithm is capable of meeting the specified OTF goal, which is consistent with the theoretical model introduced above.

FIGS. 4A and 4B show that the THR, MAD, and IQR algorithms are not competitive compared with the LR, LRR and MHOD algorithms, as the produced time until a migration is low and does not significantly improve by adjustments of the algorithm parameters. To compare the LR and LRR algorithms with the MHOD algorithms, additional simulations of the MHOD algorithm with the OTF parameter matching the mean value of the resulting OTF produced by LR and LRR were conducted. The following OTF parameter values of the MHOD algorithm were set to match the mean resulting OTF values of LR and LRR: to match LR-1.05, LR-0.95 and LR-0.85—9.9%, 18.2% and 31% respectively; to match LRR-1.05, LRR-0.95 and LRR-0.85—9.9%, 17.9% and 30.4% respectively.

TABLE 3

Paired T-tests with 95% CIs for comparing the time until a migration produced by MHOD, LR and LRR

| Alg. 1 (×10³) | Alg. 2 (×10³) | Diff. (×10³) | p-value |
|---|---|---|---|
| MHOD (39.64) | LR (44.29) | 4.65 (2.73, 6.57) | <0.001 |
| MHOD (39.23) | LRR (44.23) | 5.00 (3.09, 6.91) | <0.001 |

As intended, paired t-tests for the comparison of MHOD with LR and MHOD with LRR showed non-statistically significant differences in the resulting OTF values with both p-values >0.9. Results of paired t-tests for comparing the time until a migration produced by the algorithms with matching resulting OTF values are shown in Table 3. The MHOD and LRR algorithms are graphically compared in FIG. 5, with reference to FIGS. 1 through 4B.

Figure 5:
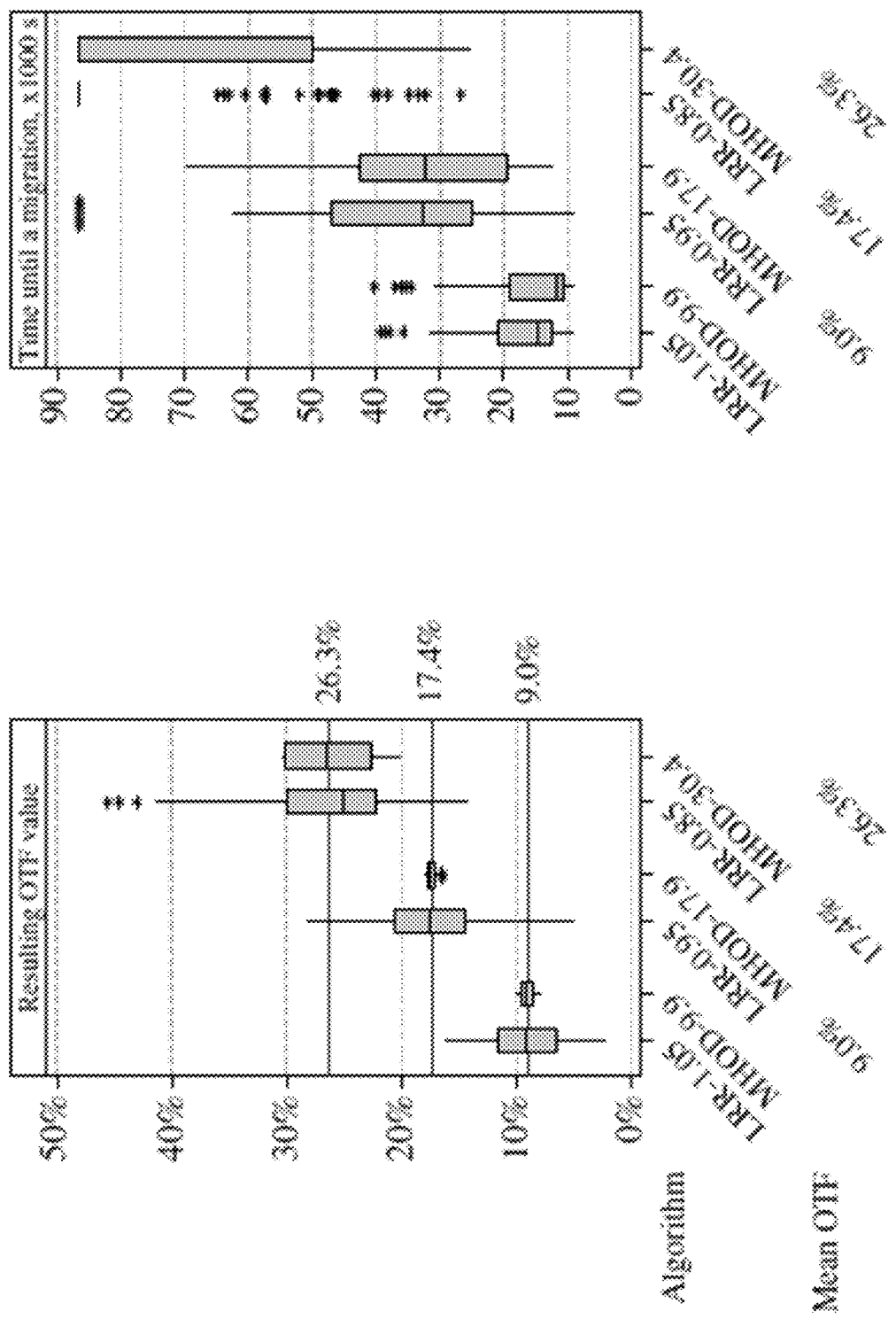
FIG. 5 illustrates a graphical representation of a comparison of MHOD with LRR according to an embodiment herein.

According to the results, there is a statistically significant difference in the time until a migration produced by the algorithms: the MHOD algorithm on average leads to approximately 10.5% and 11.3% shorter time until a migration than LR and LRR respectively with the same mean resulting OTF values. This means that the MHOD algorithm leads to a slightly lower quality of VM consolidation compared with the LR and LRR algorithms, while providing the advantage of explicit specification of a QoS goal in terms of the OTF metric. In contrast, the performance of the LR and LRR algorithms in regard to the QoS can only be adjusted indirectly by tuning the safety parameter. As seen in FIG. 5, the lower time until a migration produced of the MHOD algorithm can be partially explained by the fact that the spread of the resulting OTF produced by the LRR algorithm is much wider than that of MHOD, while MHOD precisely meets the specified QoS goal. This means that in many cases LRR provides worse QoS than MHOD, which leads to a higher time until a migration.

Comparison of MHOD with OTFT and OTFTM

OTFT and OTFTM are two other algorithms that apart from the MHOD algorithm allow explicit specification of the QoS goal in terms of the OTF parameter. To compare the performance of the OTFT, OTFTM and MHOD algorithms, another performance metrics introduced. This metric is the percentage of SLA violations relatively to the total number of VM migrations, where SLA requirements are defined as OTF≤M, M is the limit on the maximum allowed resulting OTF value. The SLA violation counter is incremented if after a VM migration the resulting OTF is higher than the value M specified in the SLAs.

Figure 6:
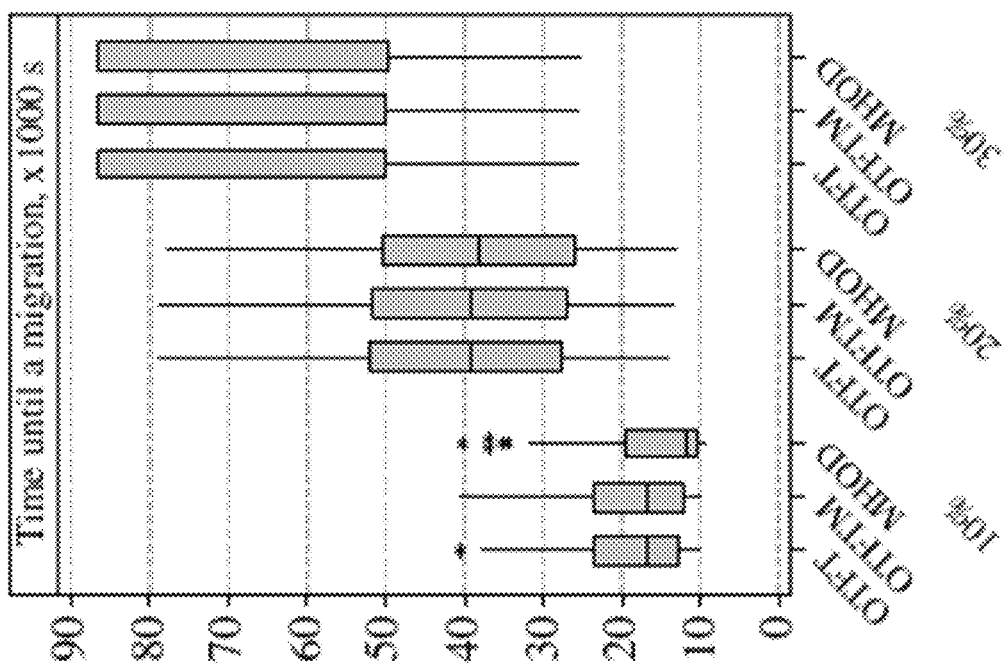
FIG. 6 illustrates a graphical representation of a comparison of OTFT, OTFTM, and MHOD according to an embodiment herein.
Figure 6:
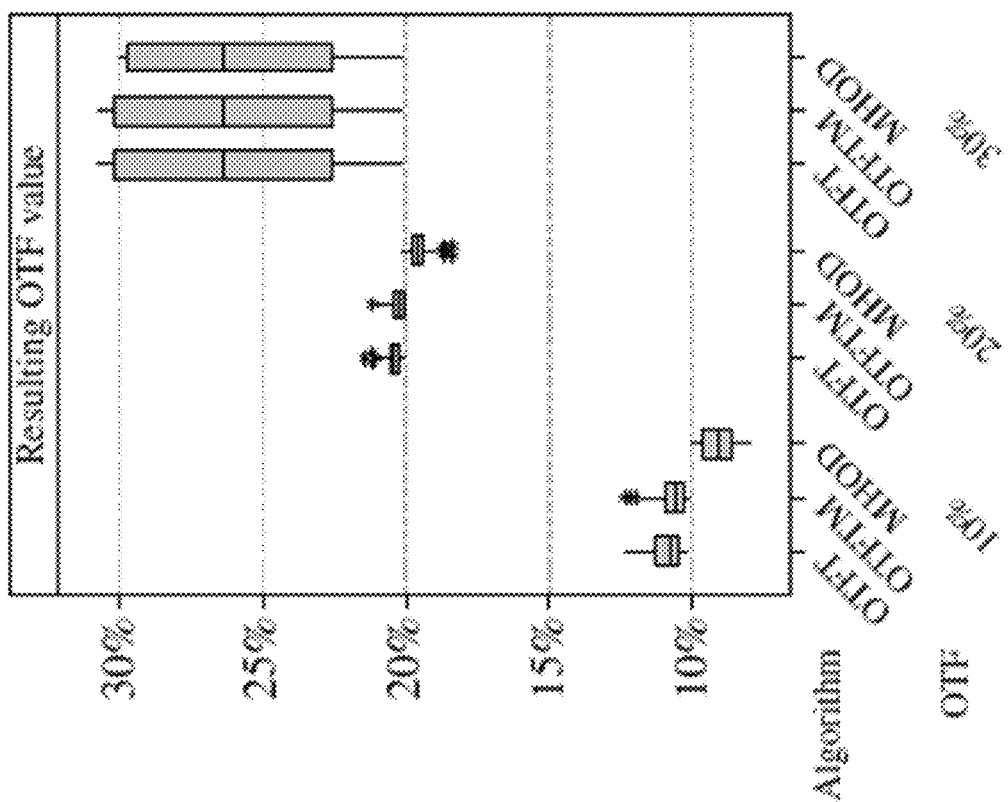

The OTFT, OTFTM and MHOD algorithms were simulated using the PlanetLab workload described earlier. The algorithms were simulated with the following values of the OTF parameter set as the SLA requirement: 10%, 20% and 30%. The simulation results are shown in FIG. 6, with reference to FIGS. 1 through 5. The graphs show that MHOD leads to slightly lower resulting OTF values and time until a migration. The SLA violation levels caused by the algorithms are shown in Table 4. It is clear that the MHOD algorithm substantially outperforms the OTFT and OTFTM algorithms in the level of SLA violations leading to only 0.33% SLA violations, whereas both OTFT and OTFTM cause SLA violations of 81.33%.

TABLE 4

SLA violations by OTFT, OTFTM and MHOD

| OTF Parameter | OTFT | OTFTM | MHOD |
|---|---|---|---|
| 10% | 100/100 | 100/100 | 0/100 |
| 20% | 100/100 | 100/100 | 1/100 |
| 30% | 44/100 | 44/100 | 0/100 |
| Overall | 81.33% | 81.33% | 0.33% |

The obtained results can be explained by the fact that both OTFT and OTFTM are unable to capture the overall behavior of the system over time and fail to meet the SLA requirements. In contrast, the MHOD algorithm leverages the knowledge of the past system states and by estimating future states avoids SLA violations. For instance, in a case of a steep rise in the load, OTFT and OTFTM react too late resulting in an SLA violation. In contrast, MHOD acts more intelligently and by predicting the potential rise migrates a VM before an SLA violation occurs. As a result, for the simulated PlanetLab workload the MHOD algorithm keeps the level of SLA violations at less than 0.5%.

Comparison of MHOD with OPT

FIGS. 4A and 4B include the results produced by the optimal offline algorithm (OPT) for the same values of the OTF parameter set for the MHOD algorithm: 10%, 20% and 30%. The results of paired t-tests comparing the performance of OPT with MHOD are shown in Table 5. The results show that there is no statistically significant difference in the resulting OTF value, which means that for the simulated PlanetLab workload the MHOD algorithm on average leads to approximately the same level of adherence to the QoS goal as the optimal offline algorithm.

TABLE 5

Paired T-tests for comparing MHOD with OPT

|  | OPT | MHOD | Difference | p-value |
|---|---|---|---|---|
| OTF | 18.31% | 18.25% | 0.06% (−0.03, 0.15) | =0.226 |
| Time | 45,767 | 41,128 | 4,639 (3617, 5661) | <0.001 |

There is a statistically significant difference in the time until a migration with the mean difference of 4,639 with 95% CI: (3617, 5661). Relatively to OPT, the time until a migration produced by the MHOD algorithm converts to 88.02% with 95% CI: (86.07%, 89.97%). This means that for the simulated PlanetLab workload, the MHOD algorithm on average delivers approximately 88% of the performance of the optimal offline algorithm, which is highly efficient for an online algorithm.

Figure 7:
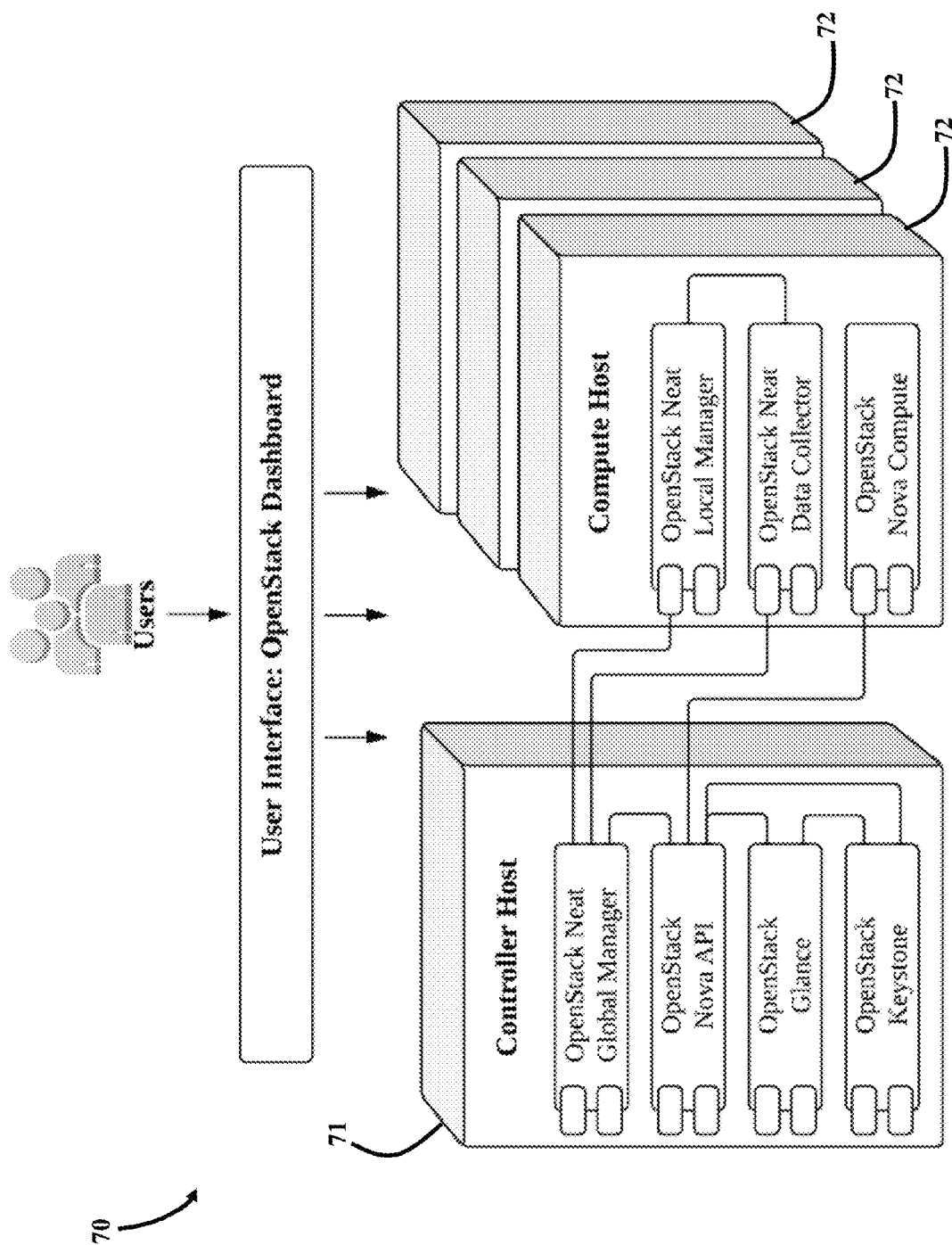
FIG. 7 illustrates a schematic diagram of the combined deployment of OpenStack and OpenStack Neat according to an embodiment herein.

System Architecture and Implementation for Dynamic VM Consolidation in a Cloud Data Center This section introduces an architecture and implementation of OpenStack Neat, a software framework (computer program product) for distributed dynamic VM consolidation in Cloud data centers based on the OpenStack platform. The framework is designed and implemented as a transparent add-on to OpenStack, which means that the OpenStack installation need not be modified or specifically configured to benefit from OpenStack Neat. FIG. 7, with reference to FIGS. 1 through 6, depicts a typical system 70 deployment of the key components of OpenStack and OpenStack Neat, which may include multiple instances of compute 71 and controller hosts 72. The framework acts independently of the base OpenStack platform and applies VM consolidation processes by invoking public Application Programming Interfaces (APIs) of OpenStack. The purpose of the OpenStack Neat framework is twofold: (1) providing a fully operational software for dynamic VM consolidation that can be applied to existing OpenStack Clouds; and (2) providing an extensible software framework for conducting research on dynamic VM consolidation.

OpenStack Neat is designed and implemented following the distributed approach to dynamic VM consolidation introduced previous sections. The target environment is an IaaS, e.g., Amazon EC2, where the provider is unaware of applications and workloads served by the VMs, and can only observe them from outside. The proposed approach to distributed dynamic VM consolidation consists in splitting the problem into four sub-problems: underload/overload detection, VM selection, and VM placement.

The current implementation of OpenStack Neat assumes a single instance of the controller responsible for placing VMs selected for migrations on hosts. However, due to distributed underload/overload detection and VM selection algorithms, the overall scalability is significantly improved compared with existing centralized solutions. Furthermore, it is potentially possible to implement replication of OpenStack Neat's global manager, which would provide a completely distributed system, as discussed below.

Related Work in System Context

Research work can be divided into two categories: (1) theoretical work on various approaches to dynamic VM consolidation; and (2) practically implemented and publicly available software systems. The framework presented in this case study follows the distributed approach to dynamic VM consolidation proposed in the previous sections, where every compute host locally solves the problems of underload/overload detection and VM selection. Then, it sends a request to a global manager to place only the selected for migration VMs on other hosts.

A similar approach was followed by Wood et al. [36] in their system called Sandpiper aimed at load balancing in virtualized data centers using VM live migration. The main objective of the system is to avoid host overloads referred to as hot spots by detecting them and migrating overloaded VMs to less loaded hosts. The authors applied an application-agnostic approach, referred to as a black-box approach, in which VMs are observed from outside, without any knowledge of applications resident in the VMs. A hot spot is detected when the aggregate usage of a host's resources exceeds the specified threshold for k out of n last measurements, as well as for the next predicted value. Another proposed approach is gray-box, when a certain application-specific data are allowed to be collected. The VM placement is computed heuristically by placing the most loaded VM to the least loaded host. The difference from the approach proposed in this case study is that VMs are not consolidated; therefore, the number of active hosts is not reduced to save energy.

Despite the large volume of research published on the topic of dynamic VM consolidation, there are very few software implementations publicly available online. One of the earliest implementation of a VM consolidation manager is the Entropy project. Entropy is a VM consolidation manager for homogeneous clusters developed by Hermenier et al. [18] and released under the LGPL license. Entropy is built on top of Xen and focused on two objectives: (1) maintaining a configuration of the cluster, where all VMs are allocated sufficient resources; and (2) minimizing the number of active hosts.

To optimize the VM placement, Entropy applies a two-phase approach. First, a constraint programming problem is solved to find an optimal VM placement, which minimizes the number of active hosts. Then, another optimization problem is solved to find a target cluster configuration with the minimal number of active hosts that also minimizes the total cost of reconfiguration, which is proportional to the cost of VM migrations. In comparison to OpenStack Neat, Entropy may find a more optimal VM placement by computing a globally optimal solution for VM placement. However, the required optimization problems must be solved by a central controller with limited opportunities for replication, thus limiting the scalability of the system and introducing a single point of failure. This approach is applicable to relatively small-scale private Clouds; however, it cannot be applied to large-scale data centers with tens of thousands of nodes, such as Rackspace [28], where decentralization and fault-tolerance are essential.

Feller et al. [12, 13] proposed and implemented a framework for distributed management of VMs for private Clouds called Snooze. In addition to the functionality provided by the existing Cloud management platforms, such as OpenStack, Eucalyptus, and OpenNebula, Snooze implements dynamic VM consolidation as one of its base features. Another difference is that Snooze implements hierarchical distributed resource management. The management hierarchy is composed of three layers: local controllers on each physical node; group managers managing a set of local controllers; and a group leader dynamically selected from the set of group managers and performing global management tasks. The distributed structure enables fault-tolerance and self-healing by avoiding single points of failure and automatically selecting a new group leader if the current one fails.

Snooze also integrates monitoring of the resource usage by VMs and hosts, which can be leveraged by VM consolidation policies. These policies are intended to be implemented at the level of group managers, and therefore can only be applied to subsets of hosts. This approach partially solves the problem of scalability of VM consolidation by the cost of losing the ability of optimizing the VM placement across all the nodes of the data center. OpenStack Neat enables scalability by distributed underload/overload detection and VM selection, and potentially replicating the VM placement controllers. In contrast to Snooze, it is able to apply global VM placement algorithms for the selected for migration VMs by taking into account the full set of hosts. Another difference is that OpenStack Neat transparently integrates with OpenStack, a Cloud platform widely adopted and supported by the industry, thus ensuring long-term development of the platform.

System Design

The aim of the OpenStack Neat project is to provide an extensible framework for dynamic consolidation of VMs based on the OpenStack platform. Extensibility in this context means the ability to implement new VM consolidation algorithms and apply them in OpenStack Neat without the necessity to modify the source code of the framework itself. Different implementations of the algorithms can be plugged into the framework by modifying the appropriate options in the configuration file. More information on configuring and extending the framework is given below.

OpenStack Neat provides an infrastructure required for monitoring VMs and hypervisors, collecting resource usage data, transmitting messages and commands between the system components, and invoking VM live migrations. The infrastructure is agnostic to VM consolidation algorithms in use and allows implementing custom decision-making algorithms for each of the four sub-problems of dynamic VM consolidation: host underload/overload detection, VM selection, and VM placement. The implementation of the framework includes the algorithms proposed in sections. The following sections discuss the requirements and assumptions, integration of the proposed framework with OpenStack, each of the framework's components, as well as configuration and extensibility of the framework.

Requirements and Assumptions

The components of the framework are implemented in the form of OS services running on the compute and controller hosts of the data center in addition to the core OpenStack services. The framework components interact through a Representational State Transfer (REST) interface; therefore, network communication via the corresponding port specified in the framework's configuration must be enabled.

OpenStack Neat relies on live migration to dynamically relocate VMs across physical machines. To enable live migration, it is required to set up a shared storage and correspondingly configure OpenStack Nova (i.e. the OpenStack Compute service) to use this storage for storing VM instance data. For instance, a shared storage can be provided using the Network File System (NFS), or the GlusterFS distributed file system [5].

OpenStack Neat uses a database for storing information about VMs and hosts, as well as resource usage data. It is possible to use the same database server used by the core OpenStack services. In this case, it is only required to create a new database and user for OpenStack Neat. The required database tables are automatically created by OpenStack Neat on the first launch of its services.

Another requirement is that all the compute hosts must have a user, which is enabled to switch the host into a low-power mode, such as Suspend to RAM. This user account is used by the global manager to connect to the compute hosts via the Secure Shell (SSH) protocol and switch them into the sleep mode when necessary. More information on deactivating and reactivating physical nodes is given below.

Since OpenStack Neat is implemented in Python, VM consolidation algorithms to be plugged in should also be implemented in Python. It may be required to implement VM consolidation algorithms in another programming language for various reasons, such as performance requirements. Integration of such algorithms can be achieved by providing Python wrappers that redirect calls to the corresponding external programs.

Integration with OpenStack

OpenStack Neat services are installed independently of the core OpenStack services. Moreover, the activity of the OpenStack Neat services is transparent to the core OpenStack services. This means that OpenStack does not need to be configured in a special way to be able to take advantage of dynamic VM consolidation implemented by OpenStack Neat. It also means, that OpenStack Neat can be added to an existing OpenStack installation without the need to modify its configuration.

The transparency is achieved by the independent resource monitoring implemented by OpenStack Neat, and the interaction with the core OpenStack services using their public APIs. The OpenStack APIs are used for obtaining information about the current state of the system and performing VM migrations. In particular, the APIs are used to get the current mapping of VMs to hosts, hardware characteristics of hosts, parameters of VM flavors (i.e., instance types), VM states, and invoke VM live migrations. Although OpenStack Neat performs actions affecting the current state of the system by relocating VMs across hosts, it is transparently handled by the core OpenStack services since VM migrations are invoked via the public OpenStack APIs, which is equivalent to invoking VM migrations manually by the system administrator.

In the following sections, hosts running the Nova Compute service; i.e., hosting VM instances, are referred to as compute hosts; and a host running the other OpenStack management services but not hosting VM instances is referred to as the controller host.

System Components

Figure 8:
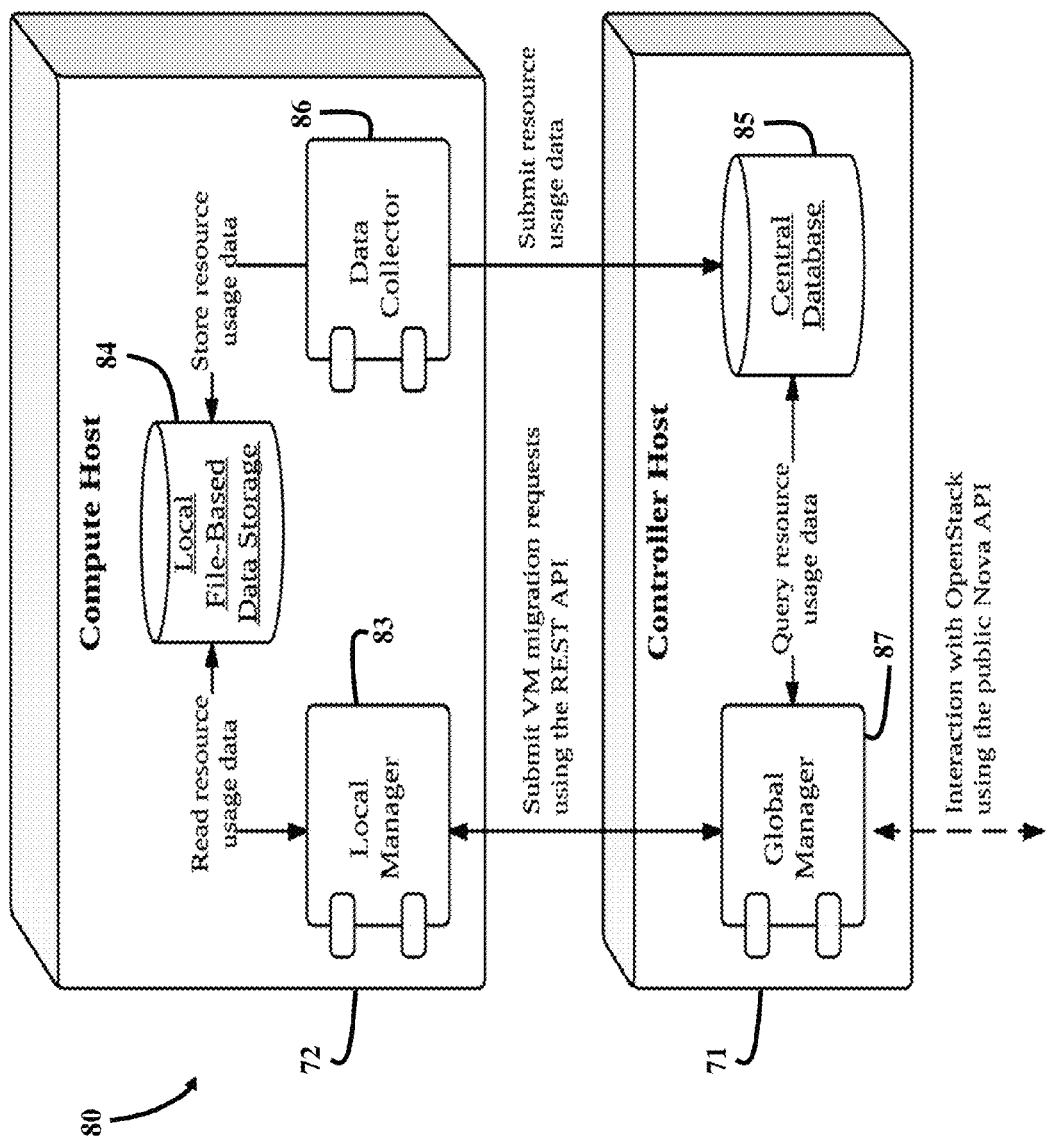
FIG. 8 illustrates a system view of a deployment process according to an embodiment herein.

OpenStack Neat is composed of a number of components and data stores, some of which are deployed on the compute hosts 72, and some on the controller host 71, which can potentially have multiple replicas. As shown in FIG. 8, with reference to FIGS. 1 through 7, the system 80 is composed of three main components:

- Global manager 87—a component that is deployed on the controller host 71 and makes global management decisions, such as mapping VM instances to hosts, and initiating VM live migrations.
- Local manager 83—a component that is deployed on every compute host 72 and makes local decisions, such as deciding that the host is underloaded or overloaded, and selecting VMs to migrate to other hosts.
- Data collector 86—a component that is deployed on every compute host 72 and is responsible for collecting data on the resource usage by VM instances and hypervisors, and then storing the data locally 84 and submitting it to the central database 85.

The deployment model may vary for each particular system 80 depending on its requirements. For instance, the central database 85 can be deployed on a separate physical node, or be distributed across multiple physical nodes. The location and deployment of the database server (e.g., central database 85) is transparent to OpenStack Neat, which only requires a configuration parameter to be set to the network address of the database front-end server. For simplicity, in the experimental testbed used in this case study, the database server (e.g., central database 85) is deployed on the same physical node hosting the global manager 87, as shown in FIG. 8.

The Global Manager

The global manager 87 is deployed on the controller host 71 and is responsible for making VM placement decisions and initiating VM migrations. It exposes a REST web service, which accepts requests from local managers 83. The global manager 87 processes two types of requests: (1) relocating VMs from an underloaded host; and (2) offloading a number of VMs from an overloaded host.

Figure 9:
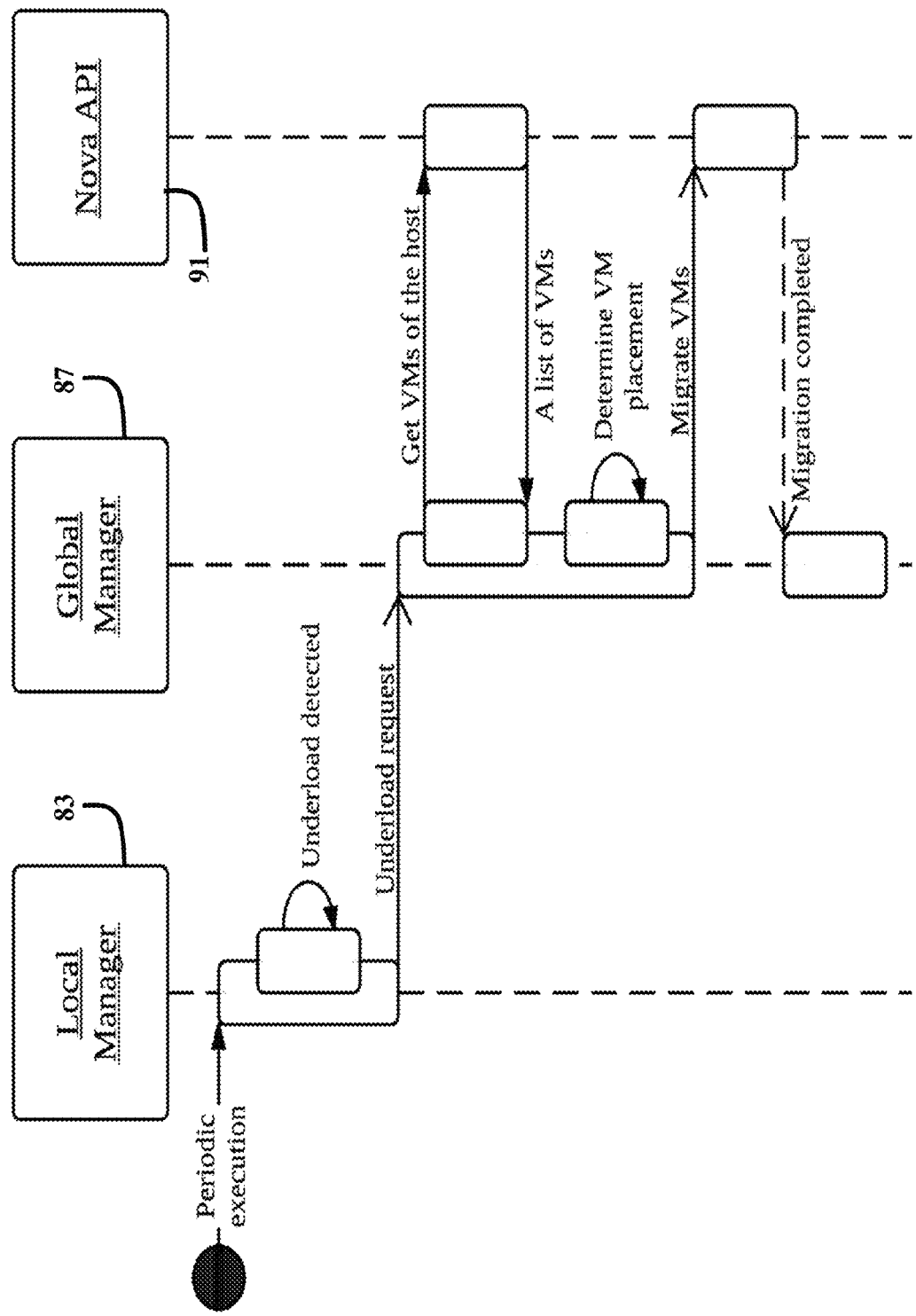
FIG. 9 illustrates a schematic diagram of a global manager including a sequence diagram of handling an underload request according to an embodiment herein.

FIG. 9, with reference to FIGS. 1 through 8, shows a sequence diagram of handling a host underload request by the global manager 87. First, a local manager 83 detects an underload of the host using the specified in the configuration underload detection algorithm. Then, it sends an underload request to the global manager 87 including the name of the underloaded host. The global manager 87 calls the OpenStack Nova API 91 to obtain the list of VM currently allocated to the underloaded host. Once the list of VMs is received, the global manager 87 invokes the VM placement algorithm with the received list of VMs along with their resource usage and states of hosts fetched from the database as arguments. Then, according to the VM placement generated by the algorithm, the global manager 87 submits the appropriate VM live migration requests to the OpenStack Nova API 91, and monitors the VM migration process to determine when the migrations are completed. Upon the completion of the VM migrations, the global manager 87 switches the now idle source host into the sleep mode using the procedure described below.

Figure 10:
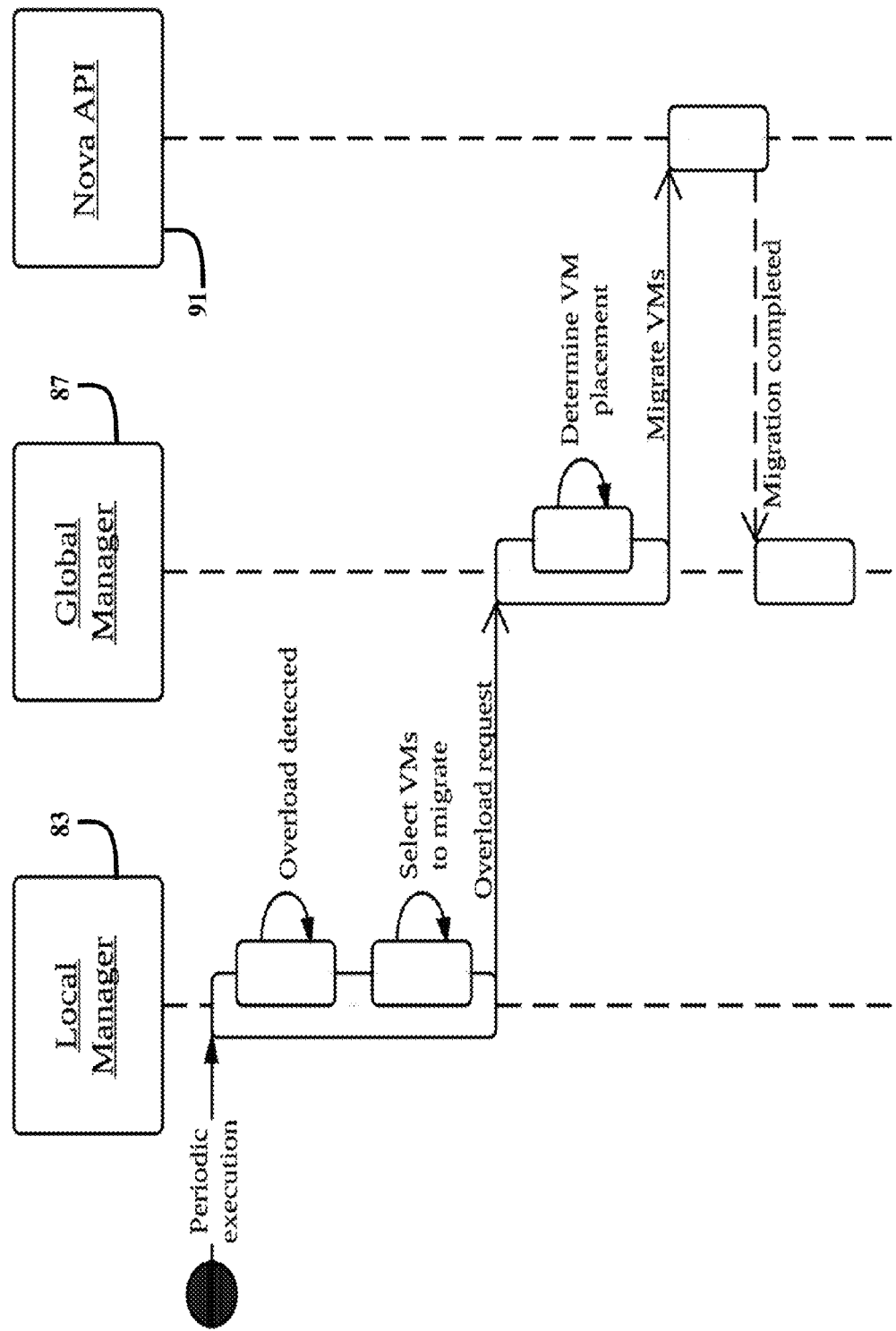
FIG. 10 illustrates a schematic diagram of a global manager including a sequence diagram of handling an overload request according to an embodiment herein.

As shown in FIG. 10, with reference to FIGS. 1 through 9, handling overload requests is similar to underload requests. The difference is that instead of sending just the host name, the local manager 83 also sends a list of UUIDs of the VMs selected by the configured VM selection algorithm to be offloaded from the overloaded host. Once the request is received, the global manager 87 invokes the specified in the configuration VM placement algorithm and passes as arguments the list of VMs received from the local manager 83 to be placed on other hosts along with other system information. If some of the VMs are placed on hosts that are currently in the sleep mode, the global manager reactivates them using the Wake-on-LAN technology, as described below. Then, similarly to handling underload requests, the global manager 87 submits VM live migration requests to the OpenStack Nova API 91.

Rest API

The global manager exposes a REST web service (REST API) for processing VM migration requests sent by local managers. The service Uniform Resource Locator (URL) is defined according to configuration options specified in /etc/neat/neat.conf, which is discussed in detail below. The two relevant options are:

- global_manager_host—the name of the host running the global manager;
- global_manager_port—the port that should be used by the web service to receive requests.

Using these configuration options, the service URL is composed according to the following template: http://global_manager_host:global_manager_port/. The global manager 87 processes two types of requests from local managers 83: host underloads, and host overloads discussed in the previous section. Both types of requests are served at a single resource '/' accessed using the PUT method of the Hypertext Transfer Protocol (HTTP). The type of a received request is determined by the global manager 87 by analyzing the parameters included in the request. The following parameters are common to both types of requests:

- username—the admin user name specified in the configuration file, which is used to authenticate the client making the request as being allowed to access the web service. This parameter is sent SHA-1-encrypted to avoid sending the user name in the open form over the network.
- password—the admin password specified in the configuration file, which is used to authenticate the client making the request as being allowed to access the web service. Similarly to username, this parameter is also sent encrypted with the SHA-1 algorithm.
- time—the time when the request has been sent. This parameter is used by the global manager to identify and enforce time-outs, which may happen if a request has been sent a long time ago rendering it non-representative of the current state of the system.
- host—the host name of the overloaded or underloaded host, where the local manager sending the request is deployed on.
- reason—an integer specifying the type of the request, where 0 represents a host underload request, and 1 represents a host overload request.

If the request type specified by the reason parameter is 1 (i.e., denoting an overload request), there is an extra mandatory parameter vm_uuids. This is a string parameter, which must contain a coma-separated list of Universally Unique Identifiers (UUIDs) of VMs selected for migration from the overloaded host.

If a request contains all the required parameters and the provided credentials are correct, the service responds with the HTTP status code 200 OK. The service uses standard HTTP error codes to respond in cases of errors. The following error codes are used:

- 400—bad input parameter: incorrect or missing parameters;
- 401—unauthorized: user credentials are missing;
- 403—forbidden: user credentials do not much the ones specified in the configuration file;
- 405—method not allowed: the request has been made with a method other than the only supported PUT method;
- 422—precondition failed: the request has been sent more than 5 seconds ago, which means that the states of the hosts or VMs may have changed—a retry is required.

Switching Power States of Hosts

One of the main features required to be supported by the hardware and OS in order to take advantage of dynamic VM consolidation to save energy is the Advanced Configuration and Power Interface (ACPI). The ACPI standard defines platform-independent interfaces for power management by the OS. The standard is supported by Linux, the target OS for the OpenStack platform. ACPI defines several sets of power states, the most relevant of which is the sleep state S3, referred to as Suspend to RAM. Meisner et al. [23] showed that power consumption of a typical blade server can be reduced from 450 W in the active state to just 10.4 W in the S3 state. The transition latency is currently mostly constrained by the Power Supply Unit (PSU) of the server, which leads to the total latency of approximately 300 ms. This latency is acceptable for the purposes of dynamic VM consolidation, as VM live migrations usually take tens of seconds.

The Linux OS provides an API to programmatically switch the physical machine into the sleep mode. In particular, CentOS supports a pm-utils package, which includes command line programs for changing the power state of the machine. First, to check whether the Suspend to RAM state is supported, the following command can be used: pm-is-supported—suspend. If the command returns 0, the Suspend to RAM state is supported, otherwise it is not supported. If the state is supported, the following command can be used to enable it: pm-suspend.

It is possible to reactivate a physical machine over the network using the Wake-on-LAN technology. This technology has been introduced in 1997 by the Advanced Manageability Alliance (AMA) formed by Intel and IBM, and is currently supported by most modern servers. To reactivate a server using Wake-on-LAN, it is necessary to send over the network a special packet, called the magic packet. This can be done using the ether-wake Linux program as follows: ether-wake-i interface mac_address, where interface is replaced with the name of the network interface to send the packet from, and mac_address is replaced with the actual Media Access Control (MAC) address of the host to be reactivated.

The Local Manager

Figure 11:
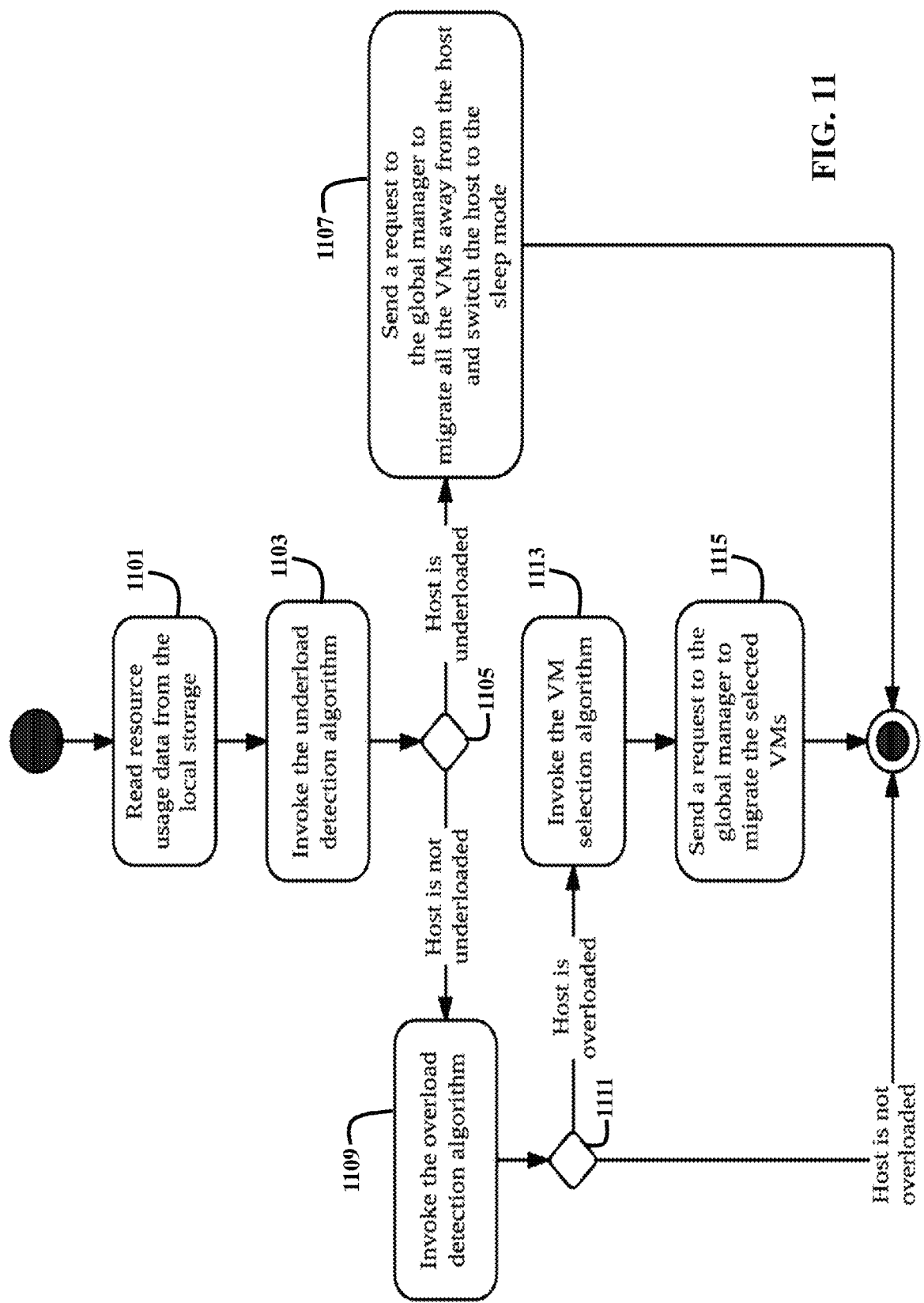
FIG. 11 illustrates a block diagram of a local manager including an activity diagram according to an embodiment herein.

The local manager component 83 is deployed on every compute host as an OS service running in the background. The service periodically executes a function that determines whether it is necessary to reallocate VMs from the host. A high-level view of the workflow performed by the local manager 83 is shown in FIG. 11, with reference to FIGS. 1 through 10. At the beginning of each iteration it reads (1101) from the local storage 84 the historical data on the resource usage by the VMs and hypervisor stored by the data collector 86. Then, the local manager 83 invokes (1103) the specified in the configuration underload detection algorithm to determine (1105) whether the host is underloaded. If the host is underloaded, the local manager sends (1107) an underload request to the global manager's REST API to migrate all the VMs from the host and switch the host to a low-power mode.

If the host is not underloaded, the local manager proceeds to invoking (1109) the specified in the configuration overload detection algorithm. Then, another decision process (1111) occurs. If the host is overloaded, the local manager invokes (1113) the configured VM selection algorithm to select VMs to offload from the host. Once the VMs to migrate from the host are selected, the local manager sends (1115) an overload request to the global manager's REST API to migrate the selected VMs. Similar to the global manager 87, the local manager 83 can be configured to use custom underload detection, overload detection, and VM selection algorithms using the configuration file discussed below.

The Data Collector

The data collector 86 is deployed on every compute host 72 as an OS service running in the background. The service periodically collects the CPU utilization data for each VM running on the host, as well as data on the CPU utilization by the hypervisor. The collected data are stored in the local file-based data store 84, and also submitted to the central database 85. The data are stored as the average number of MHz consumed by a VM during the last measurement interval of length T. In particular, the CPU usage $C_i^v(t_0,t_1)$ of a VM i, which is a function of the bounds of a measurement interval $[t_0,t_1]$, is calculated as shown in (39).

$$C_i^v(t_0, t_1) = \frac{n_i^v F(\tau_i^v(t_1) - \tau_i^v(t_0))}{t_1 - t_0}, \tag{39}$$

where $n_i^v$ is the number of virtual CPU cores allocated to the VM i; F is the frequency of a single CPU core in MHz; and $\tau_i^v(t)$ is the CPU time consumed by the VM i up to the time t. The CPU usage of the hypervisor $C_j^h(t_0,t_1)$ is calculated as a difference between the overall CPU usage and the CPU usage by the set of VMs allocated to the host, as shown in (40).

$$C_j^h(t_0, t_1) = \frac{n_j^h F(\tau_j^h(t_1) - \tau_j^h(t_0))}{t_1 - t_0} - \sum_{i \in V_j} C_i^v(t_0, t_1), \tag{40}$$

where $n_j^h$ is the number of physical cores of the host j; $\tau_j^h(t)$ is the CPU time consumed by the host overall up to the time t; and $V_j$ is the set of VM allocated to the host j. The CPU usage data are stored as integers. This data format is portable: the stored values can be approximately converted to the CPU utilization percentages for any host or VM type, supporting heterogeneous hosts and VMs.

The actual data are obtained using libvirt's API in the form of the CPU time consumed by VMs and hosts overall to date. Using the CPU time collected at the previous time step, the CPU time for the last time interval is calculated. According to the CPU frequency of the host and the length of the time interval, the CPU time is converted into the required average MHz consumed by the VM over the last time interval. Then, using the VMs' CPU utilization data, the CPU utilization by the hypervisor is calculated. The collected data are stored both locally 84 and submitted to the central database 85. The number of the latest data values to be stored locally and passed to the underload/overload detection and VM selection algorithms is defined by the data_collector_data_length option in the configuration file.

At the beginning of every iteration, the data collector 86 obtains the set of VMs currently running on the host using the Nova API 91 and compares them to the VMs running on the host at the previous time step. If new VMs have been found, the data collector fetches the historical data about them from the central database 85 and stores the data in the local file-based data store 84. If some VMs have been removed, the data collector 86 removes the data about these VMs from the local data store 84.

While OpenStack Neat oversubscribes the CPU of hosts by taking advantage of information on the real-time CPU utilization, it does not overcommit RAM. In other words, RAM is still a constraint in placing VMs on hosts; however, the constraint is the maximum amount of RAM that can be used by a VM statically defined by its instance type, rather than the real-time RAM consumption. One of the reasons for that is that RAM is a more critical resource compared with the CPU, as an application may fail due to insufficient RAM, whereas insufficient CPU may just slow down the execution of the application. Another reason is that in contrast to the CPU, RAM usually does not become a bottleneck resource, as shown by an analysis of workload traces and information from the industry [29, 1].

Data Stores

As shown in FIG. 8, the system 80 contains two types of data stores:

Central database 85—a database server, which can be deployed either on the controller host 71, or on one or more dedicated hosts (not shown).

Local file-based data storage 84—a data store deployed on every compute host 72 and used for temporary caching the resource usage data to use by the local managers 83 in order to avoid excessive database queries.

The details about the data stores are given in the following subsections.

Central Database

The central database 85 is used for storing historical data on the resource usage by VMs and hypervisors, as well as hardware characteristics of hosts. The central database 85 is populated by the data collectors 86 deployed on compute hosts 72. There are two main use cases when the data are retrieved from the central database 85 instead of the local storage 84 of the compute hosts 72. First, it is used by local managers 83 to fetch the resource usage data after VM migrations. Once a VM migration is completed, the data collector 86 deployed on the destination host fetches the required historical data from the central database 85 and stores them locally 84 for use by the local manager 83.

The second use case of the central database 85 is when the global manager 87 computes a new placement of VMs on hosts. VM placement algorithms require information on the resource consumption of all the hosts in order to make global allocation decisions. Therefore, every time there is a need to place VMs on hosts, the global manager 87 queries the central database 85 to obtain the up-to-date data on the resource usage by hypervisors and VMs.

TABLE 6

| The database schema: | |
|---|---|
| Field | Type |
| The hosts table | |
| id | Integer |
| hostname | String(255) |
| cpu_mhz | Integer |
| cpu_cores | Integer |
| ram | Integer |
| The host_resource_usage table | |
| id | Integer |
| host-id | Integer |

TABLE 6-continued

| The database schema: | |
|---|---|
| Field | Type |
| timestamp | DateTime |
| cpu_mhz | Integer |
| The vms table | |
| id | Integer |
| uuid | String(36) |
| The vm_resource_usage table | |
| id | Integer |
| vm_id | Integer |
| timestamp | DateTime |
| cpu_mhz | Integer |

As shown in Table 6, the database schema contains four main tables: hosts, host_resource_usage, vms, and vm_resource_usage. The hosts table stores information about hosts, such as the host names, CPU frequency of a physical core in MHz, number of CPU cores, and amount of RAM in MB. The vms table stores the UUIDs of VMs assigned by OpenStack. The host_resource_usage and vm_resource_usage tables store data on the resource consumption over time by hosts and VMs respectively.

Local File-Based Data Store

A local manager 83 at each iteration requires data on the resource usage by the VMs and hypervisor of the corresponding host in order to pass them to the underload/overload detection and VM placement algorithms. To reduce the number of queries to the central database 85 over the network (e.g., network 1425 in FIG. 14), apart from submitting the data into the central database 85, the data collector 86 temporarily stores the data locally 84. This way, the local manager 83 can just read the data from the local file storage 84 and avoid having to retrieve data from the central database 85.

The data collector 86 stores the resource usage data locally 84 in local_data_directory/vms/ as plain text files, where local_data_directory is defined in the configuration file discussed below. The data for each VM are stored in a separate file named after the UUID of the VM. The data on the resource usage by the hypervisor are stored in the local_data_directory/host file. The format of the files is a new line separated list of integers representing the average CPU consumption in MHz during measurement intervals.

Configuration

The configuration of OpenStack Neat is stored in the /etc/neat/neat.conf file in the standard INI format using the '#' character for denoting comments. It is assumed that this file exists on all the compute and controller hosts and contains the same configuration.

One of the ideas implemented in OpenStack Neat is providing the user with the ability to change the implementation and parameters of any of the four VM consolidation algorithms simply by modifying the configuration file. This provides the means of adding to the system and enabling custom VM consolidation algorithms without modifying the source code of the framework. The algorithms are configured using the options with the algorithm_prefix. More information on adding and enabling VM consolidation algorithms is given below.

Extensibility of the Framework

One of the main points of the framework's extensibility is the ability to add new VM consolidation algorithm to the system and enable them by updating the configuration file without the necessity in modifying the source code of the framework itself. There are four algorithms that can be changed through a modification of the configuration file: underload/overload detection, VM selection, and VM placement algorithms. The values of the corresponding configuration options should be fully qualified names of functions available as a part of one of the installed Python libraries. The fact that the functions are specified by their fully qualified names also means that they can be installed as a part of a Python library independent from OpenStack Neat. The four corresponding configuration options are the following:
1. algorithm_underload_detection_factory
2. algorithm_overload_detection_factory
3. algorithm_vm_selection_factory
4. algorithm_vm_placement_factory Since an algorithm may need to be initialized prior to its usage, the factory function pattern is applied. The functions specified as values of any of the algorithm_*_factory configuration options are not functions that actually implement VM consolidation algorithms, rather they are functions that return initialized instances of functions implementing the corresponding VM consolidation algorithms. All functions implementing VM consolidation algorithms and their factories should adhere to the corresponding predefined interfaces. For example, all factory functions of overload detection algorithms must accept a time step, migration time, and algorithm parameters as arguments. The function must return another function that implements the required consolidation algorithm, which in turn must follow the interface predefined for overload detection algorithms.

Every function implementing an overload detection algorithm must: (1) accept as arguments a list of CPU utilization percentages and dictionary representing the state of the algorithm; and (2) return a tuple containing the decision of the algorithm as a boolean and updated state dictionary. If the algorithm is stateless, it should return an empty dictionary as the state. Definitions of the interfaces of functions implementing VM consolidation algorithms and their factories are given in Table 7.

Table 7: Interfaces of VM Consolidation Algorithms and their Factory Functions solidation algorithm may also preserve state across invocations. This can be useful for implementing stateful algorithms, or as a performance optimization measure, e.g., to avoid repeating costly computations. Preserving state is done by accepting a state dictionary as an argument, and returning the updated dictionary as the second element of the return tuple.

Currently, the data collector 86 only collects data on the CPU utilization. It is possible to extend the system 80 to collect other types of data that may be passed to the VM consolidation algorithms. To add another type of data, it is necessary to extend the host_resource_usage and vm_resource_usage database tables by adding new fields for storing the new types of data. Then, the execute function of the data collector should be extended to include the code required to obtain the new data and submit them to the central database 85. Finally, the local managers 83 and global managers 87 need to be extended to fetch the new type of data from the central database 85 to be passed to the appropriate VM consolidation algorithms.

Deployment

OpenStack Neat needs to be deployed on all the compute hosts 72 and controller hosts 71. The deployment includes installing dependencies, cloning the project's Git repository, installing the project, and starting up the services. The process is cumbersome since multiple steps should be performed on each host. The OpenStack Neat distribution includes a number of Shell scripts that simplify the deployment process. The following steps are required to perform a complete deployment of OpenStack Neat:

1. Clone the project's repository on the controller host by executing:
git clone git://github.com/beloglazov/openstack-neat.git
2. Install the required dependencies by executing the following command from the cloned repository if the OS of the controller is CentOS: ./setup/deps-centos.sh
3. In the cloned repository, modify neat.conf to meet the requirements. In particular, it is necessary to enter the names of the available compute hosts 72. It is also nec-

| Algorithm | Factory arguments | Algorithm arguments | Algorithm return |
|---|---|---|---|
| Underload detection | 1. time_step: int. ≥0<br>2. migration_time: float, ≥0<br>3. params: dict(str: *) | 1. cpu_utilization: list(float)<br>2. state: dict(str: *) | 1. decision: bool<br>2. state: dict(str: *) |
| Overload detection | 1. time_step: int. ≥0<br>2. migration_time: float, ≥0<br>3. params: dict(str: *) | 1. cpu_utilization: list(float)<br>2. state: dict(str: *) | 1. decision: bool<br>2. state: dict(str: *) |
| VM selection | 1. time_step: int. ≥0<br>2. migration_time: float, ≥0<br>3. params: dict(str: *) | 1. vms_cpu: dict(str: list(int))<br>2. vms_ram: dict(str: list(int))<br>3. state: dict(str: *) | 1. vms: list(str)<br>2. state: dict(str: *) |
| VM placement | 1. time_step: int. ≥0<br>2. migration_time: float, ≥0<br>3. params: dict(str: *) | 1. hosts_cpu_usage: dict(str: int)<br>2. hosts_cpu_total: dict(str: int)<br>3. hosts_ram_usage: dict(str: int)<br>4. hosts_ram_total: dict(str: int)<br>5. inactive_hosts_cpu: dict(str: int)<br>6. inactive_hosts_ram: dict(str: int)<br>7. vms_cpu: dict(str: list(int))<br>8. vms_ram: dict(str: list(int))<br>9. state: dict(str: *) | 1. alloc.: dict(str: str)<br>2. state: dict(str: *) |

Using the algorithm_*_parameters configuration options, it is possible to pass arbitrary dictionaries of parameters to VM consolidation algorithm factory functions. The parameters must be specified as an object in the JSON format on a single line. The specified JSON strings are automatically parsed by the system and passed to factory functions as Python dictionaries. Apart from being parameterized, a conessary to create a database on the database server accessible with the details specified in the configuration file.
4. Install OpenStack Neat on the controller host 71 by executing the following command from the project's directory: sudo python setup.py install. This command will also copy the modified configuration file to /etc/neat/neat.conf.

5. Using the scripts provided in the package, it is possible to install OpenStack Neat on all the compute hosts 72 specified in the configuration file remotely from the controller 71. First, the following command can be used to clone the repository on all the compute hosts 72: ./compute-clone-neat.py.
6. Once the repository is cloned, OpenStack Neat and its dependencies can be installed on all the compute hosts 72 by executing the two following commands on the controller 71: ./compute-install-deps.py; ./compute-install-neat.py
7. Next, it is necessary to copy the modified configuration file to the compute hosts 72, which can be done by the following command: ./compute-copy-conf.py
8. All OpenStack Neat services can be started on the controller 71 and compute hosts 72 with the following single command ./all-start.sh Once all the steps listed above are completed, OpenStack Neat's services should be deployed and started up. If any service fails, the log files can be found in /var/log/neat/ on the corresponding host.

VM Consolidation Algorithms

As mentioned earlier, OpenStack Neat is based on the approach to the problem of dynamic VM consolidation, proposed in the previous sections, which includes dividing the problem into four sub-problems: (1) host underload detection; (2) host overload detection; (3) VM selection; and (4) VM placement. This section discusses some of the implemented algorithms.

Host Underload Detection

In the experiments of this case study, a simple heuristic is used for the problem of underload detection shown in Algorithm 6. The algorithm calculates the mean of the n latest CPU utilization measurements and compares it to the specified threshold. If the mean CPU utilization is lower than the threshold, the algorithm detects a host underload situation. The algorithm accepts three arguments: the CPU utilization threshold, the number of last CPU utilization values to average, and a list of CPU utilization measurements.

| Algorithm 6 The averaging threshold-based underload detection algorithm |
|---|
| Input: threshold, n, utilization |
| Output: Whether the host is underloaded |
| 1:     If utilization is not empty then |
| 2:        utilization ← last n values of utilization |
| 3:        meanUtilization ← sum(utilization) / len(utilization) |
| 4:        return meanUtilization ≤ threshold |
| 5:     return false |

Host Overload Detection

OpenStack Neat includes several overload detection algorithms, which can be enabled by modifying the configuration file. One of the simple included algorithms is the averaging Threshold-based (THR) overload detection algorithm. The algorithm is similar to Algorithm 6, while the only difference is that it detects overload situations if the mean of the n last CPU utilization measurements is higher than the specified threshold.

Another overload detection algorithm included in the default implementation of OpenStack Neat is based on estimating the future CPU utilization using local regression (i.e., the Loess method), referred to as the Local Regression Robust (LRR) algorithm shown in Algorithm 7, which has been introduced in [3]. The algorithm calculates the Loess parameter estimates, and uses them to predict the future CPU utilization at the next time step taking into account the VM migration time. In addition, the LR algorithm accepts a safety parameter, which is used to scale the predicted CPU utilization to increase or decrease the sensitivity of the algorithm to potential overloads.

| Algorithm 7 The Local Regression Robust (LRR) overload detection algorithm |
|---|
| Input: threshold, param, n, migrationTime, utilization |
| Output: Whether the host is overloaded |
| 1:     if len(utilization) < n then. |
| 2:        return false |
| 3:     estimates ← loessRobustParameterEstimates(last n values of utilization) |
| 4:     prediction ← estimates[0] + estimates[1] × (n + migrationTime) |
| 5:     return param × prediction ≥ threshold |

A more complex overload detection algorithm included in OpenStack Neat is the Markov Overload Detection (MHOD) algorithm introduced and described in detail in the previous sections.

VM Selection

Once a host overload has been detected, it is necessary to determine what VMs are the best to be migrated from the host. This problem is solved by VM selection algorithms. An example of such an algorithm is simply randomly selecting a VM from the set of VMs allocated to the host. Another algorithm shown in Algorithm 8 is called Minimum Migration Time Maximum CPU utilization (MMTMC). This algorithm first selects VMs with the minimum amount of RAM to minimize the live migration time. Then, out of the selected subset of VMs, the algorithm selects the VM with the maximum CPU utilization averaged over the last n measurements to maximally reduce the overall CPU utilization of the host.

| Algorithm 8 The MMTMC algorithm |
|---|
| Input: n, vmsCpuMap, vmsRamMap |
| Output: A VM to migrate |
| 1:        minRam ← min(values of vmsRamMap) |
| 2:        maxCpu ← 0 |
| 3:        selectedVm ← None |
| 4:        for vm, cpu in vmsCpuMap do |
| 5:            if vmsRamMap[vm] > minRam then |
| 6:               continue |
| 7:            vals ← last n values of cpu |
| 8:            mean ← sum(vals) / len(vals) |
| 9:            if maxCpu < mean then |
| 10:               maxCpu ← mean |
| 11:               selectedVm ← vm |
| 12:        return selectedVm |

VM Placement

The VM placement problem can be seen as a bin packing problem with variable bin sizes, where bins represent hosts; bin sizes are the available CPU capacities of hosts; and items are VMs to be allocated with an extra constraint on the amount of RAM. As the bin packing problem is NP-hard, it is appropriate to apply a heuristic to solve it. OpenStack Neat implements a modification of the Best Fit Decreasing (BFD) algorithm, which has been shown to use no more than 11/9·OPT+1 bins, where OPT is the number of bins of the optimal solution [37].

Algorithm 9 The Best Fit Decreasing (BFD) VM placement algorithm

```
Input: n, hostsCpu, hostsRam, inactiveHostsCpu, inactiveHostsRam,
       vmsCpu, vmsRam
Output: A map of VM UUIDs to host names
 1:  vmTuples ← empty list
 2:  for vm, cpu in vmsCpu do
 3:      vals ← last n values of cpu
 4:      append a tuple of the mean of vals, vmsRam[vm], and vm to
          vmTuples
 5:  vms ← sortDecreasing(vmTuples)
 6:  hostTuples ← empty list
 7:  for host, cpu in hostsCpu do
 8:      append a tuple of cpu, hostsRam[host] host to host(Tuples
 9:  hosts ← sortIncreasing(hostTuples)
10:  inactiveHostTuples ← empty list
11:  for host cpu in inactiveHostsCpu do
12:      append a tuple of cpu, inactiveHostsRam[host], host to
          inactiveHostTuples
13:  inactiveHosts ← sortIncreasing(inactiveHostTuples)
14:  mapping ← empty map
15:  for vmCpu, vmRam, vmUuid in vms do
16:      mapped ← false
17:      while not mapped do
18:          allocated ← false
19:          for _, _, host in hosts do
20:              if hostsCpu[host] ≥ vmCpu and hostsRam[host] ≥
                   vmRam then
21:                  mapping[vmUuid] ← host
22:                  hostsCpu[host] ← hostsCpu[host] − vmCpu
23:                  hostsRam[host] ← hostsRam[host] − vmRam
24:                  mapped ← true
25:                  allocated ← true
26:                  break
27:          if not allocated then
28:              if inactiveHosts is not empty then
29:                  activatedHost ← pop the first from inactiveHosts
30:                  append activatedHost to hosts
31:                  hosts ← sortIncreasing(hosts)
32:                  hostsCpu[activatedHost[2]] ← activatedHost[0]
33:                  hostsRam[activatedHost[2]] ← activatedHost[1]
34:              else
35:                  break
36:  if len(vms) == len(mapping) then
37:      return mapping
38:  return empty map
```

The implemented modification of the BFD algorithm shown in Algorithm 9 includes several extensions: the ability to handle extra constraints, namely, consideration of currently inactive hosts, and a constraint on the amount of RAM required by the VMs. An inactive host is only activated when a VM cannot be placed on one of the already active hosts. The constraint on the amount of RAM is taken into account in the first fit manner; i.e., if a host is selected for a VM as a best fit according to its CPU requirements, the host is confirmed if it just satisfies the RAM requirements. In addition, similarly to the averaging underload and overload detection algorithms, the algorithm uses the mean values of the last n CPU utilization measurements as the CPU constraints. The worst-case complexity of the algorithm is $(n+m/2)m$, where n is the number of physical nodes, and m is the number of VMs to be placed. The worst case occurs when every VM to be placed requires a new inactive host to be activated.

Implementation

OpenStack Neat is implemented in Python. The choice of the programming language has been mostly determined by the fact that OpenStack itself is implemented in Python; therefore, using the same programming language could potentially simplify the integration of the two projects. Since Python is a dynamic language, it has a number of advantages, such as concise code, no type constraints, and monkey patching, which refers to the ability to replace methods, attributes, and functions at run-time. Due to its flexibility and expressiveness, Python typically helps to improve productivity and reduce the development time compared with statically typed languages, such as Java and C++. The downsides of dynamic typing are the lower run-time performance and lack of compile time guarantees provided by statically typed languages.

To compensate for the reduced safety due to the lack of compile time checks, several programming techniques are applied in the implementation of OpenStack Neat to minimize bugs and simplify maintenance. First, the functional programming style is followed by leveraging the functional features of Python, such as higher-order functions and closures, and minimizing the use of the object-oriented programming features, such as class hierarchies and encapsulation. One desirable technique that is applied in the implementation of OpenStack Neat is the minimization of mutable state. Mutable state is one of the causes of side effects, which prevent functions from being referentially transparent. This means that if a function relies on some global mutable state, multiple calls to that function with the same arguments do not guarantee the same result returned by the function for each call.

The implementation of OpenStack Neat tries to minimize side effects by avoiding mutable state where possible, and isolating calls to external APIs in separate functions covered by unit tests. In addition, the implementation splits the code into small easy to understand functions with explicit arguments that the function acts upon without mutating their values. To impose constraints on function arguments, the Design by Contract (DbC) approach is applied using the PyContracts library. The approach prescribes the definition of formal, precise, and verifiable interface specifications for software components. PyContracts lets the programmer to specify contracts on function arguments via a special format of Python docstrings. The contracts are checked at run-time, and if any of the constraints is not satisfied, an exception is raised. This approach helps to localize errors and fail fast, instead of hiding potential errors. Another advantage of DbC is comprehensive and up-to-date code documentation, which can be generated from the source code by automated tools.

To provide stronger guarantees of the correctness of the program, it is desirable to apply unit testing. According to this method, each individual unit of source code, which in this context is a function, should be tested by an automated procedure. The goal of unit testing is to isolate parts of the program and show that they perform correctly. One of the most efficient unit testing techniques is implemented by the Haskell QuickCheck library. This library allows the definition of tests in the form of properties that must be satisfied, which do not require the manual specification of the test case input data. QuickCheck takes advantage of Haskell's rich type system to infer the required input data and generates multiple test cases automatically.

The implementation of OpenStack neat uses Pyqcy, a QuickCheck-like unit testing framework for Python. This library allows the specification of generators, which can be seen as templates for input data. Similarly to QuickCheck, Pyqcy uses the defined templates to automatically generate input data for hundreds of test cases for each unit test. Another Python library used for testing of OpenStack Neat is Mocktest. This library leverages the flexibility of Python's monkey patching to dynamically replace, or mock, existing methods, attributes, and functions at run-time. Mocking is essential for unit testing the code that relies on calls to external APIs. In addition to the ability to set artificial return values of methods and functions, Mocktest allows setting expectations on the number of the required function calls. If the expectations are not met, the test fails. Currently, OpenStack Neat includes more than 150 unit tests.

TABLE 8

The OpenStack Neat codebase summary

| Package | Files | Lines of code | Lines of comments |
|---|---|---|---|
| Core | 21 | 2,144 | 1,946 |
| Tests | 20 | 3,419 | 260 |

OpenStack Neat applies Continuous Integration (CI) using the Travis CI service. The aim of the CI practice is to detect integration problems early by periodically building and deploying the software system. Travis CI is attached to OpenStack Neat's source code repository through Git hooks. Every time modifications are pushed to the repository, Travis CI fetches the source code and runs a clean installation in a sandbox followed by the unit tests. If any step of the integration process fails, Travis CI reports the problem.

Despite all the precautions, run-time errors may occur in a deployed system. OpenStack Neat implements multi-level logging functionality to simplify the post-mortem analysis and debugging process. The verbosity of logging can be adjusted by modifying the configuration file. Table 8 provides information on the size of the current codebase of OpenStack Neat. Table 9 summarizes the set of libraries used in the implementation of OpenStack Neat.

minutes from more than a thousand VMs deployed on servers located in more 500 places around the world. Ten days of workload traces collected during March and April 2011 have been randomly chosen, which resulted in the total of 11,746 24-hour long traces.

The workload from PlanetLab VMs is representative of an IaaS Cloud environment, such as Amazon EC2, in the sense that the VMs are created and managed by multiple independent users, and the infrastructure provider is not aware of what particular applications are executing in the VMs. Furthermore, this implies that the overall system workload is composed of multiple independent heterogeneous applications, which also corresponds to an IaaS environment. However, there is difference from a public Cloud provider, such as Amazon EC2. The difference is that PlanetLab is an infrastructure mainly used for research purposes; therefore, the applications are potentially closer to the HPC type, rather than web services, which are common in public Clouds.

HPC applications are typically CPU-intensive with lower dynamics in the resource utilization compared with web services, whose resource consumption depends on the number of user requests and may vary over time. HPC workload is easier to handle for a VM consolidation system due to infrequent variation in the resource utilization. Therefore, to stress the system in the experiments, the original workload traces have been filtered to leave only the ones that exhibit high variability. In particular, only the traces that satisfy the following two conditions have been selected: (1) at least 10% of time the CPU utilization is lower than 20%; and (2) at least 10% of

TABLE 9

Libraries used by OpenStack Neat

| Library | License | Description |
|---|---|---|
| Distribute | Python 2.0 | A library for managing Python projects and distributions. http://bitbucket.org/tarek/distribute |
| Pyqcy | FreeBSD | A QuickCheck-like unit testing framework for Python, http://github.com/Xion/pyqcy |
| Mocktest | LGPL | A Python library for mocking objects and functions. http://github.com/gfxmonk/mocktest |
| PyContracts | LGPL | A Python library for Design by Contract (DbC). http://github.com/AndreaCensi/contracts |
| SQLAlchemy | MIT | A Python SQL toolkit, also used by the core OpenStack services. http://www.sqlalchemy.org/ |
| Bottle | MIT | A micro web-framework for Python. http://bottlepy.org/ |
| Requests | ISC | A Python HTTP client library. http://python-requests.org/ |
| libvirt | LGPL | A visualization toolkit with Python bindings. http://libvirt.org/ |
| Python-novaclient | Apache 2.0 | A Python Nova API client implementation. http://github.com/openstack/python-novaclient |
| NumPy | BSD | A library for scientific computing. http://numpy.scipy.org/ |
| SciPy | BSD | A library of extra tools for scientific computing. http://scipy.org/ |

Workload Traces

To make experiments reproducible, it is desirable to rely on a set of input traces to reliably generate the workload, which would allow the experiments to be repeated as many times as necessary. It is also desirable to use workload traces collected from a real system rather than artificially generated, as this would help to reproduce a realistic scenario. This case study uses workload trace data provided as a part of the CoMon project, a monitoring infrastructure of PlanetLab [27]. The traces include data on the CPU utilization collected every five time the CPU utilization is higher than 80%. This significantly reduced the number of workload traces resulting in only 33 out of 11,746 24-hour traces left. The set of selected traces and filtering script are available online [2].

The resulting number of traces was sufficient for the experiments, whose scale was limited by the size of the testbed described below. If a larger number of traces are required to satisfy larger scale experiments, one approach is to relax the conditions of filtering the original set of traces. Another approach is to randomly sample with replacement from the limited set of traces. If another set of suitable workload traces becomes publicly available, it can be included in the benchmark suite as an alternative.

Performance Metrics

For effective performance evaluation and comparison of algorithms it is essential to define performance metrics that capture the relevant characteristics of the algorithms. One of the objectives of dynamic VM consolidation is the minimization of energy consumption by the physical nodes, which can be a metric for performance evaluation and comparison. However, energy consumption is highly dependent on the particular model and configuration of the underlying hardware, efficiency of power supplies, implementation of the sleep mode, etc. A metric that abstracts from the mentioned factors, but is directly proportional and can be used to estimate energy consumption, is the time of a host being idle, aggregated over the full set of hosts. Using this metric, the quality of VM consolidation can be represented by the increase in the aggregated idle time of hosts. However, this metric depends on the length of the overall evaluation period and the number of hosts. To eliminate this dependency, a normalized metric is proposed that is referred to as the Aggregated Idle Time Fraction (AITF) defined as shown in (41).

$$AITF = \frac{\sum_{h \in H} t_i(h)}{\sum_{h \in H} t_a(h)}, \quad (41)$$

where H is a set of hosts; $t_i(h)$ is the idle time of the host h; and $t_a(h)$ is the total activity time of the host h. To quantify the overall QoS delivered by the system, the Aggregated Overload Time Fraction (AOTF) metric is applied, which is based on (11) and defined as in (42).

$$AOTF(u_t) = \frac{\sum_{h \in H} t_o(h, u_t)}{\sum_{h \in} t_b(h)}, \quad (42)$$

where $t_o(h, u_t)$ is the overload time of the host h calculated according to the overload threshold $u_t$; and $t_b(h)$ is the total busy (non-idle) time of the host h. The overhead of dynamic VM consolidation in the system is proposed to be evaluated in terms of the number of VM migrations initiated as a part of dynamic consolidation. This metric is referred to as the VM Migration Count (VMMC). Apart from that, the execution time of various components of the system including the execution time of the VM consolidation algorithms is evaluated.

Performance Evaluation Methodology

One of the key points of the proposed performance evaluation methodology is the minimization of manual steps required to run an experiment through automation. Automation begins from scripted installation of the OS, OpenStack services and their dependencies on the testbed's nodes, as described in the OpenStack installation guide [5]. The next step is writing scripts for preparing the system for an experiment, which includes starting up the required services, booting VM instances, and preparing them for starting the workload generation.

While most of the mentioned steps are trivial, workload generation is complicated by the requirement of synchronizing the time of starting the workload generation on all the VMs. Another desirable aspect of workload generation is the way workload traces are assigned to VMs. Typically, the desired behavior is assigning a unique workload trace out of the full set of traces to each VM. Finally, it is desirable to create and maintain a specific level of CPU utilization for the whole interval between changes of the CPU utilization level defined by the workload trace for each VM.

This problem is addressed using a combination of a CPU load generation program, and a workload distribution web service and clients deployed on VMs [2]. When a VM boots from a pre-configured image, it automatically starts a script that polls the central workload distribution web service to be assigned a workload trace. Initially, the workload distribution web service drops requests from clients deployed on VMs to wait for the moment when all the required VM instances are booted up and ready for generating workload. When all clients are ready, the web service receives a command to start the workload trace distribution. The web service starts replying to clients by sending each of them a unique workload trace. Upon receiving a workload trace, every client initiates the CPU load generator and passes the received workload trace as an argument. The CPU load generator reads the provided workload trace file, and starts generating CPU utilization levels corresponding to the values specified in the workload trace file for each time frame.

During an experiment, OpenStack Neat continuously logs various events into both the database and log files on each host. After the experiment, the logged data are used by special result processing scripts to extract the required information and compute performance metrics discussed above, as well as the execution time of various system components. This process should be repeated for each combination of VM consolidation algorithms under consideration. After the required set of experiments is completed, other scripts are executed to perform automated statistical tests and plotting graphs for comparing the algorithms.

The next section presents an example of application of the proposed benchmark suite, and in particular applies: (1) OpenStack Neat as the dynamic VM consolidation framework; (2) the filtered PlanetLab workload traces above; (3) the performance metrics defined above; and (4) the proposed evaluation methodology. The full set of scripts used in the experiments is available online [2].

Performance Evaluation Using a Cloud Data Center

In this section, the embodiments herein evaluate OpenStack Neat and several dynamic VM consolidation algorithm discussed above Experimental Testbed The testbed used for performance evaluation of the system comprises of the following example hardware:

1× Dell Optiplex 745

Intel® Core™ 2 CPU (2 cores, 2 threads) 6600 @ 2.40 GHz

2 GB DDR2-667

Seagate Barracuda 80 GB, 7200 RPM SATA II (ST3808110AS)

Broadcom 5751 NetXtreme Gigabit Controller

4× IBM System x3200 M3

Intel® Xeon® CPU (4 cores, 8 threads), X3460 @ 2.80 GHz

4 GB DDR3-1333

Western Digital 250 GB, 7200 RPM SATA II (WD2502ABYS-23B7A)

Dual Gigabit Ethernet (2× Intel 82574L Ethernet Controller)

1× Netgear ProSafe 16-Port 10/100 Desktop Switch FS116

The Dell Optiplex 745 machine was chosen to serve as the controller host 71 running all the major OpenStack services and the global manager 87 of OpenStack Neat. The 4 IBM System x3200 M3 servers were used as compute hosts 72; i.e. running OpenStack Nova, and local managers 83 and data collectors 86 of OpenStack Neat. All of the machines formed a local network connected via the Netgear FS 116 network switch.

Unfortunately, there was a hardware problem preventing the system from taking advantage of dynamic VM consolidation to save energy. The problem was that the compute nodes of the testbed did not support the Suspend to RAM power state, which is the most suitable for the purpose of dynamic VM consolidation. This state potentially provides very low switching latency, on the order of 300 ms, while reducing the energy consumption to a negligible level [23].

tion by the servers, the AITF metric introduced above was applied to evaluate the system, which can be seen as a representation of potential energy savings.

Experimental Setup and Algorithm Parameters

From the point of view of experimenting with close to real world conditions, it is interesting to allocate as many VMs on a compute host as possible. This would create a more dynamic workload and stress the system. At the same time, it is desirable to use full-fledged VM images representing realistic user requirements. Therefore, the Ubuntu 12.04 Cloud Image [9] was used in the experiments, which is one of the Ubuntu VM images available in Amazon EC2.

Since the compute hosts of the testbed contained limited amount of RAM, to maximize the number of VMs served by a single host, it was necessary to use a VM instance type with the minimum amount of RAM sufficient for Ubuntu 12.04. The minimum required amount of RAM was empirically determined to be 128 MB. This resulted in the maximum of 28 VMs being possible to instantiate on a single compute host. Therefore, to maximize potential benefits of dynamic VM consolidation on the testbed containing 4 compute nodes, the total number of VM instances was set to 28, so that in an ideal case all of them can be placed on a single compute host, while the other 3 hosts are kept idle. Out of the 33 filtered PlanetLab workload traces discussed above, 28 traces were randomly selected; i.e., one unique 24-hour trace for each VM instance. The full set of selected traces is available online [2].

During the experiments, all the configuration parameters of OpenStack Neat were set to their default values except for the configuration of the overload detection algorithm. The overload detection algorithm was changed for each experiment by going through the following list of algorithms and their parameters:

1. MAX-ITF algorithm—a base line algorithm, which never detects host overloads leading to the maximum ITF for the host, where the algorithm is used.
2. The THR algorithm with the n parameter set to 2, and the CPU utilization threshold set to 0.8, 0.9, and 1.0.
3. The LRR algorithm with the safety parameter set to 0.9, 1.0, and 1.1.
4. The MHOD algorithm with the OTF parameter set to 0.2, 0.3, and 0.4.

Each experiment was run three times to handle the variability caused by random factors, such as the initial VM placement, workload trace assignment, and component communication latency. All of the system initialization and result processing scripts, along with the experiment result packages are available online [2].

Experimental Results and Analysis

TABLE 10

| | The experimental results (mean values with 95% CIs) | | |
|---|---|---|---|
| Algorithm | AITF | AOTF | VM migrations |
| THR-0.8 | 36.9% (35.6, 38.2) | 15.4% (12.5, 18.3) | 167.7 (152.7, 182.6) |
| THR-0.9 | 43.0% (42.6, 43.5) | 27.0% (25.7, 28.1) | 75.3 (70.2, 80.5) |
| THR-1.0 | 49.2% (49.2, 49.4) | 42.2% (33.0, 51.3) | 11.3 (9.9, 12.8) |
| LRR-1.1 | 37.9% (37.9, 38.0) | 17.8% (12.8, 22.7) | 195.7 (158.3, 233.0) |
| LRR-1.0 | 40.3% (38.1, 42.4) | 23.8% (21.4, 26.1) | 93.7 (64.6, 122.8) |
| LRR-0.9 | 47.3% (45.2, 49.4) | 34.4% (28.8, 40.0) | 28.3 (23.2, 33.5) |
| MHOD-0.2 | 37.7% (36.8, 38.5) | 16.0% (13.5, 18.5) | 158.3 (153.2, 163.5) |
| MHOD-0.3 | 38.1% (37.7, 38.5) | 17.9% (16.8, 18.9) | 138.0 (81.6, 194.4) |
| MHOD-0.4 | 40.7% (37.0, 44.4) | 21.4% (16.7, 26.0) | 116.3 (26.6, 206.0) |
| MAX-ITF | 49.2% (49.1, 49.3) | 40.4% (35.8, 44.9) | 14.0 (7.4, 20.6) |

Figure 12A:
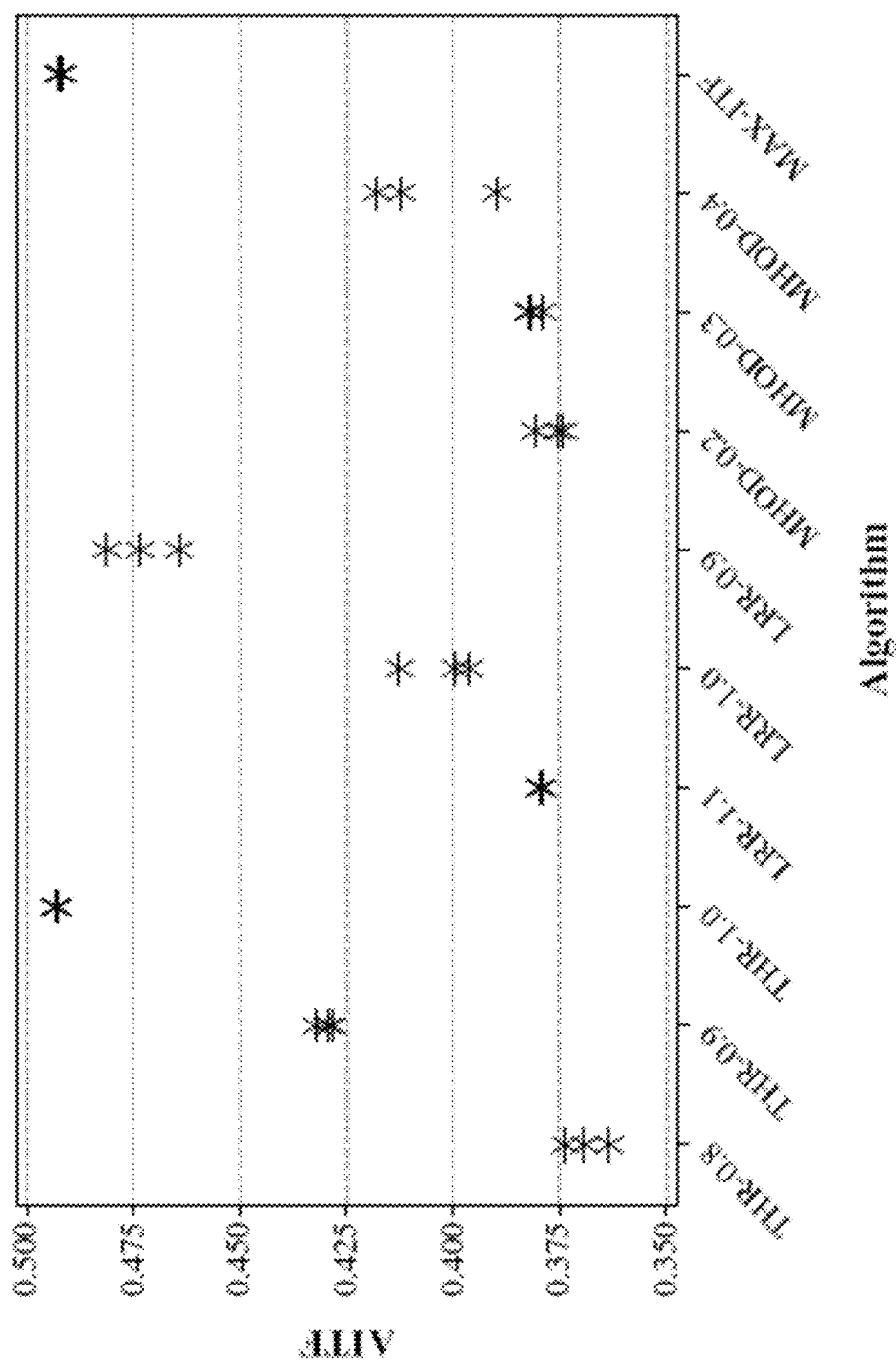
FIGS. 12A through 12C illustrate graphical representations of the experimental results according to the embodiments herein.
Figure 12B:
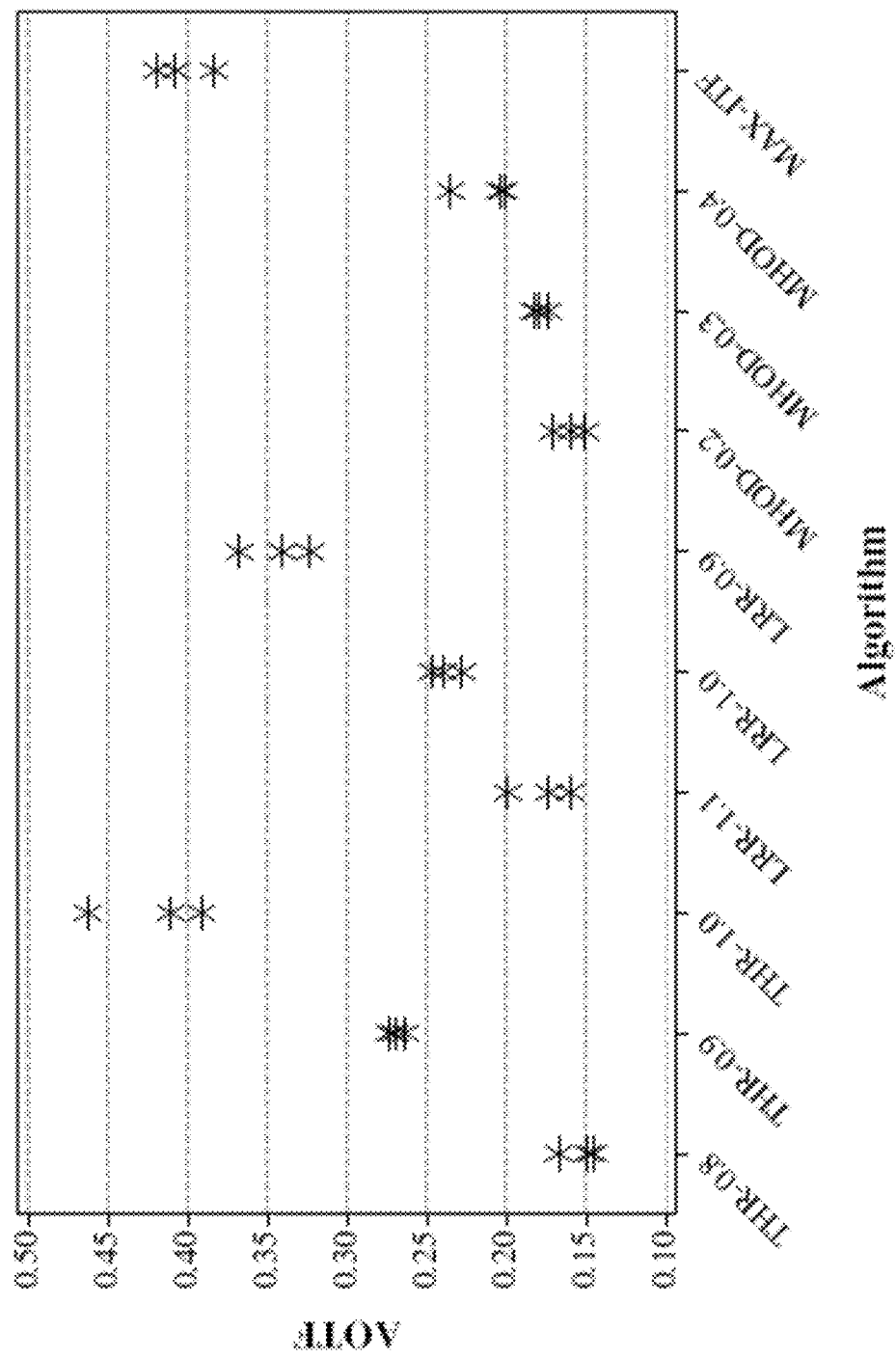
Figure 12C:
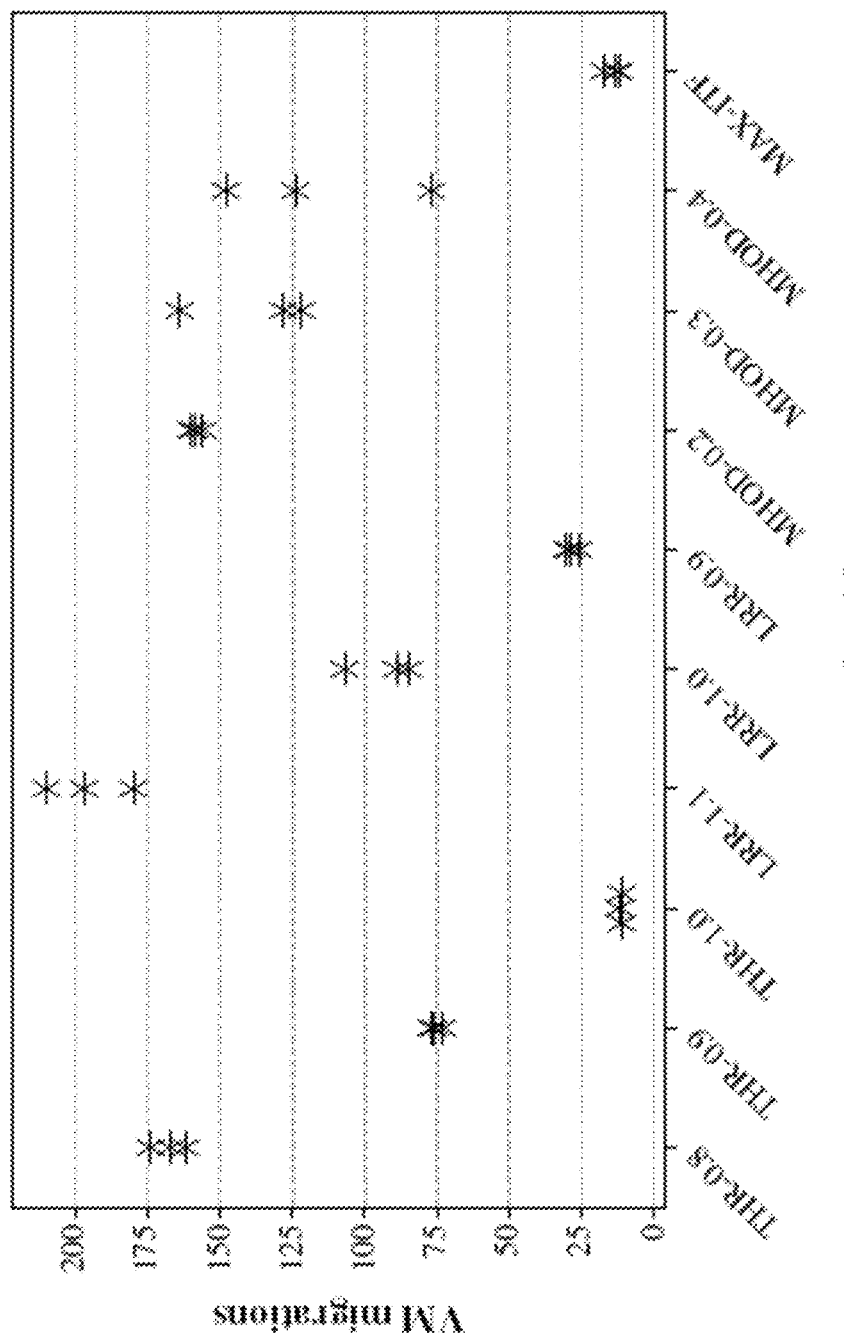

The results of experiments are graphically depicted in FIGS. 12A through 12C, with reference to FIGS. 1 through 11. The mean values of the obtained AITF and AOTF metrics, and the number of VM migrations along with their 95% Confidence Intervals (CIs) are displayed in Table 10. The results of MAX-ITF show that for the current experiment setup it is possible to obtain high values of AITF of up to 50%, while incurring a high AOTF of more than 40%. All the THR, LRR, and MHOD allow tuning of the AITF values by adjusting the algorithm parameters. For the THR algorithm, the mean AITF increases from 36.9% to 49.2% with the corresponding decrease in the QoS level from 15.4% to 42.2% by varying the CPU utilization threshold from 0.8 to 1.0. The mean number of VM migrations decreases from 167.7 for the 80% threshold to 11.3 for the 100% threshold. The THR algorithm with the CPU utilization threshold set to 100% reaches the mean AITF shown by the MAX-ITF algorithm, which is expected as setting the threshold to 100% effectively disables host overload detection. Similarly, adjusting the safety parameter of the LRR algorithm from 1.1 to 0.9 leads to an increase of the mean AITF from 37.9% to 47.3% with a growth of the mean AOTF from 17.8% to 34.4% and decrease of the mean number of VM migrations from 195.7 to 28.3. THR-1.0 reaches the mean AITF of 49.2% with the mean AOTF of 42.2%, while LRR-0.9 reaches a close mean AITF of 47.3% with the mean AOTF of only 34.4%, which is a significant decrease compared with the AOTF of THR-1.0.

Varying the OTF parameter of the MHOD algorithm from 0.2 to 0.4 leads to an increase of the mean AITF from 37.7% to 40.7% with an increase of the mean AOTF from 16.0% to 21.4%. First, it is desirable to note that the algorithm meets the specified QoS constraint by keeping the value of the AOTF metric below the specified OTF parameters. However, the resulting mean AOTF is significantly lower than the specified OTF parameters: 17.9% for the 30% OTF, and 21.4% for the 40% OTF. This can be explained by a combination of two factors: (1) the MHOD algorithm is parameterized by the per-host OTF, rather than AOTF, which means that it meets the OTF constraint for each host independently; (2) due to the small scale of the experimental testbed, a single underloaded host used for offloading VMs from overloaded hosts is able to significantly skew the AITF metric. The AITF metric is expected to be closer to the specified OTF parameter for large-scale OpenStack Neat deployments. A comparison of the results produced by LRR-1.1 and LRR-1.0 with MHOD-0.2 and MHOD-0.4 reveals that the MHOD algorithm leads to lower values of the AOTF metric (higher level of QoS) for approximately equal values of the AITF metric.

Using the obtained AITF and AOTF metrics for each algorithm and data on power consumption by servers, it is possible to compute estimates of potential energy savings relatively to a non-power-aware system assuming that hosts are switched to the sleep mode during every idle period. To obtain a lower bound on the estimated energy savings, it is assumed that when dynamic VM consolidation is applied, the CPU utilization of each host is 80% when it is active and non-overloaded, and 100% when it is overloaded. According to the data provided by Meisner et al. [23], power consumption of a typical blade server is 450 W in the fully utilized state, 270 W in the idle state, and 10.4 W in the sleep mode. Using the linear server power model proposed by Fan et al. [11] and the power consumption data provided by Meisner et al. [23], it is possible to calculate power consumption of a server at any utilization level.

To calculate the base energy consumption by a non-power-aware system, it is assumed that in such a system 80 all the compute hosts 72 are always active with the load being distributed across them. Since, the power model applied in this study is linear, it is does not matter how exactly the load is distributed across the servers. The estimated energy consumption levels for each overload detection algorithm, along with the corresponding base energy consumption by a non-power-aware system, and percentages of the estimated energy savings are presented in Table 11.

TABLE 11

Energy consumption estimates

| Algorithm | Energy, kWh | Base energy, kWh | Energy savings |
|---|---|---|---|
| THR-0.8 | 25.99 | 34.65 | 24.99% |
| THR-0.9 | 24.01 | 33.80 | 28.96% |
| THR-1.0 | 22.09 | 32.93 | 32.91% |
| LRR-1.1 | 25.66 | 34.50 | 25.63% |

TABLE 11-continued

Energy consumption estimates

| Algorithm | Energy, kWh | Base energy, kWh | Energy savings |
|---|---|---|---|
| LRR-1.0 | 24.96 | 34.18 | 26.97% |
| LRR-0.9 | 22.60 | 33.20 | 31.93% |
| MHOD-0.2 | 25.70 | 34.53 | 25.59% |
| MHOD-0.3 | 25.59 | 34.48 | 25.76% |
| MHOD-0.4 | 24.72 | 34.12 | 27.54% |
| MAX-ITF | 22.07 | 32.94 | 33.01% |

According to the estimates, MAX-ITF leads to the highest energy savings over the base energy consumption of approximately 33% by the cost of substantial performance degradation (AOTF=40.4%). The THR, LRR, and MHOD algorithms lead to energy savings from approximately 25% to 32% depending on the specified parameters. Similarly to the above comparison of algorithms using the AITF metric, LRR-0.9 produces energy savings close to those of THR-1.0 (31.93% compared with 32.91%), while significantly reducing the mean AOTF from 42.2% to 34.4%. The MHOD algorithm produces approximately equal or higher energy savings than the LRR algorithm with lower mean AITF values, i.e., higher levels of QoS, while also providing the advantage of specifying a QoS constraint as a parameter of the algorithm. The obtained experimental results confirm the hypothesis that dynamic VM consolidation is able to significantly reduce energy consumption in an IaaS Cloud with a limited performance impact.

Table 12 lists mean values of the execution time along with 95% CIs measured for each overload detection algorithm during the experiments for some of the system components: processing underload and overload requests by the global manager (GM) 87, overload detection algorithms executed by the local manager (LM) 83, and iterations of the data collector (DC) 86. Request processing by the global manager 87 takes on average between 30 and 60 seconds, which is mostly determined by the time required to migrate VMs. The mean execution time of the MHOD algorithm is higher than those of THR and LRR, while still being under half a second resulting in a negligible overhead considering that it is executed at most once in five minutes. The mean execution time of an iteration of the data collector is similarly under a second, which is also negligible considering that it is executed only once in five minutes.

TABLE 12

The execution time of components in seconds (mean values with 95% CIs)

| Algorithm | GM underload | GM overload | LM overload | DC |
|---|---|---|---|---|
| THR | 33.5 (26.4, 40.5) | 60.3 (54.0, 66.7) | 0.003 (0.000, 0.006) | 0.88 (0.84, 0.92) |
| LRR | 34.4 (27.6, 41.1) | 50.3 (47.8, 52.8) | 0.006 (0.003, 0.008) | 0.76 (0.73, 0.80) |
| MHOD | 41.6 (27.1, 56.1) | 53.7 (50.9, 56.6) | 0.440 (0.429, 0.452) | 0.92 (0.88, 0.96) |
| MAX-ITF | 41.7 (9.6, 73.7) | — | 0.001 (0.000, 0.001) | 1.03 (0.96, 1.10) |

Scalability Remarks

Scalability and eliminating single points of failure are desirable benefits of designing a dynamic VM consolidation system in a distributed way. According to the approach adopted in the design of OpenStack Neat, the underload/overload detection and VM selection algorithms are able to inherently scale with the increased number of compute hosts. This is due to the fact that they are executed independently on each compute host 72 and do not rely on information about the global state of the system. In regard to the database setup, there exist distributed database solutions, e.g., the MySQL Cluster [26].

On the other hand, in the current implementation of OpenStack Neat, there assumed to be only one instance of the global manager 87 deployed on a single controller host 71. This limits the scalability of VM placement decisions and creates a single point of failure. However, even with this limitation the overall scalability of the system is significantly improved compared with existing completely centralized VM consolidation solutions. Compared with centralized solutions, the only functionality implemented in OpenStack Neat by the central controller is the placement of VMs selected for migration, which constitute only a fraction of the total number of VMs in the system. To address the problem of a single point of failure, it is possible to run a second instance of the global manager 87, which initially does not receive requests from the local managers 83 and gets automatically activated when the primary instance of the global manager 87 fails. However, the problem of scalability is more complex since it is necessary to have multiple independent global managers 87 concurrently serving requests from local managers 83.

Potentially it is possible to implement replication of the global manager 87 in line with OpenStack's approach to scalability by replication of its services. From the point of view of communication between the local managers 83 and global managers 87, replication can be simply implemented by a load balancer that distributes requests from the local managers 83 across the set of replicated global managers 87. A more complex problem is synchronizing the activities of the replicated global managers 87. It is necessary to avoid situations when two global managers 87 place VMs on a single compute host 72 simultaneously, since that would imply that they use an out-of-date view of the system state. One potential solution to this problem could be a continuous exchange of information between global managers 87 during the process of execution of the VM placement algorithm; i.e., if a host is selected by a global manager 87 for a VM, it should notify the other global managers 87 to exclude that host from their sets of available destination hosts.

The embodiments herein proposed a Markov chain model and control algorithm for the problem of host overload detection as a part of dynamic VM consolidation. The model allows a system administrator to explicitly set a QoS goal in terms of the OTF parameter, which is a workload independent QoS metric. For a known stationary workload and a given state configuration, the control policy obtained from the Markov model optimally solves the host overload detection problem in the online setting by maximizing the mean inter-migration time, while meeting the QoS goal.

Using the Multisize Sliding Window workload estimation approach, the model has been heuristically adapted to handle unknown non-stationary workloads. In addition, an optimal offline algorithm for the problem of host overload detection has been proposed to evaluate the efficiency of the MHOD algorithm. The conducted experimental study has led to the following conclusions:

1. For the simulated PlanetLab workload, 3-state configurations of the MHOD algorithm on average produce approximately the same results as the ([0,100),100) 2-state configuration of the MHOD algorithm; therefore, the 2-state configuration is preferred, as it requires simpler computations.

2. The 2-state configuration of the MHOD algorithm leads to approximately 11% shorter time until a migration than the LRR algorithm, the best benchmark algorithm. However, the MHOD algorithm provides the advantage of explicit specification of a QoS goal in terms of the OTF metric. In contrast, the performance of the LR and LRR algorithms in regard to the QoS can only be adjusted indirectly by tuning the safety parameter. Moreover, the spread of the resulting OTF value produced by the MHOD algorithm is substantially narrower compared with the LR and LRR algorithms, which means the MHOD algorithm more precisely meets the QoS goal.

3. The MHOD algorithm substantially outperforms the OTFT and OTFTM algorithms in the level of SLA violations resulting in less than 0.5% SLA violations compared to 81.33% of OTFT and OTFTM.

4. The MHOD algorithm on average provides approximately the same resulting OTF value and approximately 88% of the time until a VM migration produced by the optimal offline algorithm (OPT).

5. The MHOD algorithm enables explicit specification of a desired QoS goal to be delivered by the system through the OTF parameter, which is successfully met by the resulting value of the OTF metric.

The introduced model is based on Markov chains requiring a few fundamental assumptions. It is assumed that the workload satisfies the Markov property, which may not be true for all types of workloads. Careful assessment of the assumptions discussed above is desirable in an investigation of the applicability of the proposed model to a particular system. However, the experimental study involving multiple mixed heterogeneous real-world workloads has shown that the algorithm is efficient in handling them. For the simulated PlanetLab workload the MHOD algorithm performed within a 12% difference from the performance of the optimal offline algorithm, which is highly efficient for an online algorithm.

The MHOD algorithm has been implemented and evaluated as part of a framework for dynamic VM consolidation in OpenStack Clouds, called OpenStack Neat. The experimental results and estimates of energy consumption have shown that OpenStack Neat is able to reduce energy consumption by the compute nodes of a 4-node testbed by 25% to 33%, while resulting in a limited application performance impact from approximately 15% to 40% AOTF. The MHOD algorithm has led to approximately equal or higher energy savings with lower mean AOTF values compared with the other evaluated algorithms, while also allowing the system administrator to explicitly specify a QoS constraint in terms of the OTF metric.

The performance overhead of the framework is nearly negligible taking on average only a fraction of a second to execute iterations of the components. The request processing of the global manager takes on average between 30 and 60 seconds and is mostly determined by the time required to migrate VMs. The results have shown that dynamic VM consolidation brings significant energy savings with a limited impact on the application performance. The proposed framework can be applied in both further research on dynamic VM consolidation, and real OpenStack Cloud deployments to improve the utilization of resources and reduce energy consumption.

The embodiments herein have proposed a novel system and framework for dynamic VM consolidation in OpenStack Clouds, called OpenStack Neat. The framework follows a distributed model of dynamic VM consolidation, where the problem is divided into four sub-problems: host underload detection, host overload detection, VM selection, and VM placement. Through its configuration, OpenStack Neat can be customized to use various implementations of algorithms for each for the four sub-problems of dynamic VM consolidation. OpenStack Neat is transparent to the base OpenStack installation by interacting with it using the public APIs, and not requiring any modifications of OpenStack's configuration. The embodiments herein have also proposed a benchmark suite comprising OpenStack Neat as the base software framework, a set of PlanetLab workload traces, performance metrics, and methodology for evaluating and comparing dynamic VM consolidation algorithms following the distributed model.

Through a synchronization model and replication of global managers 87, a complete distributed and fault-tolerant dynamic VM consolidation system can be achieved. The data collector 86 can be extended to collect other types of data in addition to the CPU utilization that can be used by VM consolidation algorithms.

The experimental results and estimates of energy consumption have shown that OpenStack Neat is able to reduce energy consumption by the compute nodes of a 4-node testbed by 25% to 33%, while resulting in a limited application performance impact from approximately 15% to 40% AOTF. The MHOD algorithm has led to approximately equal or higher energy savings with lower mean AOTF values compared with the other evaluated algorithms, while also allowing the system administrator to explicitly specify a QoS constraint in terms of the OTF metric. The performance overhead of the framework is nearly negligible taking on average only a fraction of a second to execute iterations of the components. The request processing of the global manager 87 takes on average between 30 and 60 seconds and is mostly determined by the time required to migrate VMs. The results have shown that dynamic VM consolidation brings significant energy savings with a limited impact on the application performance.

Figure 13:
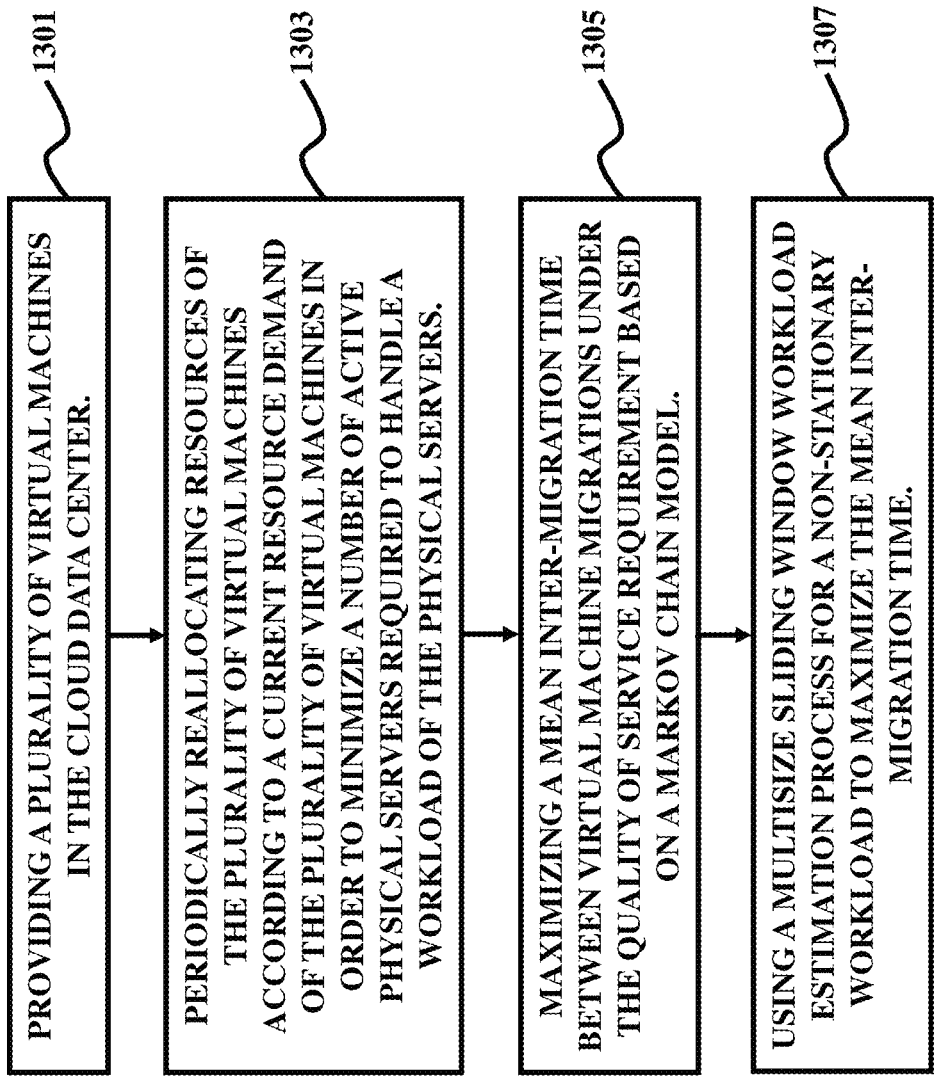
FIG. 13 is a flow diagram illustrating a method according to an embodiment herein.

FIG. 13, with reference to FIGS. 1 through 12C, is a flow diagram illustrating a method for improving a utilization of physical resources and reducing energy consumption in a cloud data center according to an embodiment herein. The method comprises providing (1301) a plurality of virtual machines 8 in the cloud data center 1426 (of FIG. 14); periodically reallocating (1303) resources of the plurality of virtual machines 8 according to a current resource demand of the plurality of virtual machines 8 in order to minimize a number of active physical servers required to handle a workload of the physical servers (e.g., hosts 9, 10), wherein the reallocating comprises: determining when a physical server is considered to be overloaded so that some of the virtual machines 8 are migrated from the overloaded physical server to other physical servers in order to meet a quality of service requirement; determining when a physical server is considered to be underloaded so that the virtual machines 8 of the physical server are migrated to other physical servers, wherein the physical server is switched to a lower power mode; selecting particular virtual machines 8 to migrate from the overloaded physical server; and allocating the selected virtual machines for migration to other active or re-activated physical servers. The method further comprises maximizing (1305) a mean inter-migration time between virtual machine migrations under the quality of service requirement based on a Markov chain model; and using (1307) a multisize sliding window workload estimation process for a non-stationary workload to maximize the mean inter-migration time.

The Markov chain model allows a derivation of a randomized control policy that optimally maximizes the mean inter-migration time between virtual machine migrations under an explicitly specified quality of service requirement for any known stationary workload and a given state configuration in an online setting. The method may further comprise only maximizing an activity time of the overloaded physical server; and only minimizing an activity time of an underloaded physical server. A workload of a physical server comprises a central processing unit utilization created over a period of time by a set of virtual machines allocated to the physical server, wherein the workload may be stationary. The non-stationary workload is approximated as a sequence of stationary workloads that are enabled one after another.

The method may further comprise submitting a virtual machine provisioning request through a cloud user interface 3; processing the request and instantiating required virtual machines 8; collecting data on resource utilization of virtual machines 8 instantiated on a compute host 9, 72; passing the data to a local consolidation manager 6, 83 that invokes physical server overload detection, physical server underload detection, a virtual machine selection process; passing outcomes generated by the local consolidation manager 6, 83 to a global consolidation manager 5, 87; invoking a virtual machine placement process to determine a new placement of a virtual machine 8 required to be migrated; initiating virtual machine migrations as determined by the virtual machine placement process; migrating the virtual machines 8 as instructed by the global consolidation manager 5, 87; and upon completion of the required migrations, the global consolidation manager 5, 87 switching the physical servers from and to a lower power mode, wherein the lower power mode comprises a sleep mode. The quality of service requirement may be specified in terms of a workload independent quality of service metric, and the overload detection occurs using an offline process.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be processed.

The embodiments herein can include both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 14:
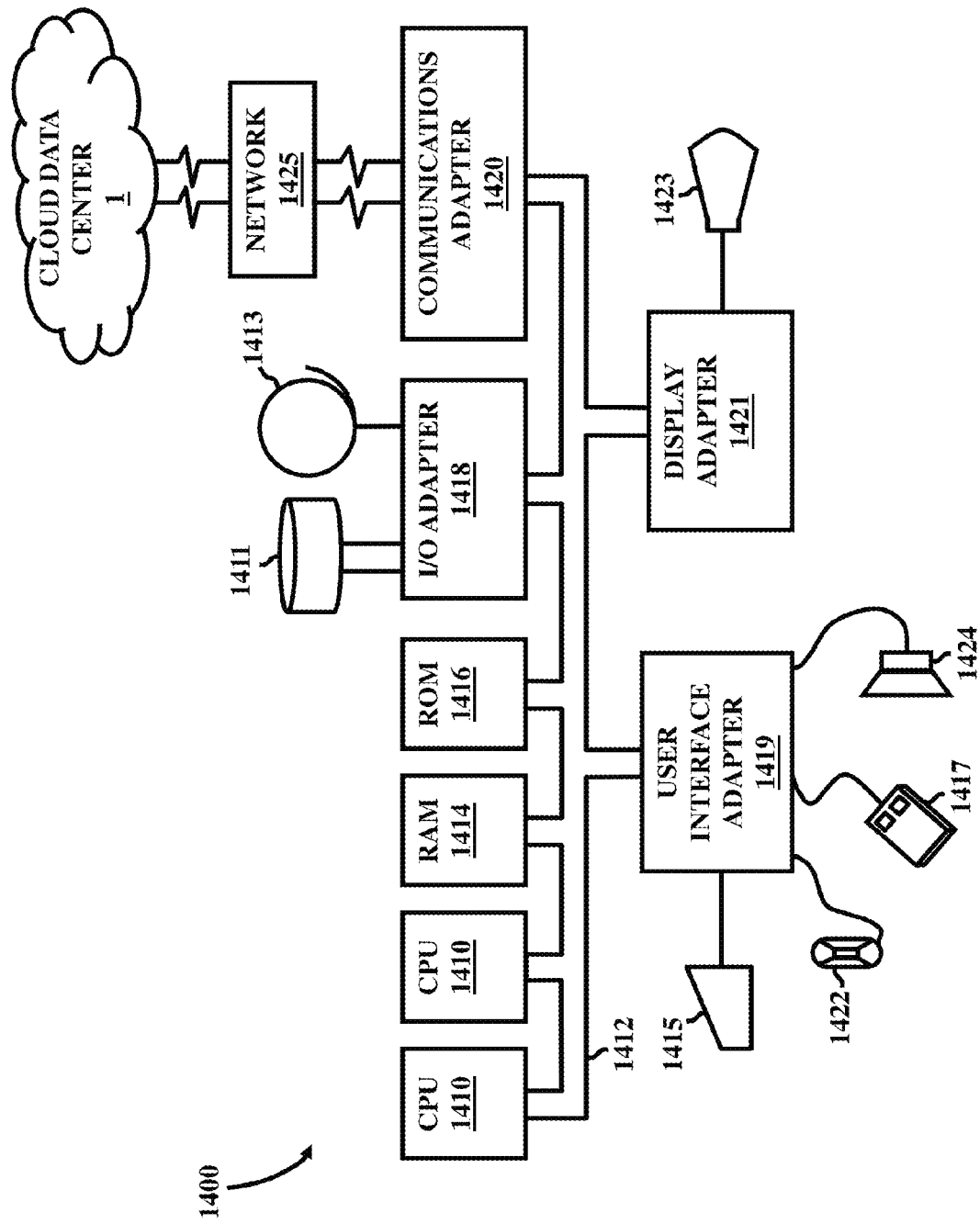
FIG. 14 is a computer system used with the embodiments herein.

A representative hardware environment for practicing the embodiments herein is depicted in FIG. 14, with reference to FIGS. 1 through 13. This schematic drawing illustrates a hardware configuration of an information handling/computer system 1400 in accordance with the embodiments herein. The system 1400 comprises at least one processor or central processing unit (CPU) 1410. The CPUs 1410 are interconnected via system bus 1412 to various devices such as a random access memory (RAM) 1414, read-only memory (ROM) 1416, and an input/output (I/O) adapter 1418. The I/O adapter 1418 can connect to peripheral devices, such as disk units 1411 and tape drives 1413, or other program storage devices that are readable by the system 1400. The system 1400 can read the inventive instructions on the program storage devices and follow these instructions to execute the methodology of the embodiments herein. The system 1400 further includes a user interface adapter 1419 that connects a keyboard 1415, mouse 1417, speaker 1424, microphone 1422, and/or other user interface devices such as a touch screen device (not shown) to the bus 1412 to gather user input. Additionally, a communication adapter 1420 operatively connects the bus 1412 to a data processing network 1425, which operatively connects to the cloud data center 1, and a display adapter 1421 connects the bus 1412 to a display device 1423 which may be embodied as an output device such as a monitor, printer, receiver, transmitter, or transceiver, for example.

Dynamic consolidation of Virtual Machines (VMs) is an efficient method for improving the utilization of physical resources and reducing energy consumption in Cloud data centers. Determining when it is best to reallocate VMs from an overloaded host is an aspect of dynamic VM consolidation that directly influences the resource utilization and QoS delivered by the system required for meeting the SLAs. The influence on the QoS is explained by the fact that server overloads cause resource shortages and performance degradation of applications. Previous solutions to the problem of host overload detection are generally heuristic-based, or rely on statistical analysis of historical data. The limitations of these approaches are that they lead to sub-optimal results and do not allow explicit specification of a QoS goal. The embodiments herein provide a novel approach that for any known stationary workload and a given state configuration optimally solves the problem of host overload detection by maximizing the mean inter-migration time under the specified QoS goal based on a Markov chain model. The embodiments herein heuristically adapt the algorithm to handle unknown non-stationary workloads using the Multisize Sliding Window workload estimation technique. Through simulations with real-world workload traces from more than a thousand PlanetLab VMs, it is demonstrated that the embodiments herein outperform the best benchmark algorithm and provides approximately 88% of the performance of the optimal offline algorithm.

The embodiments herein provide a system architecture and implementation of OpenStack Neat (a computer program product) acting as a framework for dynamic VM consolidation in OpenStack Clouds. OpenStack Neat can be configured to use custom VM consolidation algorithms, and transparently integrates with existing OpenStack deployments without the necessity in modifying their configuration. In addition, to foster and encourage further research efforts in the area of dynamic VM consolidation, the embodiments herein propose a benchmark suite for evaluating and comparing dynamic VM consolidation algorithms. The proposed benchmark suite comprises OpenStack Neat as the base software (computer program product) framework, a set of real-world workload traces, performance metrics, and evaluation methodology. As an application of the proposed benchmark suite, an experimental evaluation of OpenStack Neat and several dynamic VM consolidation algorithms on a Cloud data center testbed are conducted, which shows significant benefits of dynamic VM consolidation resulting in up to 33% energy savings.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

REFERENCES

[1] M. Andreolini, S. Casolari, and M. Colajanni. Models and framework for supporting runtime decisions in web-based systems. *ACM Transactions on the Web (TWEB)*, 2(3):17: 1-17:43, 2008.

[2] Anton Beloglazov. Scripts for setting up and analyzing results of experiments using OpenStack Neat. (accessed on 26 Nov. 2012).

[3] Anton Beloglazov and Rajkumar Buyya. Optimal online deterministic algorithms and adaptive heuristics for energy and performance efficient dynamic consolidation of virtual machines in Cloud data centers. *Concurrency and Computation: Practice and Experience (CCPE)*, 24(13):1397-1420, 2012.

[4] Anton Beloglazov, Rajkumar Buyya, Young Choon Lee, and Albert Zomaya. A taxonomy and survey of energy-efficient data centers and Cloud computing systems. *Advances in Computers, M. Zelkowitz (ed.)*, 82:47-111, 2011.

[5] Anton Beloglazov, Sareh Fotuhi Piraghaj, Mohammed Alrokayan, and Rajkumar Buyya. Deploying OpenStack on CentOS using the KVM hypervisor and GlusterFS distributed file system. Technical report, CLOUDS-TR-2012-3, CLOUDS Laboratory, The University of Melbourne, Australia, 2012.

[6] L. Benini, A. Bogliolo, G. A Paleologo, and G. De Micheli. Policy optimization for dynamic power management.

*IEEE Transactions on Computer-Aided Design of Integrated Circuits and Systems,* 18(6):813-833, 1999.

[7] N. Bobroff, A. Kochut, and K. Beaty. Dynamic placement of virtual machines for managing SLA violations. In *Proceedings of the 10th IFIP/IEEE International Symposium on Integrated Network Management (IM),* pages 119-128, 2007.

[8] G. Bolch. Queueing networks and *Markov chains: modeling and performance evaluation with computer science applications*. Wiley-Blackwell, 2006.

[9] Canonical Ltd. Ubuntu 12.04 (Precise Pangolin) Cloud images. (accessed on 22 Nov. 2012).

[10] E. Y Chung, L. Benini, A. Bogliolo, Y. H Lu, and G. De Micheli. Dynamic power management for nonstationary service requests. *IEEE Transactions on Computers,* 51(11):1345-1361, 2002.

[11] X. Fan, W. D. Weber, and L. A. Barroso. Power provisioning for a warehouse-sized computer. In *Proceedings of the 34th Annual International Symposium on Computer Architecture (ISCA),* pages 13-23, 2007.

[12] E. Feller, L. Rilling, and C. Morin. Snooze: A scalable and autonomic virtual machine management framework for private Clouds. In *Proceedings of the 12th IEEE/ACM International Symposium on Cluster, Cloud and Grid Computing (CCGrid),* pages 482-489, 2012.

[13] E. Feller, C. Rohr, D. Margery, and C. Morin. Energy management in IaaS Clouds: A holistic approach. In *Proceedings of the 5th IEEE International Conference on Cloud Computing (IEEE CLOUD),* pages 204-212, 2012.

[14] Gartner, Inc. Gartner estimates ICT industry accounts for 2 percent of global CO2 emissions, 2007. (accessed on 17 Jan. 2013).

[15] Daniel Gmach, Jerry Rolia, Ludmila Cherkasova, Guillaume Belrose, Tom Turicchi, and Alfons Kemper. An integrated approach to resource pool management: Policies, efficiency and quality metrics. In *Proceedings of the 38th IEEE International Conference on Dependable Systems and Networks (DSN),* pages 326-335, 2008.

[16] Daniel Gmach, Jerry Rolia, Ludmila Cherkasova, and Alfons Kemper. Resource pool management: Reactive versus proactive or let's be friends. *Computer Networks,* 53(17):2905-2922, 2009.

[17] Brian Guenter, Navendu Jain, and Charles Williams. Managing cost, performance, and reliability tradeoffs for energy-aware server provisioning. In *Proceedings of the 30st Annual IEEE International Conference on Computer Communications (INFOCOM),* pages 1332-1340, 2011.

[18] F. Hermenier, X. Lorca, J. M. Menaud, G. Muller, and J. Lawall. Entropy: A consolidation manager for clusters. In *Proceedings of the ACM SIGPLAN/SIGOPS International Conference on Virtual Execution Environments (VEE),* pages 41-50, 2009.

[19] Gueyoung Jung, Matti A. Hiltunen, Kaustubh R. Joshi, Richard D. Schlichting, and Calton Pu. Mistral: Dynamically managing power, performance, and adaptation cost in Cloud infrastructures. In *Proceedings of the 30th International Conference on Distributed Computing Systems (ICDCS),* pages 62-73, 2010.

[20] Jonathan G. Koomey. Growth in data center electricity use 2005 to 2010. Technical report, Analytics Press, 2011.

[21] S. Kumar, V. Talwar, V. Kumar, P. Ranganathan, and K. Schwan. vManage: Loosely coupled platform and virtualization management in data centers. In *Proceedings of the 6th International Conference on Autonomic Computing (ICAC),* pages 127-136, 2009.

[22] S. O. D Luiz, A. Perkusich, and A. M. N. Lima. Multisize sliding window in workload estimation for dynamic power management. *IEEE Transactions on Computers,* 59(12):1625-1639, 2010.

[23] D. Meisner, B. T. Gold, and T. F. Wenisch. PowerNap: eliminating server idle power. *ACM SIGPLAN Notices,* 44(3):205-216, 2009.

[24] K. Mills, J. Filliben, and C. Dabrowski. Comparing VM-placement algorithms for on-demand Clouds. In *Proceedings of the 3rd IEEE International Conference on Cloud Computing Technology and Science (CloudCom),* pages 91-98, 2011.

[25] R. Nathuji and K. Schwan. VirtualPower: Coordinated power management in virtualized enterprise systems. *ACM SIGOPS Operating Systems Review,* 41(6):265-278, 2007.

[26] Oracle Corporation. MySQL cluster CGE. (accessed on 23 Nov. 2012).

[27] K. S Park and V. S Pai. CoMon: a mostly-scalable monitoring system for PlanetLab. *ACM SIGOPS Operating Systems Review,* 40(1):65-74, 2006.

[28] Rackspace, US Inc. Rackspace hosting reports second quarter 2012 results, 2012. (accessed on 6 Nov. 2012).

[29] B. Speitkamp and M. Bichler. A mathematical programming approach for server consolidation problems in virtualized data centers. *IEEE Transactions on Services Computing (TSC),* 3(4):266-278, 2010.

[30] S. Srikantaiah, A. Kansal, and F. Zhao. Energy aware consolidation for Cloud computing. In *Proceedings of the 2008 USENIX Workshop on Power Aware Computing and Systems (HotPower),* pages 1-5, 2008.

[31] A. Verma, G. Dasgupta, T. K Nayak, P. De, and R. Kothari. Server workload analysis for power minimization using consolidation. In *Proceedings of the 2009 USENIX Annual Technical Conference,* pages 28-28, 2009.

[32] Akshat Verma, Puneet Ahuja, and Anindya Neogi. pMapper: power and migration cost aware application placement in virtualized systems. In *Proceedings of the 9th ACM/IFIP/USENIX International Conference on Middleware,* pages 243-264, 2008.

[33] VMware Inc. VMware distributed power management concepts and use. Technical report, 2010.

[34] Xiaorui Wang and Yefu Wang. Coordinating power control and performance management for virtualized server clusters. *IEEE Transactions on Parallel and Distributed Systems (TPDS),* 22(2):245-259, 2011.

[35] Chuliang Weng, Minglu Li, Zhigang Wang, and Xinda Lu. Automatic performance tuning for the virtualized cluster system. In *Proceedings of the 29th International Conference on Distributed Computing Systems (ICDCS),* pages 183-190, 2009.

[36] T. Wood, P. Shenoy, A. Venkataramani, and M. Yousif. Black-box and gray-box strategies for virtual machine migration. In *Proceedings of the 4th USENIX Symposium on Networked Systems Design & Implementation,* pages 229-242, 2007.

[37] M. Yue. A simple proof of the inequality FFD (L)<11/9 OPT (L)+1, for all 1 for the FFD bin-packing algorithm. *Acta Mathematicae Applicatae Sinica (English Series),* 7(4):321-331, 1991.

[38] Q. Zheng and B. Veeravalli. Utilization-based pricing for power management and profit optimization in data centers. *Journal of Parallel and Distributed Computing (JPDC),* 72(1):27-34, 2011.

[39] W. Zheng, R. Bianchini, G. J. Janakiraman, J. R. Santos, and Y. Turner. JustRunit: Experiment-based management of virtualized data centers. In *Proceedings of the 2009 USENIX Annual Technical Conference,* pages 18-33, 2009.

[40] X. Zhu, D. Young, B. J Watson, Z. Wang, J. Rolia, S. Singhal, B. McKee, C. Hyser, et al. 1000 Islands: Integrated capacity and workload management for the next generation data center. In *Proceedings of the 5th International Conference on Autonomic Computing (ICAC)*, pages 172-181, 2008.

What is claimed is:

1. A method of improving a utilization of physical resources and reducing energy consumption in a cloud data center, said method comprising:
   providing a plurality of virtual machines in said cloud data center;
   periodically reallocating, by a computing device, resources of said plurality of virtual machines according to a current resource demand of said plurality of virtual machines in order to minimize a number of active physical servers required to handle a workload of the physical servers, wherein said reallocating comprises:
      determining, by said computing device, when a physical server is considered to be overloaded so that some of the virtual machines are migrated from the overloaded physical server to other physical servers in order to meet a quality of service requirement;
      determining, by said computing device, when a physical server is considered to be underloaded so that the virtual machines of said physical server are migrated to other physical servers, wherein said physical server is switched to a lower power mode;
      selecting, by said computing device, particular virtual machines to migrate from said overloaded physical server; and
      allocating, by said computing device, the selected virtual machines for migration to other active or re-activated physical servers;
   determining a Markov chain model, wherein said Markov chain comprises a plurality of states of said cloud data center, and wherein each of said plurality of states correspond to a range of utilization of said physical resources of said cloud data center;
   maximizing, by said computing device, a mean inter-migration time between virtual machine migrations under said quality of service requirement based on said Markov chain model, wherein said periodically reallocating resources is such that said mean inter-migration time between virtual machine migrations is maximized; and
   using, by said computing device for a non-stationary workload, a multisize sliding window workload estimation process to maximize said mean inter-migration time.

2. The method of claim 1, wherein said Markov chain model allows a derivation of a randomized control policy that optimally maximizes said mean inter-migration time between virtual machine migrations under an explicitly specified quality of service requirement for any known stationary workload and a given state configuration in an online setting.

3. The method of claim 1, further comprising:
   maximizing, by said computing device, an activity time of said overloaded physical server; and
   minimizing, by said computing device, an activity time of an underloaded physical server.

4. The method of claim 1, wherein a workload of a physical server comprises a central processing unit utilization created over a period of time by a set of virtual machines allocated to said physical server, and wherein said workload is non-stationary.

5. The method of claim 4, wherein said non-stationary workload is approximated as a sequence of stationary workloads that are enabled one after another.

6. The method of claim 1, further comprising:
   submitting a virtual machine provisioning request through a cloud user interface;
   processing said request and instantiating required virtual machines;
   collecting data on resource utilization of virtual machines instantiated on a compute host;
   passing said data to a local consolidation manager that invokes physical server overload detection, physical server underload detection, a virtual machine selection process;
   passing outcomes generated by said local consolidation manager to a global consolidation manager;
   invoking a virtual machine placement process to determine a new placement of a virtual machine required to be migrated;
   initiating virtual machine migrations as determined by said virtual machine placement process;
   migrating said virtual machines as instructed by said global consolidation manager; and
   upon completion of the required migrations, said global consolidation manager switching said physical servers from and to a lower power mode, wherein said lower power mode comprises a sleep mode.

7. The method of claim 1, wherein overload detection occurs using an offline process, and wherein in said offline process, said plurality of states at any point in time is known by said computing device.

8. The method of claim 1, wherein said maximizing comprises determining a plurality of probabilities of transition from a plurality of non-absorbing states of said plurality of states to an absorbing state, wherein a probability of transition from said absorbing state to any of said non-absorbing states is zero.

9. A non-transitory program storage device readable by computer, tangibly embodying a program of instructions executable by said computer to perform a method of improving a utilization of physical resources and reducing energy consumption in a cloud data center, said method comprising:
   providing a plurality of virtual machines in said cloud data center;
   periodically reallocating, by a computing device, resources of said plurality of virtual machines according to a current resource demand of said plurality of virtual machines in order to minimize a number of active physical servers required to handle a workload of the physical servers, wherein said reallocating comprises:
      determining, by said computing device, when a physical server is considered to be overloaded so that some of the virtual machines are migrated from the overloaded physical server to other physical servers in order to meet a quality of service requirement;
      determining, by said computing device, when a physical server is considered to be underloaded so that the virtual machines of said physical server are migrated to other physical servers, wherein said physical server is switched to a lower power mode;
      selecting, by said computing device, particular virtual machines to migrate from said overloaded physical server; and
      allocating, by said computing device, the selected virtual machines for migration to other active or re-activated physical servers;

determining a Markov chain model, wherein said Markov chain comprises a plurality of states of said cloud data center, and wherein each of said plurality of states correspond to a range of utilization of said physical resources of said cloud data center;

maximizing, by said computing device, a mean inter-migration time between virtual machine migrations under said quality of service requirement based on said Markov chain model, wherein said periodically reallocating resources is such that said mean inter-migration time between virtual machine migrations is maximized; and using, by said computing device for a non-stationary workload, a multisize sliding window workload estimation process to maximize said mean inter-migration time.

10. The program storage device of claim 9, wherein said maximizing comprises determining a plurality of probabilities of transition from a plurality of non-absorbing states of said plurality of states to an absorbing state, wherein a probability of transition from said absorbing state to any of said non-absorbing states is zero.

11. The program storage device of claim 9, wherein said Markov chain model allows a derivation of a randomized control policy that optimally maximizes said mean inter-migration time between virtual machine migrations under an explicitly specified quality of service requirement for any known stationary workload and a given state configuration in an online setting.

12. The program storage device of claim 9, further comprising:
maximizing, by said computing device, an activity time of said overloaded physical server; and
minimizing, by said computing device, an activity time of an underloaded physical server.

13. The program storage device of claim 9, wherein a workload of a physical server comprises a central processing unit utilization created over a period of time by a set of virtual machines allocated to said physical server, and wherein said workload is non-stationary.

14. The program storage device of claim 13, wherein said non-stationary workload is approximated as a sequence of stationary workloads that are enabled one after another.

15. The program storage device of claim 9, further comprising:
submitting a virtual machine provisioning request through a cloud user interface;
processing said request and instantiating required virtual machines;
collecting data on resource utilization of virtual machines instantiated on a compute host;
passing said data to a local consolidation manager that invokes physical server overload detection, physical server underload detection, a virtual machine selection process;
passing outcomes generated by said local consolidation manager to a global consolidation manager;
invoking a virtual machine placement process to determine a new placement of a virtual machine required to be migrated;
initiating virtual machine migrations as determined by said virtual machine placement process;
migrating said virtual machines as instructed by said global consolidation manager; and
upon completion of the required migrations, said global consolidation manager switching said physical servers from and to a lower power mode, wherein said lower power mode comprises a sleep mode.

16. The program storage device of claim 9, wherein overload detection occurs using an offline process, wherein in said offline process, said plurality of states at any point in time is known by said computing device.

17. A system for improving a utilization of physical resources and reducing energy consumption in a cloud data center, said system comprising:
a plurality of virtual machines in said cloud data center;
a computing device for periodically reallocating resources of said plurality of virtual machines according to a current resource demand of said plurality of virtual machines in order to minimize a number of active physical servers required to handle a workload of the physical servers, wherein said reallocating comprises:
determining when a physical server is considered to be overloaded so that some of the virtual machines are migrated from the overloaded physical server to other physical servers in order to meet a quality of service requirement;
determining when a physical server is considered to be underloaded so that the virtual machines of said physical server are migrated to other physical servers, wherein said physical server is switched to a lower power mode;
selecting particular virtual machines to migrate from said overloaded physical server; and
allocating the selected virtual machines for migration to other active or re-activated physical servers;
determining a Markov chain model, wherein said Markov chain comprises a plurality of states of said cloud data center, and wherein each of said plurality of states correspond to a range of utilization of said physical resources of said cloud data center;
maximizing a mean inter-migration time between virtual machine migrations under said quality of service requirement based on said Markov chain model, wherein said periodically reallocating resources is such that said mean inter-migration time between virtual machine migrations is maximized; and
using, for a non-stationary workload, a multisize sliding window workload estimation process to maximize said mean inter-migration time.

18. The system of claim 17, wherein said Markov chain model allows a derivation of a randomized control policy that optimally maximizes said mean inter-migration time between virtual machine migrations under an explicitly specified quality of service requirement for any known stationary workload and a given state configuration in an online setting.

19. The system of claim 17, wherein a workload of a physical server comprises a central processing unit utilization created over a period of time by a set of virtual machines allocated to said physical server, wherein said workload is non-stationary, and wherein said non-stationary workload is approximated as a sequence of stationary workloads that are enabled one after another.

20. The system of claim 17, wherein said quality of service requirement is specified in terms of a workload independent quality of service metric, and wherein overload detection occurs using an offline process, wherein in said offline process, said plurality of states at any point in time is known by said computing device.

* * * * *